(12) United States Patent
Takada

(10) Patent No.: US 10,220,728 B2
(45) Date of Patent: Mar. 5, 2019

(54) SEAT DRIVING DEVICE

(71) Applicant: TOYOTA BOSHOKU KABUSHIKI KAISHA, Aichi-ken (JP)

(72) Inventor: Youichi Takada, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 43 days.

(21) Appl. No.: 15/595,149

(22) Filed: May 15, 2017

(65) Prior Publication Data

US 2017/0334314 A1    Nov. 23, 2017

(30) Foreign Application Priority Data

May 18, 2016 (JP) ................................. 2016-099326

(51) Int. Cl.
*A47C 1/00* (2006.01)
*B60N 2/02* (2006.01)
(Continued)

(52) U.S. Cl.
CPC ............ *B60N 2/0232* (2013.01); *B60N 2/06* (2013.01); *B60N 2/10* (2013.01); *B60N 2/1635* (2013.01);
(Continued)

(58) Field of Classification Search
CPC .... B60N 2/0232; B60N 2/0296; B60N 2/067; B60N 2/1615; B60N 2/165; B60N 2/1839;
(Continued)

(56) References Cited

U.S. PATENT DOCUMENTS 2,386,217 A * 10/1945 Kegresse ................ F16H 3/006
137/49
6,050,641 A * 4/2000 Benson ................ B60N 2/0232
297/284.1
(Continued)

FOREIGN PATENT DOCUMENTS

DE        10060857     6/2002
JP      2013-107624     6/2013

OTHER PUBLICATIONS

German Office Action for DE 102017208113.9, along with English-language translation.

*Primary Examiner* — Chi Q Nguyen
(74) *Attorney, Agent, or Firm* — Greenblum & Bernstein, P.L.C.

(57) ABSTRACT

A seat driving device for a seat including a first position adjusting mechanism and a second position adjusting mechanism, wherein a first clutch mechanism is configured to set an output shaft and an input shaft of the first clutch mechanism to be in a connection state regularly and to maintain the output shaft and the input shaft of the first clutch mechanism in the connection state as an first operation member corresponding to the first position adjusting mechanism is operated, and wherein a second clutch mechanism is configured to set an output shaft and an input shaft of the second clutch mechanism to be in a disconnection state regularly and to switch the output shaft and the input shaft of the second clutch mechanism to a connection state as a second operation member corresponding to the second position adjusting mechanism is operated.

14 Claims, 34 Drawing Sheets

(51) Int. Cl.
*B60N 2/06* (2006.01)
*B60N 2/10* (2006.01)
*B60N 2/16* (2006.01)
*B60N 2/22* (2006.01)
*F16H 1/16* (2006.01)

(52) U.S. Cl.
CPC ........ *B60N 2/22* (2013.01); *B60N 2002/0236* (2013.01); *F16H 1/16* (2013.01)

(58) Field of Classification Search
CPC .... B60N 2/1864; B60N 2/225; B60N 2/0252; B60N 2/06; B60N 2/0705; B60N 2/0715; B60N 2/22; B60N 2/02; B60N 2/10; B60N 2/16; B60N 2/1635; B60N 2/44; B60N 99/00; B60N 2002/02; B60N 2002/0224; B60N 2002/024; B60N 2002/0236; B60N 2002/0212; Y10T 74/19019
USPC ...... 297/330, 365, 366, 367 R, 367 P, 367 L, 297/344.1
See application file for complete search history.

(56) References Cited

U.S. PATENT DOCUMENTS

| | | | | |
|---|---|---|---|---|
| 8,443,691 B2* | 5/2013 | Ono | ....................... | B60K 17/04 |
| | | | | 74/473.36 |
| 9,604,550 B2* | 3/2017 | Ito | ........................ | B60N 2/0228 |
| 2004/0075297 A1 | 4/2004 | Bornchen et al. | | |
| 2004/0100122 A1 | 5/2004 | Bornchen et al. | | |
| 2004/0100136 A1 | 5/2004 | Bornchen et al. | | |
| 2006/0086203 A1* | 4/2006 | Okuhara | ................. | B41J 29/13 |
| | | | | 74/640 |
| 2010/0139453 A1* | 6/2010 | Chu | ..................... | B65H 3/0669 |
| | | | | 74/664 |
| 2014/0238188 A1 | 8/2014 | Ito | | |
| 2014/0366685 A1* | 12/2014 | Mueller | ................. | B60K 17/35 |
| | | | | 74/664 |
| 2015/0209947 A1* | 7/2015 | Mandel | ................... | B25F 5/001 |
| | | | | 74/661 |
| 2015/0329020 A1* | 11/2015 | Ito | ........................ | B60N 2/0296 |
| | | | | 297/463.1 |
| 2018/0029508 A1* | 2/2018 | Carl | ..................... | B60N 2/0232 |

* cited by examiner

SEAT DRIVING DEVICE

CROSS-REFERENCE TO RELATED APPLICATIONS

This application claims priority from Japanese Patent Application No. 2016-099326 filed on May 18, 2016, the entire contents of which are incorporated herein by reference.

TECHNICAL FIELD

The disclosure relates to a seat driving device that selectively actuates a plurality of position adjusting mechanisms by a single driving motor.

BACKGROUND

JP-A-2013-107624 discloses a seat driving device that selectively actuates a plurality of position adjusting mechanisms by a single driving motor. The seat driving device is configured to perform four position adjustments (adjustments of a seat in a front and rear direction and an upper and lower direction, reclining angle adjustment of a seat back and tilt angle adjustment of a seat cushion) by using the single driving motor. Therefore, a clutch mechanism is respectively provided in a path for distributing an output of the driving motor to each position adjusting mechanism. The clutch corresponding to a mechanism that performs the position adjustment is caused to come into a connection state, so that the output of the driving motor is transmitted to the corresponding position adjusting mechanism. On the other hand, the clutches corresponding to mechanisms that do not perform the position adjustment are caused to come into a disconnection state, so that the output of the driving motor is not transmitted to the corresponding position adjusting mechanisms.

Use frequencies are different between the plurality of position adjusting mechanisms. For example, the adjustment of the seat in the front and rear direction may be more frequently used than the other adjustments, depending on usage of the seat. The seat driving device is required to secure predetermined durability, irrespective of the use frequency. In the seat driving device, it is the clutch mechanism that highly affects the durability, depending on the difference of the use frequency.

Therefore, in the seat driving device, the clutch mechanisms are designed so that a problem does not occur as to the durability of the clutch mechanism of the position adjusting mechanism of which the use frequency is high. As a result, excessive quality is secured for the clutch mechanisms of the position adjusting mechanisms of which the use frequency is low. Therefore, the cost increases due to the excessive quality. It is considered to make the durability of each clutch mechanism different, in correspondence to the use frequency. In this case, however, it is not possible to commonalize each clutch mechanism, so that the cost increases.

SUMMARY

The disclosure provides a seat driving device configured to selectively actuate a plurality of position adjusting mechanisms by a single driving motor and including a plurality of clutch mechanisms each of which is provided in a path for distributing an output of the driving motor to each position adjusting mechanism, wherein a clutch mechanism of a position adjusting mechanism whose use frequency is high is configured to be set in a connection state regularly and a clutch mechanism of a position adjusting mechanism whose use frequency is low is configured to be set in a disconnection state regularly, thereby suppressing problems of the durability and the excessive quality of the clutch mechanisms due to a difference in the use frequency.

According to an aspect of the disclosure, there is provided a seat driving device for a seat including a plurality of position adjusting mechanisms including a first position adjusting mechanism and a second position adjusting mechanism, the seat driving device including: a driving motor including a single output shaft; a plurality of operation members individually arranged in correspondence to the plurality of position adjusting mechanisms and configured to be operated so as to actuate each position adjusting mechanism, the plurality of operation members including a first operation member and a second operation member; a plurality of clutch mechanisms individually arranged in correspondence to the plurality of position adjusting mechanisms and including a first clutch mechanism and a second clutch mechanism, each clutch mechanism being configured to selectively connect an input shaft of the clutch mechanism which is configured to be rotated by the driving motor and an output shaft of the clutch mechanism which is connected to the corresponding position adjusting mechanism: and a switch configured to, in response to an operation on any one of the plurality of operation members, energize the driving motor with a polarity corresponding to a direction of the operation, wherein the first clutch mechanism corresponds to the first position adjusting mechanism which is frequently used, and the first clutch mechanism is configured to set the output shaft and the input shaft of the first clutch mechanism to be in a connection state regularly and to maintain the output shaft and the input shaft of the first clutch mechanism in the connection state as the first operation member corresponding to the first position adjusting mechanism is operated, and wherein the second clutch mechanism corresponds to the second position adjusting mechanism, which is less frequently used than the first position adjusting mechanism, and the second clutch mechanism is configured to set the output shaft and the input shaft of the second clutch mechanism to be in a disconnection state regularly and to switch the output shaft and the input shaft of the second clutch mechanism to a connection state as the second operation member corresponding to the second position adjusting mechanism is operated.

In the above-described aspect, the number of the second position adjusting mechanism may be one or two or more. Also, as the plurality of clutch mechanisms, a variety of types of known clutch mechanisms can be adopted.

According to the above-described aspect, the clutch mechanism of the position adjusting mechanism, which is frequently used, is set in the connection state regularly, and is maintained in the connection state when performing adjusting operation of the first position adjusting mechanism. For this reason, even when the first position adjusting mechanism is adjusted with high frequency, the clutch mechanism is not switched each time the first position adjusting mechanism is adjusted. Therefore, it is possible to suppress deterioration of the clutch mechanism corresponding to the first position adjusting mechanism. Hence, even when the use frequency is different between the first position adjusting mechanism and the second position adjusting mechanism, it is possible to suppress the problems of the durability and excessive quality of the clutch mechanism in the seat driving device.

DETAILED DESCRIPTION

The respective drawings depict an illustrative embodiment. The illustrative embodiment depicts an example where the seat driving device of the disclosure is applied to a vehicle front seat (hereinafter, simply referred to as seat) 6. In the respective drawings, each direction at a state where the seat 6 is mounted on a vehicle is indicated by an arrow. Hereinafter, directions are described on the basis of the directions indicated by the arrows.

Figure 1:
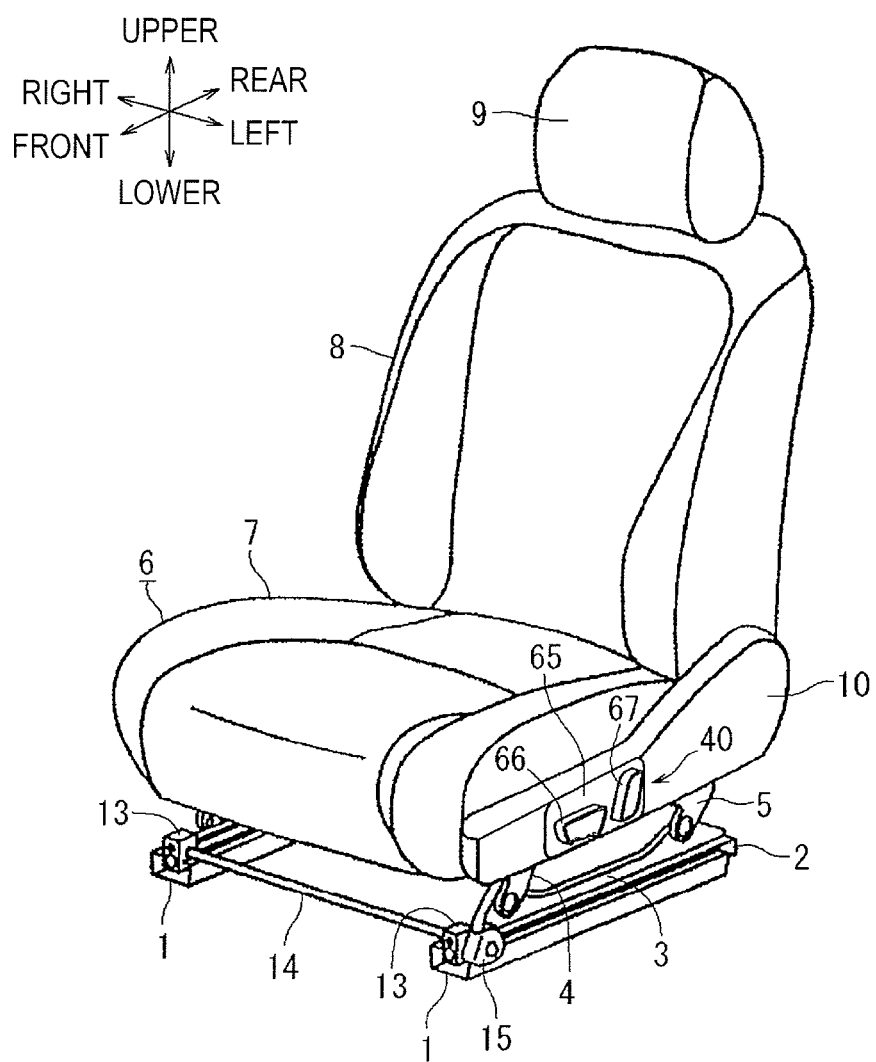
FIG. 1 is a perspective view of a vehicle front seat to which a seat driving device of an illustrative embodiment of the disclosure is applied.

FIG. 1 depicts an outward appearance of the seat 6. The seat 6 has a seat cushion 7 configuring a sitting part and a seat back 8 fixed to a rear part of the seat cushion so as to be freely rotatable in a front and rear direction. Therefore, a hinge part between the rear part of the seat cushion 7 and a lower part of the seat back 8 is provided with a recliner (not shown) for adjusting a reclining angle of the seat back 8.

An upper end portion of the seat back 8 is provided with a headrest 9 configured to support a head of a sitting passenger from the rear. Also, a left side part of the seat cushion 7, including the lower part of the seat back 8, is covered by a side shield 10. In the side shield 10, a driving device 40 of the seat driving device configured to adjust a sitting posture in accordance with a taste of a passenger sitting on the seat 6 is accommodated. A first operation knob 66 and a second operation knob 67 configuring an operation member of the driving device 40 are exposed to an outside of the side shield 10 so that the sitting passenger can adjust the same.

The seat 6 is fixed to a vehicle floor so as to be freely movable in the front and rear direction. Therefore, a pair of lower rails 1 is fixed to the vehicle floor below both right and left end portions of the seat cushion 7. Upper rails 2 are respectively fitted to the lower rails 1 so that the upper rails 2 can freely slide relative to the lower rails 1 in the front and rear direction. Brackets 3 are respectively fixed on the respective upper rails 2, and the seat cushion 7 is fixed to the respective brackets 3 via a front link 4 and a rear link 5. The front link 4 and the rear link 5 are configured to freely tilt relative to the brackets 3 in the front and rear direction. Therefore, as described later, a height of the seat 6 can be adjusted by adjusting angles of the front link 4 and the rear link 5.

Figure 2:
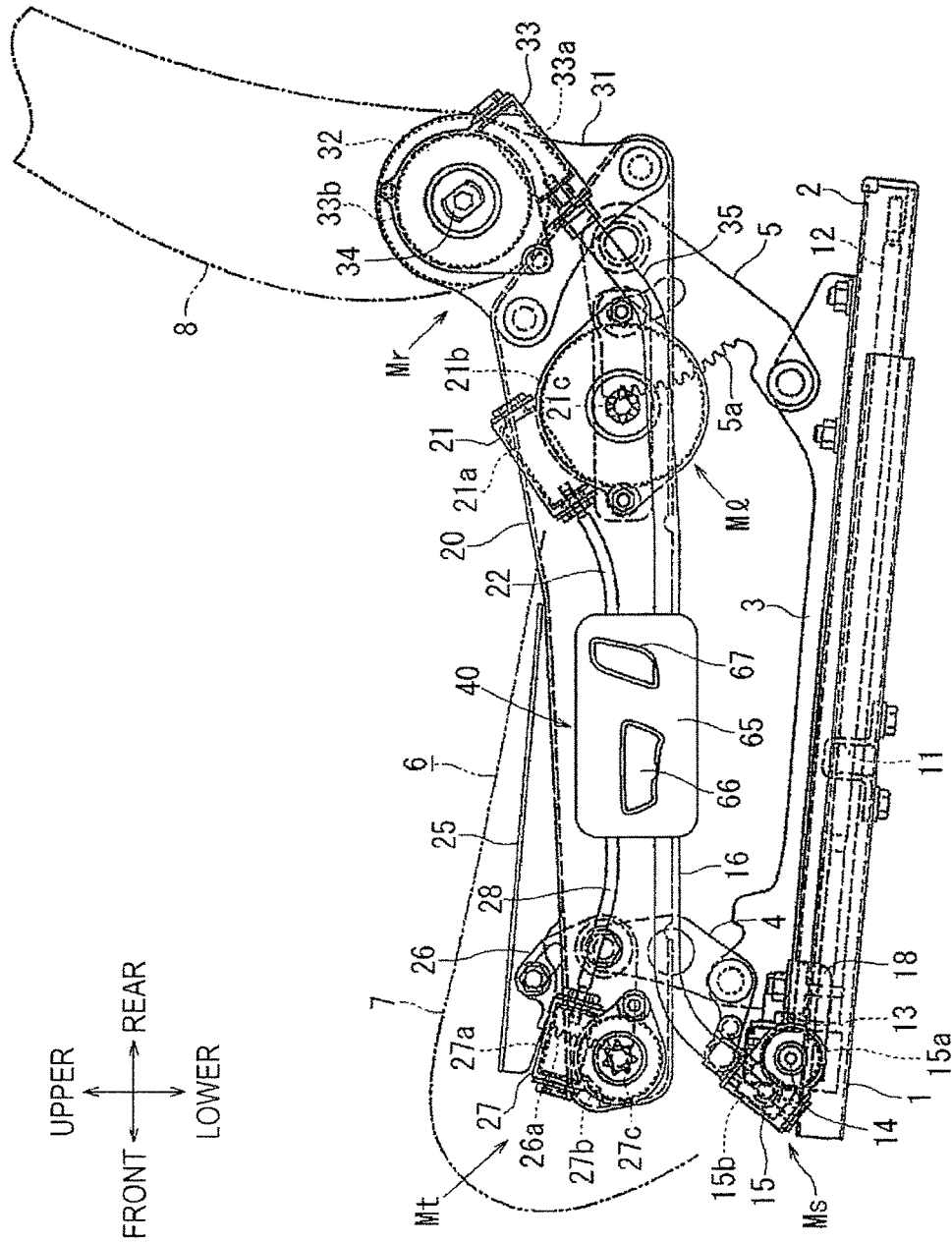
FIG. 2 is an overall configuration view of the illustrative embodiment.

FIG. 2 depicts a frame structure of a left and lower part of the seat 6. A nut member for slide 1 is fixed in each of the right and left lower rails 1. The nut member for slide 11 has a female screw which penetrates therethrough in the front and rear direction. In the meantime, a lead screw for slide 12 extending in the front and rear direction of the upper rail 2 is rotatably fixed in each of the right and left upper rails 2. The lead screw for slide 12 has a male screw formed on an outer periphery thereof and is screwed into the female screw of the nut member for slide 11.

A gear box for slide 13 is fixed to a front end of each of the upper rails 2 (refer to FIG. 1). In each gear box for slide 13, bevel gears configured to mesh with each other (not shown) are embedded. One bevel gear is fixed to a front end portion of the lead screw for slide 12, and the other bevel gear is fixed to each end portion of a connecting rod for slide 14 having a polygonal column shape. A front end portion of the left lower rail 1 is provided with a direction conversion gear device 15 in parallel with the gear box for slide 13. In the direction conversion gear device 15, bevel gears 15a, 15b configured to mesh with each other are embedded. The bevel gear 15a is coaxial with the bevel gear (not shown) of the gear box for slide 13 and is fixed to the connecting rod for slide 14, and the bevel gear 15b is fixed to an end portion of a torque cable for slide 16 extending to the rear of the direction conversion gear device 15.

Therefore, when the torque cable for slide 16 is rotated, the rotation is direction-converted at the bevel gear 15b and the bevel gear 15a of the direction conversion gear device 15 and is then transmitted to the connecting rod for slide 14. Then, the rotation of the connecting rod for slide 14 is direction-converted at the gear box for slide 13 of each side and is then transmitted to the lead screw for slide 12 of each side. The rotation of the lead screw for slide 12 is converted in forward and backward movement by the nut member for slide 11 screwed to the lead screw for slide 12, so that the upper rail 2 is moved in the front and rear direction. Here, the nut member for slide 11, the lead screw for slide 12, the gear box for slide 13, the connecting rod for slide 14 and the direction conversion gear device 15 configure a slide adjusting mechanism Ms serving as the position adjusting mechanism, together with the lower rail 1 and the upper rail 2.

The front link 4 of each side has a lower end fixed to a front end portion of the bracket 3 to be freely rotatable and an upper end fixed to a front end portion of a side frame 20 to be freely rotatable, which configures a frame of the seat cushion 7. Also, the rear link 5 of each side has a lower end fixed to a rear end portion of the bracket 3 to be freely rotatable and an upper end fixed to a rear end portion of the side frame 20 to be freely rotatable. Therefore, the bracket 3, the front link 4, the rear link 5 and the side frame 20 configure a four-link.

The left rear link 5 is formed with a sector gear part 5a having a substantially fan shape and provided at a front side of a rotary shaft of the side frame 20. Also, a gear box for lifter 21 is provided at a side of the side frame 20, in the vicinity of the left rear link 5. The gear box for lifter 21 has therein a reduction mechanism including a worm 21a and a worm wheel 21b. A pinion for lifter 21c is coaxially fixed to the worm wheel 21b. The pinion for lifter 21c is meshed with the sector gear part 5a. The worm 21a is fixed to an end portion of a torque cable for lifter 22 extending forward from the gear box for lifter 21.

When the torque cable for lifter 22 is rotated, the rotation is transmitted to the worm 21a, is reduced at the worm wheel 21b and is then transmitted to the pinion for lifter 21c. The rotation of the pinion for lifter 21c is transmitted to the rear link 5 via the sector gear part 5a, so that the rear link 5 is rotated about the upper end thereof. Thereby, the front link 4 and the rear link 5 configuring the four-link is rotated about the fixed points of the bracket 3-side, thereby moving up and down the side frame 20 relative to the bracket 3. Here, the front link 4, the rear link 5 and the gear box for lifter 21 configure a lifter adjusting mechanism M1 serving as the position adjusting mechanism, together with the bracket 3 and the side frame 20.

A tilt arm 25 made of a plate material is fixed to a front side of a central part of the right and left side frames 20 in the front and rear direction so that it can freely rotate about a rear end portion thereof. An upper end of a tilt link 26 is fixed to a front end portion of the tilt arm 25 so as to be freely rotatable, and a lower end of the tilt link 26 is coaxially fixed to the upper end of the front link 4 so as to be freely rotatable.

The left tilt link 26 is formed with a sector gear part 26a having a substantially fan shape and provided at a front side of a rotary shaft of the lower end thereof. Also, a gear box for tilt 27 is provided at the side of the side frame 20, in the vicinity of the left tilt link 26. The gear box for tilt 27 has therein a reduction mechanism including a worm 27a and a worm wheel 27b. A pinion for tilt 27c is coaxially fixed to the worm wheel 27b. The pinion for tilt 27c is meshed with the sector gear part 26a. The worm 27a is fixed to an end portion of a torque cable for tilt 28 extending rearward from the gear box for tilt 27.

When the torque cable for tilt 28 is rotated, the rotation is transmitted to the worm 27a, is reduced at the worm wheel 27b and is then transmitted to the pinion for tilt 27c. The rotation of the pinion for tilt 27c is transmitted to the tilt link 26 via the sector gear part 26a, so that the tilt link 26 is rotated about a lower end thereof. Thereby, the tilt arm 25 is rotated about a rear end portion, thereby moving up and down a front end portion thereof. For this reason, an inclined angle of the tilt arm 25 relative to the side frame 20 increases or decreases. Herein, the tilt link 26 and the gear box for tilt 27 configure a tilt adjusting mechanism Mt serving as the position adjusting mechanism, together with the tilt arm 25 and the side frame 20.

A recliner plate 31 made of a plate material is fixed to the rear end portion of the side frame 20 of each side. The recliner plate 31 is coupled with a lower end portion of the seat back 8 via the recliner 32 having a substantially circular disc shape. The recliner 32 configures a well-known hypocycloid reduction gear. That is, the recliner 32 has a first disc having an internal teeth gear and fixed to the recliner plate 31, a second disc having an external teeth gear configured to mesh with the internal teeth gear with the smaller number of teeth than that of the internal teeth gear, a wedge member configured to maintain eccentric states of the internal and external teeth gears so as to cause the internal teeth gear and the external teeth gear to mesh with each other, a cam shaft, which is arranged coaxially with the first disc (the internal teeth gear) and is configured to move the wedge member and the second disc is pivotally supported thereto, and the like. The recliner 32 is fixed at the second disc to the seat back 8. The recliner 32 is configured to revolve the second disc with maintaining the meshed state between the internal teeth gear and the external teeth gear by movement of the wedge member associated with rotation of the cam shaft, thereby reducing the rotation of the cam shaft with a rotation number of the second disc upon the revolution. Then, the seat back 8 is rotated (tilted) relative to the seat cushion 7 by the rotation of the second disc relative to the first disc.

A gear box for recliner 33 is fixed to an outer side of the left recliner plate 31. The gear box for recliner 33 has therein a reduction mechanism including a worm 33a and a worm wheel 33b. The worm wheel 33b has an axis line extending in a width direction of the seat and is coupled to a connecting rod for recliner 34 bridged between both the recliners 32 and having a polygonal column shape so as to integrally rotate. The connecting rod for recliner 34 is coupled to the cam shafts of both the recliners 32 through the recliners 32 so as to integrally rotate. In the meantime, the worm 33a is fixed to an end portion of a torque cable for recliner 35 extending forward from the gear box for recliner 33.

Therefore, when the torque cable for recliner 35 is rotated, the rotation is reduced between the worm 33a, which is an input side of the gear box for recliner 33, and the worm wheel 33b, which is an output side, and is then transmitted to the connecting rod for recliner 34. Then, the rotation of the connecting rod for recliner 34 is transmitted to the cam shaft of the recliner 32. Thereby, like the above-described aspect, the second disc is rotated relative to the first disc of the recliner 32, so that the seat back 8 is rotated (tilted) relative to the seat cushion 7. Herein, the recliner 32, the gear box for recliner 33 and the connecting rod for recliner 34 configure a reclining angle adjusting mechanism Mr serving as the position adjusting mechanism, together with the recliner plate 31 and the seat back 8.

That is, the illustrative embodiment is configured as a so-called 8-way power seat where the seat position in the forward direction and the reverse direction can be adjusted with each of the slide adjusting mechanism Ms, the lifter adjusting mechanism Ml, the tilt adjusting mechanism Mt and the reclining angle adjusting mechanism Mr.

The driving device 40 is fixed to a central part in the front and rear direction, which is located between the gear box for lifter 21 and the gear box for tilt 27 of the left side frame 20. As described later, the driving device 40 has therein a driving motor having a single output shaft. As described later, the output shaft of the driving motor is connected to the torque cable for slide 16, the torque cable for lifter 22, the torque cable for tilt 28 and the torque cable for recliner 35 via clutch mechanisms. Therefore, it is possible to adjust the slide adjusting mechanism Ms, the lifter adjusting mechanism Ml, the tilt adjusting mechanism Mt and the reclining angle adjusting mechanism Mr by one driving motor.

Figure 3:
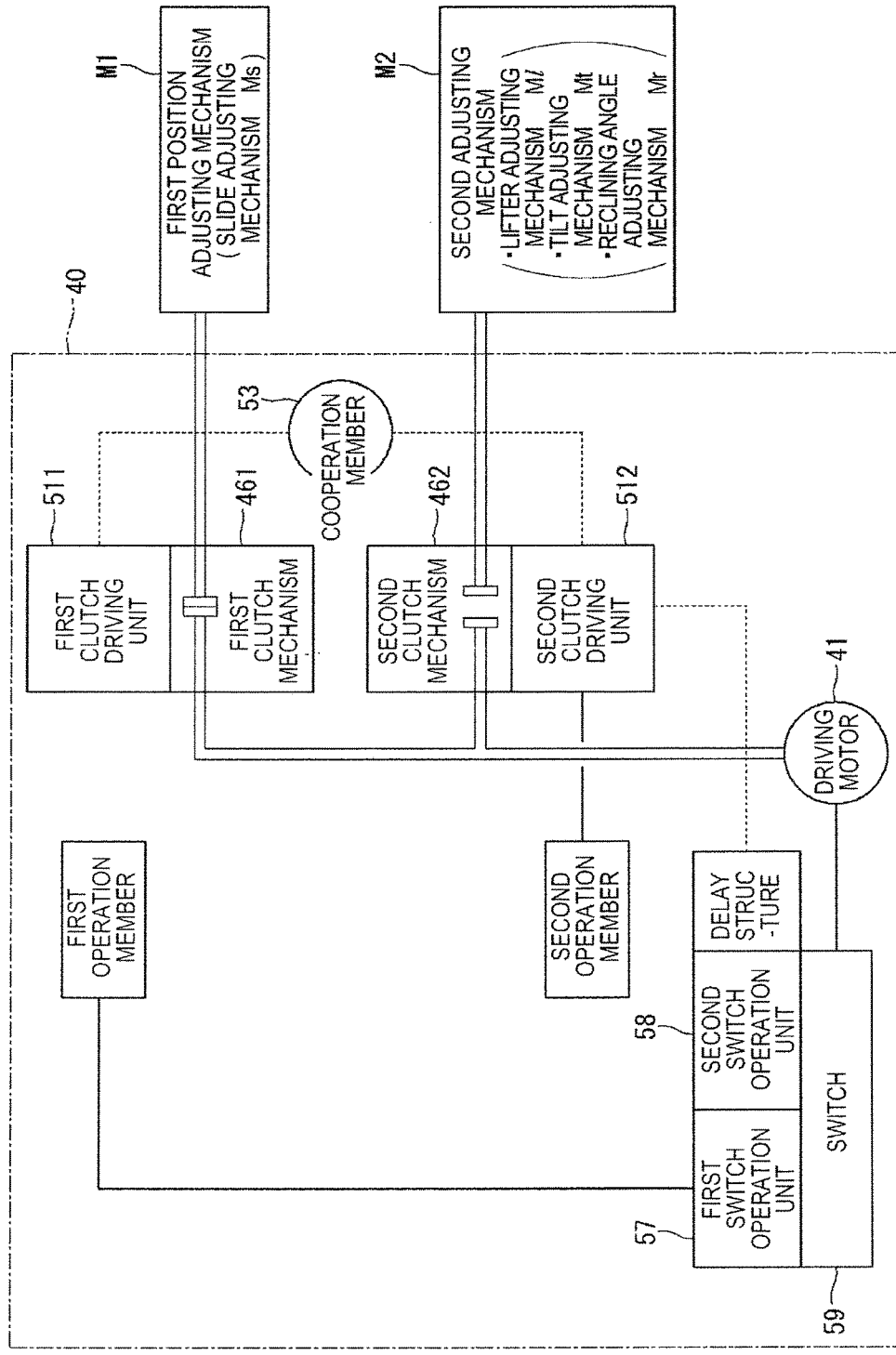
FIG. 3 illustrates an outline of a system of the illustrative embodiment.

FIG. 3 depicts an outline of a system of the seat driving device including the driving device 40. Herein, the first position adjusting mechanism M1 is a position adjusting mechanism of which an adjustment frequency is relatively high in the 8-way power seat, specifically, the slide adjusting mechanism Ms. Also, the second position adjusting mechanism M2 is a position adjusting mechanism of the 8-way power seat, other than the first position adjusting mechanism M1, specifically, the lifter adjusting mechanism Ml, the tilt adjusting mechanism Mt and the reclining angle adjusting mechanism Mr. Therefore, although only one second position adjusting mechanism M2 is herein shown, the three position adjusting mechanisms are actually provided in parallel.

The first position adjusting mechanism M1 is connected to an output shaft of a driving motor 41 via a first clutch mechanism 461. Also, the second position adjusting mechanism M2 is connected to the output shaft of the driving motor 41 via a second clutch mechanism 462. The first clutch mechanism 461 is a regular-connection type and the second clutch mechanism 462 is a regular-disconnection type. The first clutch mechanism 461 has a first clutch driving unit 511 adjacent thereto. When the first clutch driving unit 511 is actuated, it switches the first clutch mechanism 461 to a disconnection state. Also, the second clutch mechanism 462 has a second clutch driving unit 512 adjacent thereto. When the second clutch driving unit 512 is actuated, it switches the second clutch mechanism 462 to a connection state.

The second clutch driving unit 512 is configured to be actuated by an operation of a second operation member that is to be operated so as to actuate the second position adjusting mechanism M2. Also, the first clutch driving unit 511 is configured to be actuated by the second clutch driving unit 512, via a cooperation member 53. Therefore, when the second operation member is operated, the second clutch driving unit 512 is actuated and the first clutch driving unit 511 is also actuated. As a result, when the second operation member is operated, the second clutch mechanism 462 is switched to the connection state and the first clutch mechanism 461 is simultaneously switched to the disconnection state.

When the second clutch driving unit 512 is actuated, a second switch operation unit 58 is actuated via a delay structure and a switch 59 is switched in correspondence to an operation direction of the second operation member. As a result, the driving motor 41 is actuated, and the second position adjusting mechanism M2 is actuated via the second clutch mechanism 462, in correspondence to the operation direction of the second operation member. At this time, as described above, since the first clutch mechanism 461 is in the disconnection state, the first position adjusting mechanism M1 is not actuated. Also, since the second switch operation unit 58 is actuated via the delay structure by the second clutch driving unit 512 and then the switch 59 is switched, the driving motor 41 is actuated after the second clutch mechanism 462 comes into the connection state and the first clutch mechanism 461 comes into the disconnection state. For this reason, it is possible to prevent a situation where the driving motor 41 is actuated before the second clutch mechanism 462 is switched to the connection state and the first clutch mechanism 461 is switched to the disconnection state.

Also, as described above, the operating force of the second operation member transmitted to the second clutch driving unit 512 is transmitted to the first clutch driving unit 511 via the cooperation member 53. For this reason, it is possible to perform an actuation of causing the second clutch mechanism 462 to come into the connection state and an actuation of causing the first clutch mechanism 461 to come into the disconnection state in cooperation with each other simply by the operation of the second operation member.

The first operation member that is to be operated so as to actuate the first position adjusting mechanism M1 is coupled to a first switch operation unit 57 so as to actuate the first switch operation unit 57. The first switch operation unit 57 is arranged in parallel with the second switch operation unit 58. When the first switch operation unit 57 is actuated, the switch 59 is switched in correspondence to an operation direction of the first operation member. In the meantime, the first operation member and the first clutch driving unit 511 are not coupled to each other. For this reason, when the first operation member is operated, the switch 59 is switched by the first switch operation unit 57, so that the driving motor 41 is actuated. An output of the driving motor 41 actuates the first position adjusting mechanism M1 via the first clutch mechanism 461 in the connection state regularly.

In this way, upon the actuation of the first position adjusting mechanism M1 that is frequently used, the first clutch driving unit 511 is not actuated and the first clutch mechanism 461 is maintained in the connection state. For this reason, even when the first position adjusting mechanism M1 is adjusted with high frequency, it is possible to suppress deterioration of the first clutch mechanism 461 corresponding to the first position adjusting mechanism M1.

Figure 4:
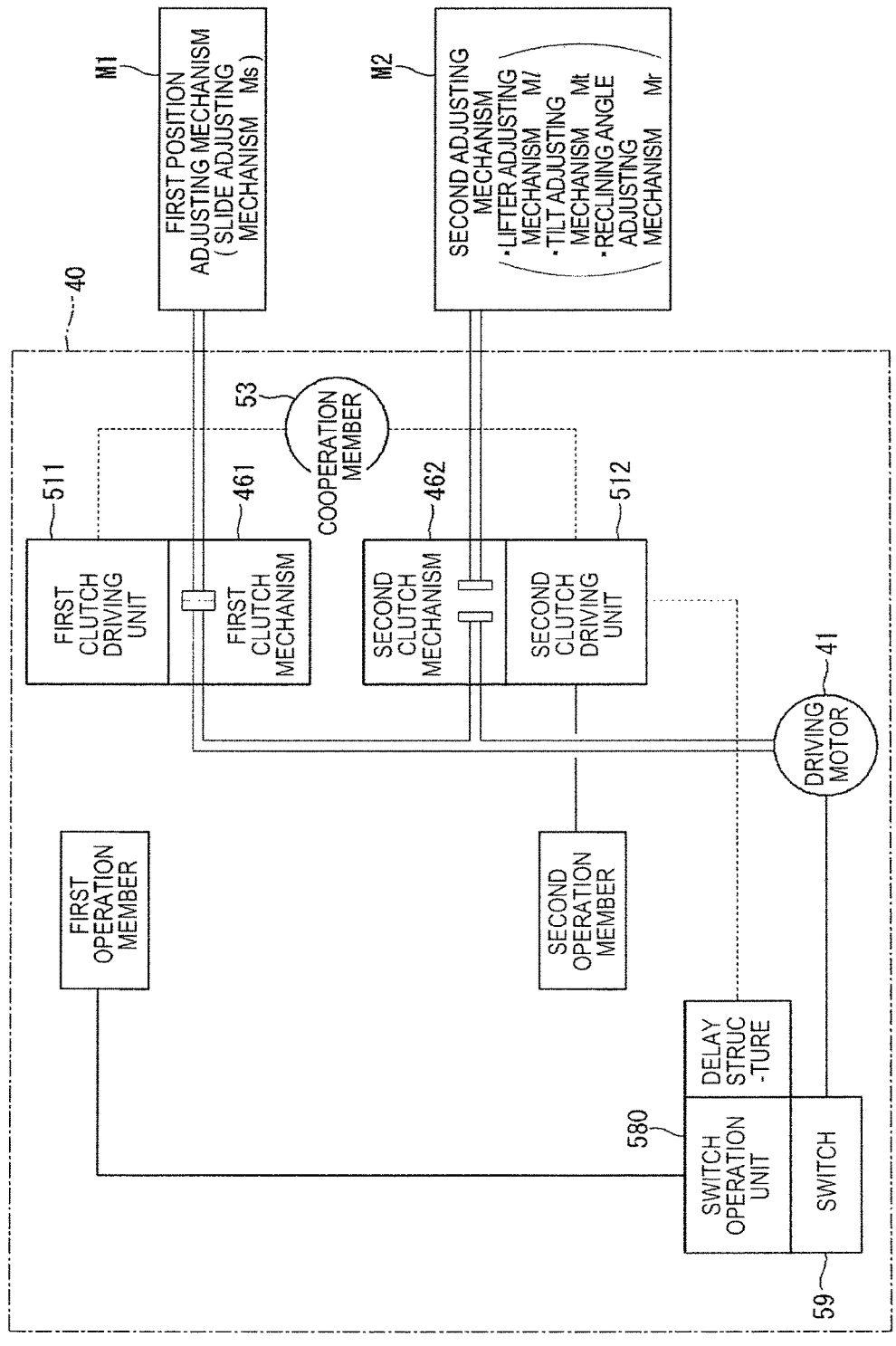
FIG. 4 illustrates an outline of a system similar to FIG. 3, depicting a modified embodiment of the illustrative embodiment.

FIG. 4 depicts a modified embodiment of the seat driving device of FIG. 3. In the modified embodiment, the first switch operation unit 57 and the second switch operation unit 58 are configured by one switch operation unit 580. The switch operation unit 580 switches the switch 59 when the first operation member is operated, and switches the switch 59 via the delay structure also when the second clutch driving unit 512 is actuated. Therefore, in the modified embodiment, it is possible to implement the two functions of the first switch operation unit 57 and the second switch operation unit 58 by one switch operation unit 580.

Figure 5:
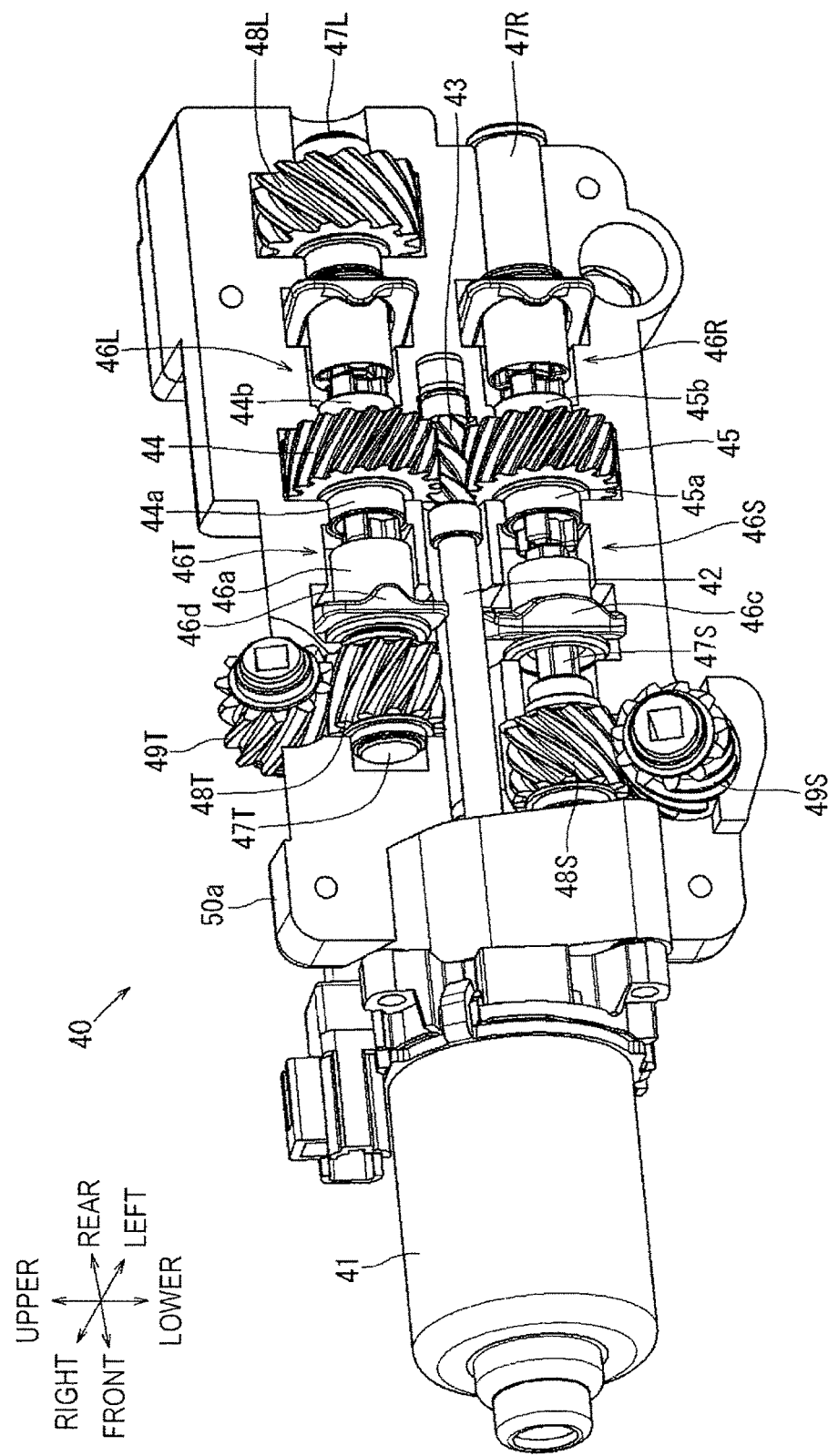
FIG. 5 is an enlarged exploded perspective view depicting a driving mechanism part of the illustrative embodiment.
Figure 6:
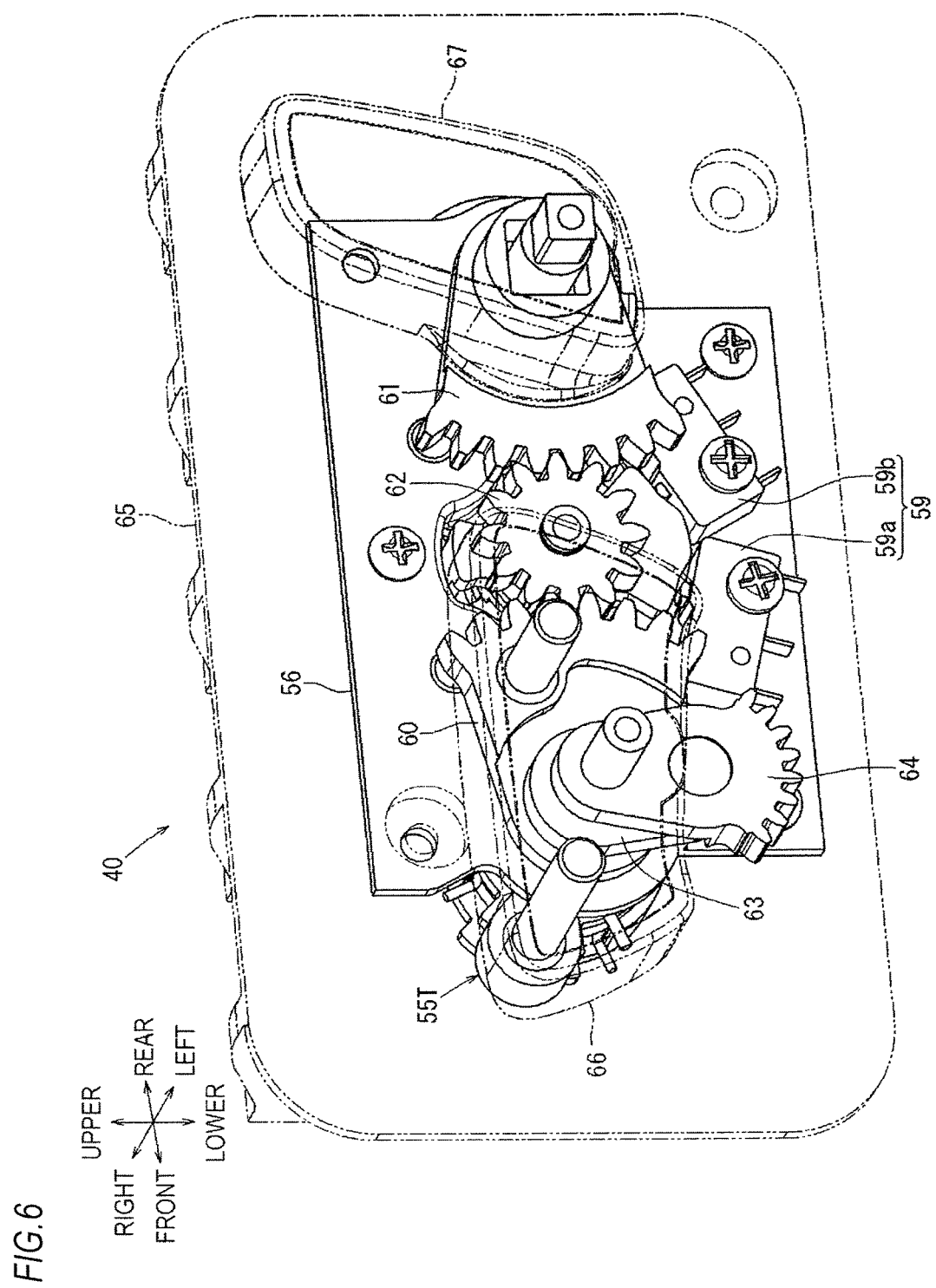
FIG. 6 is an enlarged exploded perspective view depicting an operation mechanism part of the illustrative embodiment.
Figure 7:
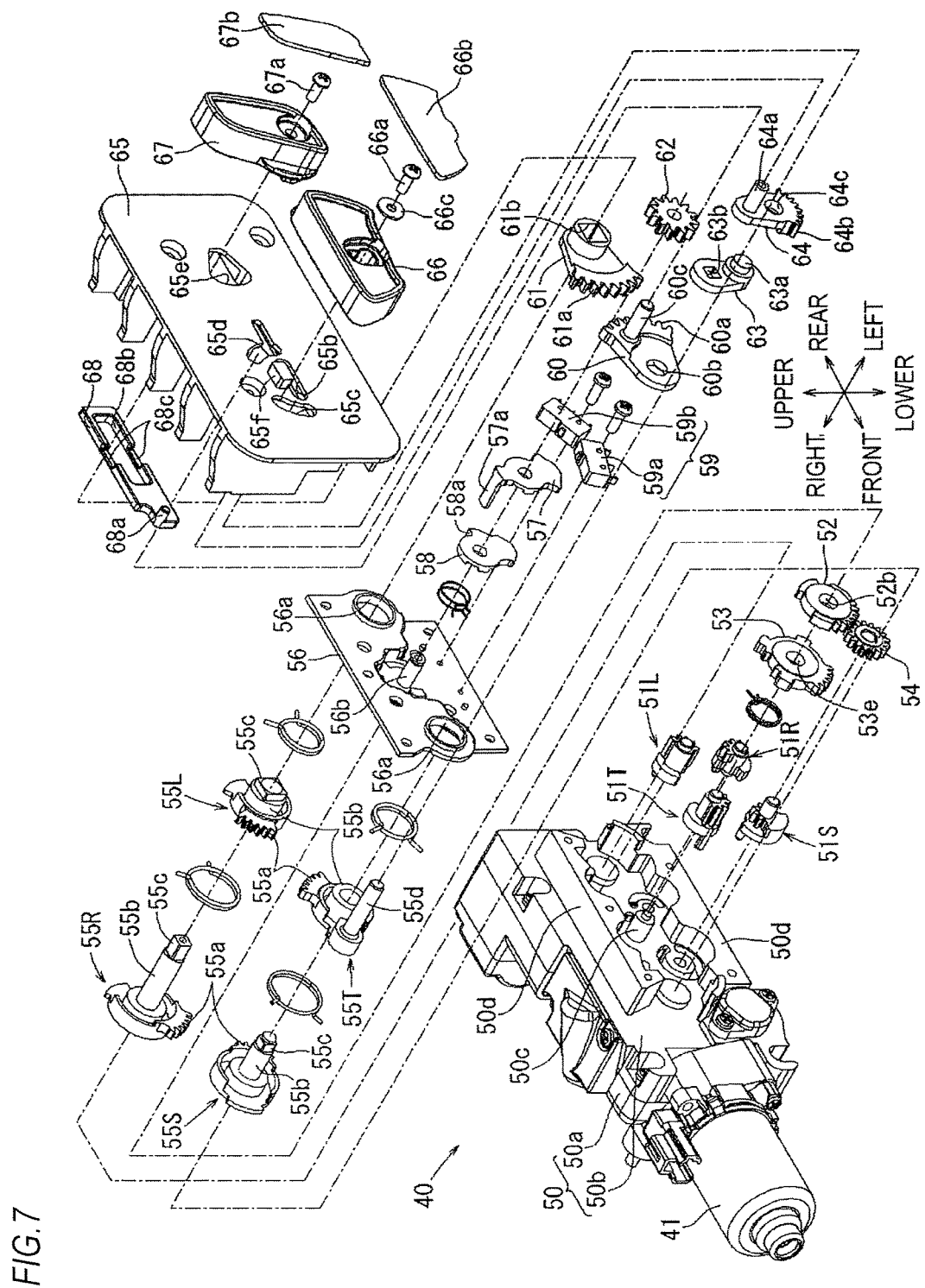
FIG. 7 is an exploded perspective view of an entire driving device of the illustrative embodiment.

FIGS. 5 to 7 depict in detail the driving device 40. The driving device 40 includes a driving mechanism part shown in FIG. 5 and an operation mechanism part shown in FIG. 6.

The driving mechanism part of FIG. 5 has the single driving motor 41, and the driving motor 41 has a single motor output shaft 42. The motor output shaft 42 is coupled with a worm 43, and the worm 43 is meshed with a pair of worm wheels 44, 45 dispersed in an upper and lower direction. Therefore, a rotation output of one shaft from the driving motor 41 is converted into rotation outputs of two shafts by a combination of the worm 43 and the worm wheels 44, 45.

A clutch mechanism is respectively coupled to both sides of each rotary shaft of the worm wheels 44, 45. That is, a clutch mechanism for tilt 46T is coupled to a front input shaft 44a of the rotary shaft of the worm wheel 44, and a clutch mechanism for lifter 46L is coupled to a rear input shaft 44b. Also, a clutch mechanism for slide 46S is coupled to a front input shaft 45a of the rotary shaft of the worm wheel 45, and a clutch mechanism for recliner 46R is coupled to the rear input shaft 45b.

An output shaft 47T of the clutch mechanism for tilt 46T is coupled with a helical gear 48T, and the helical gear 48T is meshed with a helical gear 49T of which a rotary shaft is arranged in a direction intersecting with a rotary shaft of the helical gear 48T. An axis direction of the output shaft 47T of the clutch mechanism for tilt 46T is converted by a combination of the helical gears 48T. 49T.

Also, an output shaft 47L of the clutch mechanism for lifter 46L is coupled with a helical gear 48L, and the helical gear 48L is meshed with a helical gear (not shown) of which a rotary shaft is arranged in a direction intersecting with a rotary shaft of the helical gear 48L. An axis direction of the output shaft 47L of the clutch mechanism for lifter 46L is converted by a combination of the helical gear 48T and the other helical gear.

Also, an output shaft 47S of the clutch mechanism for slide 46S is coupled with a helical gear 48S, and the helical gear 48S is meshed with a helical gear 49S of which a rotary shaft is arranged in a direction intersecting with a rotary shaft of the helical gear 48S. An axis direction of the output shaft 47S of the clutch mechanism for slide 46S is converted by a combination of the helical gears 48S, 49S. On the other hand, an axis direction of an output shaft 47R of the clutch mechanism for recliner 46R is not converted.

The clutch mechanism for slide 46S corresponds to the first clutch mechanism 461 and is a regular-connection type. The clutch mechanism for tilt 46T, the clutch mechanism for lifter 46L and the clutch mechanism for recliner 46R correspond to the second clutch mechanism 462 and are a regular-disconnection type The respective members configuring the driving mechanism part of the driving device 40, such as the driving motor 41, the respective clutch mechanisms 46S, 46T, 46L, 46R and the like, are accommodated in a gear case half body 50a. The gear case half body 50a is covered with a gear case half body 50b, which are combined to form a gear case 50 becoming one box (refer to FIG. 7).

The operation mechanism part of FIG. 6 is configured by arranging the first clutch driving unit 511, the second clutch driving unit 512 (not shown) and the like and covering the same with a clutch cover 56. Also, a left side of the clutch cover 56 is arranged with the first switch operation unit 57, the second switch operation unit 58 (not shown) and the like, which are covered with a switch cover 65. Also, a left side of the switch cover 65 is arranged with a first operation knob 66 and a second operation knob 67.

FIG. 7 depicts a detailed configuration of the operation mechanism part of the driving device 40. A clutch pin for slide 51S, a clutch pin for tilt 51T, a clutch pin for lifter 51L and a clutch pin for recliner 51R are arranged with the gear case half body 50b being interposed therebetween, in correspondence to each of the clutch mechanisms 46S. 46T, 46L. 46R. The clutch pin for slide 51S corresponds to the first clutch driving unit 511. Also, the clutch pin for tilt 51T, the clutch pin for lifter 51L and the clutch pin for recliner 51R correspond to the second clutch driving unit 512.

Figure 10:
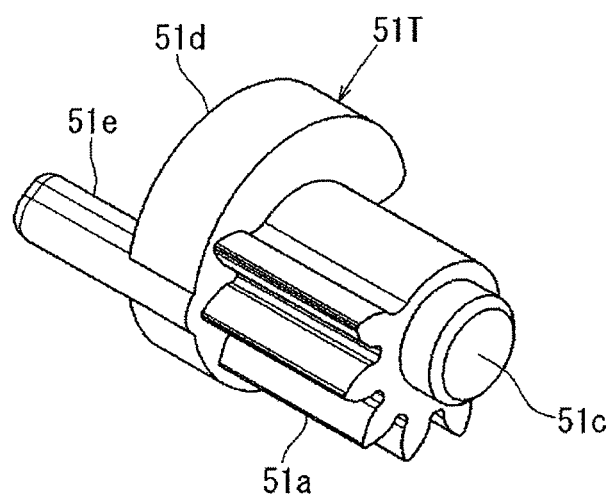
FIG. 10 is an enlarged perspective view of a clutch pin for tilt of the illustrative embodiment.
Figure 11:
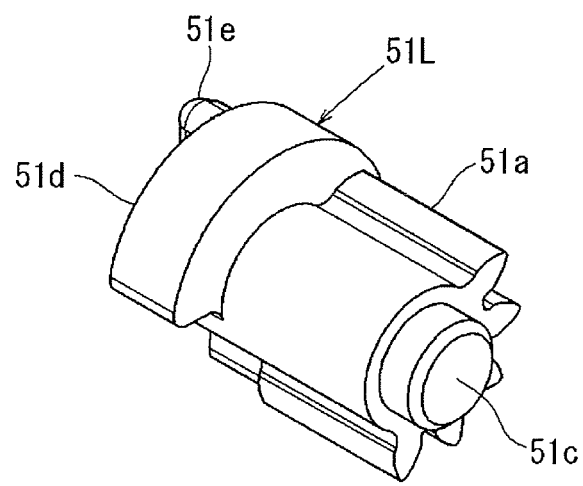
FIG. 11 is an enlarged perspective view of a clutch pin for lifter of the illustrative embodiment.
Figure 12:
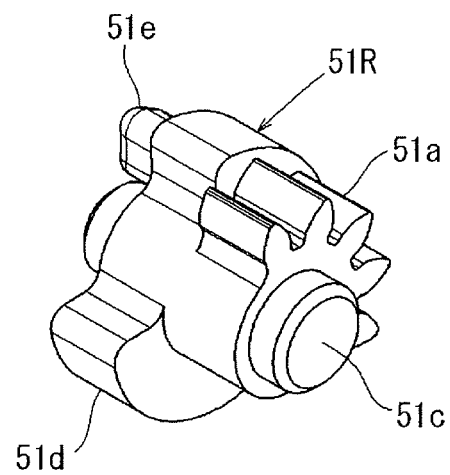
FIG. 12 is an enlarged perspective view of a clutch pin for recliner of the illustrative embodiment.

As shown in enlarged views of FIGS. 10 to 12, the clutch pin for tilt 51T, the clutch pin for lifter 51L and the clutch pin for recliner 51R have a gear part 51a, a protrusion 51e and a bulging part 51d, respectively. Each gear part 51a is formed about each rotary shaft 51c and is formed at a part of a surrounding of each rotary shaft 51c. Also, each protrusion 51e is formed at an eccentric position from each rotary shaft 51c. Also, the bulging part 51d is formed over about three fourth (¾) around the rotary shaft 51c. Each gear part 51a of the clutch pin for tilt 51T and the clutch pin for lifter 51L is formed to have a tooth width greater than that of each gear part 51a of the clutch pin for slide 51S and the clutch pin for recliner 51R.

Figure 9:
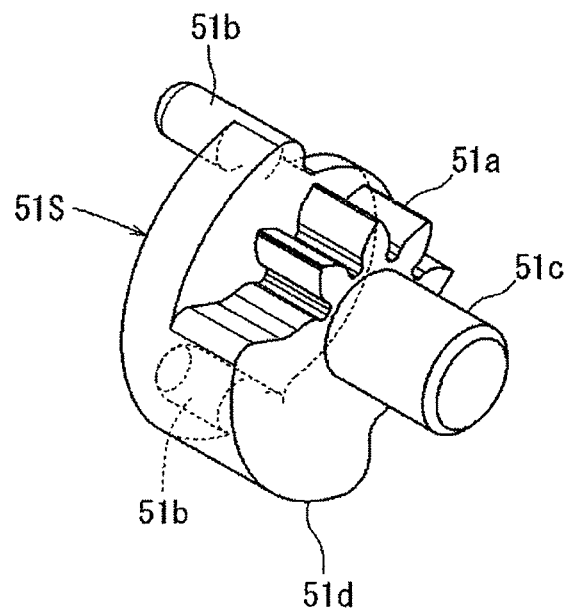
FIG. 9 is an enlarged perspective view of a clutch pin for slide of the illustrative embodiment.

In the meantime, as shown in an enlarged view of FIG. 9, the clutch pin for slide 51S has a similar structure to the clutch pin for tilt 51T, the clutch pin for lifter 51L and the clutch pin for recliner 51R. A main feature of the clutch pin for slide 51S is that a pair of protrusions 51b is provided at both end portions of a formation range of the bulging part 51d and the formation range of the bulging part 51d is about a half of the surrounding of the rotary shaft 51c.

The clutch pin for slide 51S, the clutch pin for tilt 51T, the clutch pin for lifter 51L and the clutch pin for recliner 51R are supported to a left surface of the gear case half body 50b so as to be rotatable about each rotary shaft 51c. The respective protrusions 51b, 51e are arranged to pass through the gear case half body 50b so that each of the clutch mechanisms 46S, 46T, 46L, 46R can be operated.

Figure 40:
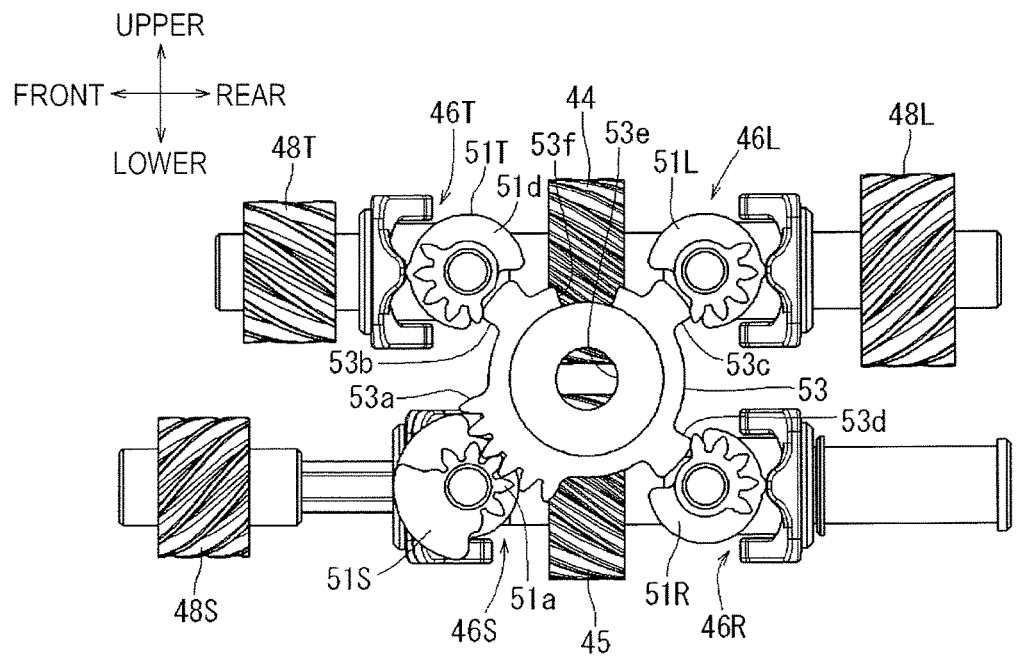
FIG. 40 is a left side view illustrating an actuation of a cooperation member of the illustrative embodiment.

On the left surface of the gear case half body 50b, a second center cam 53 is arranged at a center position surrounded by the clutch pin for slide 51S, the clutch pin for tilt 51T, the clutch pin for lifter 51L and the clutch pin for recliner 51R. The second center cam 53 corresponds to the cooperation member. As shown in an enlarged view of FIG. 40, the second center cam 53 has a circular disc shape as a whole and is formed at its center with a fitting hole 53e, which is a through-hole. Also, the second center cam 53 has a gear part 53a that is to mesh with the gear part 51a of the clutch pin for slide 51S. Also, the second center cam 53 has radial projections 53b, 53c, 53d, in correspondence to the bulging parts 51d of the clutch pin for tilt 51T, the clutch pin for lifter 51L and the clutch pin for recliner 51R. In the meantime, the second center cam 53 is formed with a notch 53f between the clutch pin for tilt 51T and the clutch pin for lifter 51L. The notch 53f has a shape opening upwards.

As shown in FIG. 7, the fitting hole 53e is fitted with a fitting projection 50c formed at a central portion of the left surface of the gear case half body 50b, so that the second center cam 53 is rotatably fixed. A first center cam 52 is arranged with overlapping on a left surface of the second center cam 53. As shown in an enlarged view of FIG. 45, the first center cam 52 has a circular disc shape as a whole, which is similar to the second center cam 53, and is formed at a center thereof with a fitting hole 52b, and a gear part 52a and a notch 52c are provided at a part of a periphery of the circular disc shape. Also, a rear and lower part of the first center cam 52 is provided with a notch 52d.

As shown in FIG. 7, an intermediate gear 54 is rotatably coupled to the rotary shaft 51c of the clutch pin for slide 51S. The intermediate gear 54 is meshed with the gear part 52a of the first center cam 52.

Figure 13:
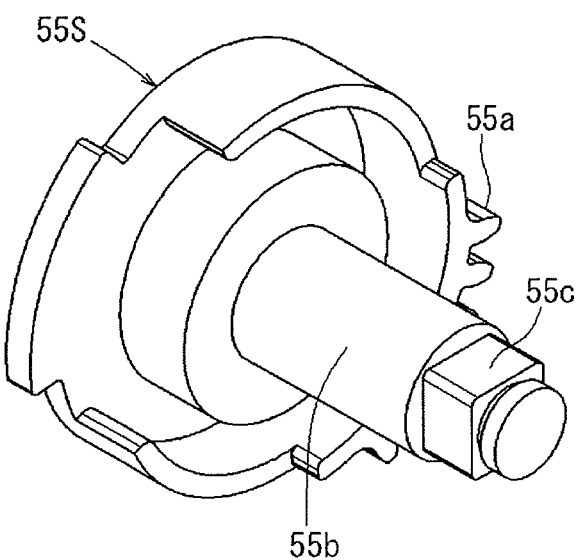
FIG. 13 is an enlarged perspective view of a drive gear for slide of the illustrative embodiment.
Figure 14:
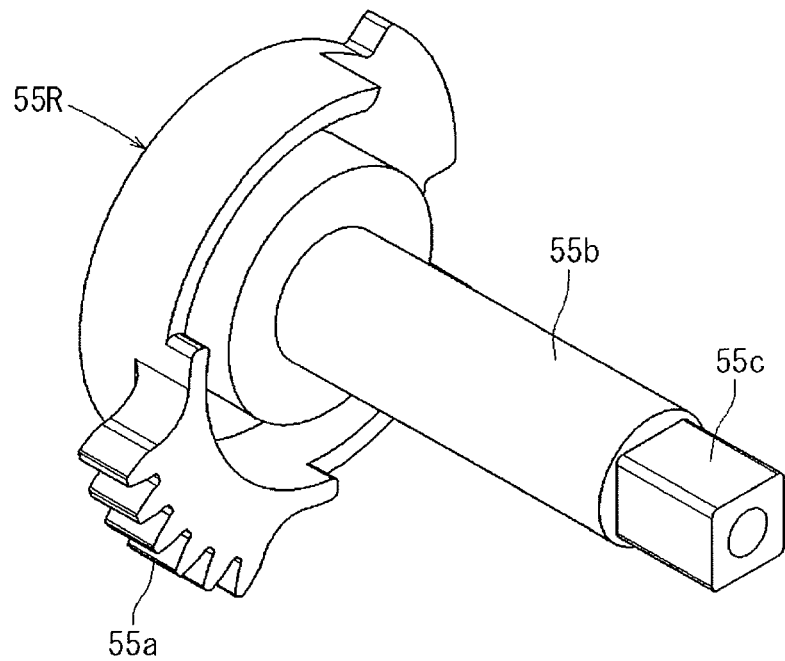
FIG. 14 is an enlarged perspective view of a drive gear for tilt of the illustrative embodiment.

On the left surface of the gear case half body 50b, a drive gear for slide 55S is arranged at a front side between the clutch pin for slide 51S and the clutch pin for tilt 51T. Also, on the left surface of the gear case half body 50b, a drive gear for recliner 55R is arranged at a rear side between the clutch pin for lifter 51L and the clutch pin for recliner 51R (refer to FIG. 45). As shown in enlarged views of FIGS. 13 and 14, the drive gear for slide 55S and the drive gear for recliner 55R have a gear part 55a, respectively. Each gear part 55a is formed about each rotary shaft 55b and is formed at a part of a surrounding of each rotary shaft 55b. Also, a tip end of each rotary shaft 55b is formed with a chamfered portion 55c having a square pillar shape.

Figure 15:
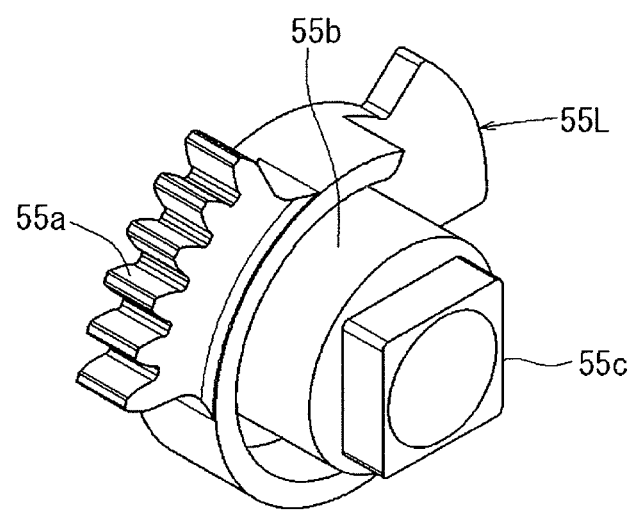
FIG. 15 is an enlarged perspective view of a drive gear for lifter of the illustrative embodiment.
Figure 16:
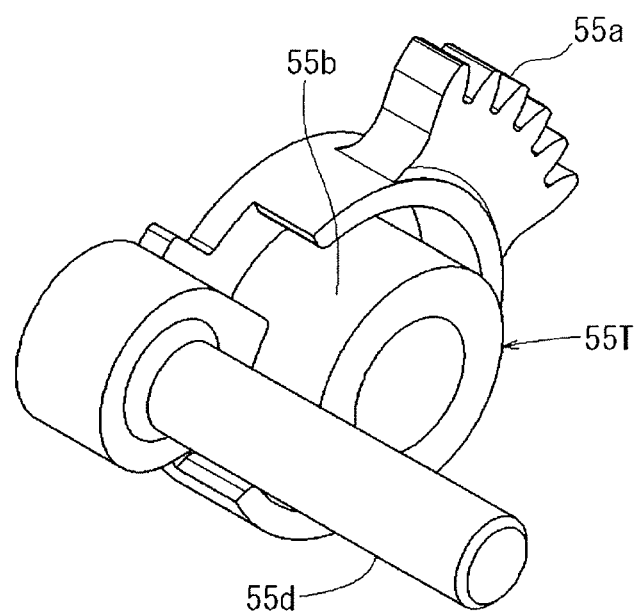
FIG. 16 is an enlarged perspective view of a drive gear for recliner of the illustrative embodiment.

As shown in FIG. 7, the drive gear for tilt 55T is arranged on the drive gear for slide 55S so that it covers the drive gear for slide 55S with the rotary shaft 55b penetrating the drive gear for tilt. Likewise, the drive gear for lifter 55L is arranged on the drive gear for recliner 55R so that it covers the drive gear for recliner 55R with the rotary shaft 55b penetrating the drive gear for lifter 55L. As shown in enlarged views of FIGS. 15 and 16, the drive gear for tilt 55T and the drive gear for lifter 55L have a gear part 55a, respectively. Each gear part 55a is formed about each rotary shaft 55b and is formed at a part of a surrounding of each rotary shaft 55b. Also, a tip end of the rotary shaft 55b of the drive gear for lifter 55L is formed with a chamfered portion 55c having a square pillar shape. Also, the drive gear for tilt 55T has a protrusion 55d, and the protrusion 55d protrudes leftwards at an eccentric position from the rotary shaft 55b.

As shown in FIG. 7, the drive gear for slide 55S and the drive gear for recliner 55R are rotatably supported on the left surface of the gear case half body 50b. The drive gear for tilt 55T and the drive gear for lifter 55L are supported to the drive gear for slide 55S and the drive gear for recliner 55R so as to be rotatable about each rotary shaft 55b.

Figure 45:
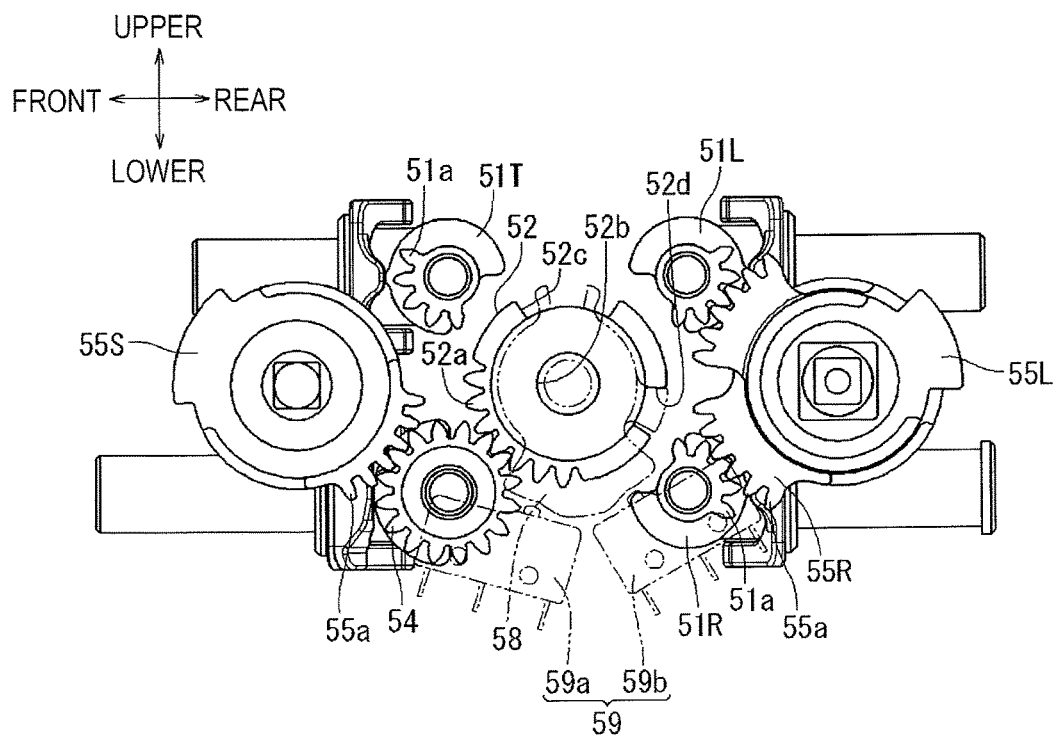
FIG. 45 illustrates an actuation of the switch upon the slide operation, in the illustrative embodiment.

As shown in FIG. 45, the gear part 55a of the drive gear for slide 55S is meshed with the intermediate gear 54. Also, the gear part 55a of the drive gear for recliner 55R is meshed with the gear part 51a of the clutch pin for recliner 51R. Therefore, when the drive gear for slide 55S is rotated, the first center cam 52 is rotated via the intermediate gear 54, so that the switch 59 is operated, as described later. Also, when the drive gear for recliner 55R is rotated, the clutch pin for recliner 51R is rotated, so that the clutch mechanism for recliner 46R comes into the connection state, as described later.

Figure 44:
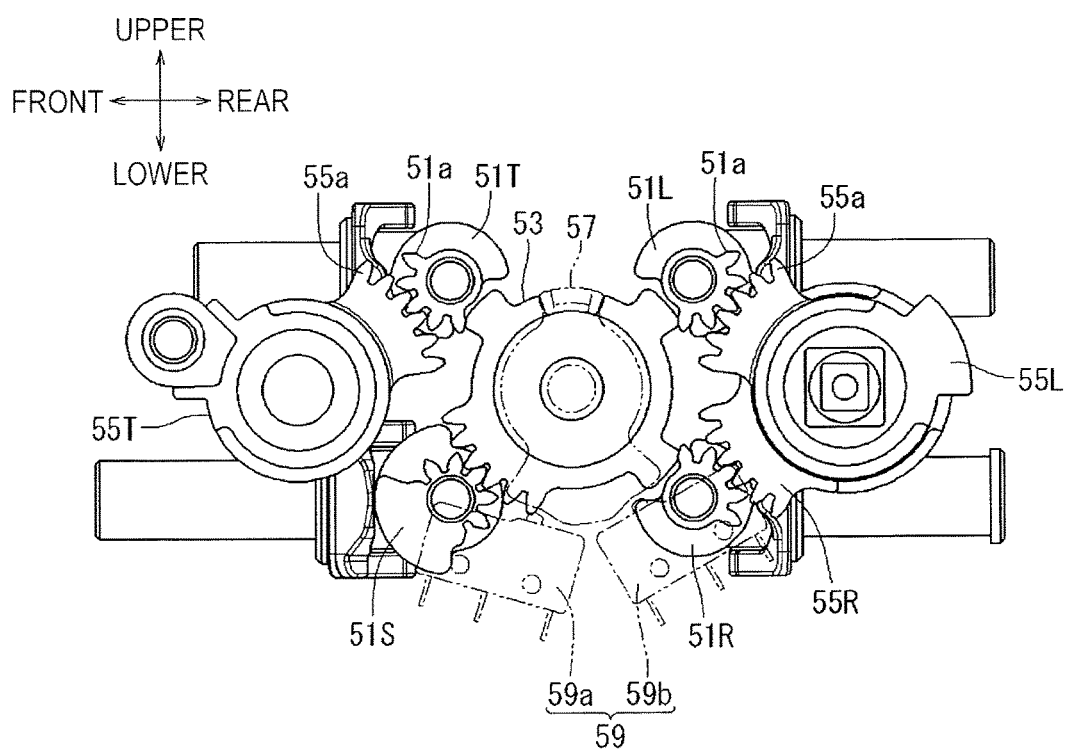
FIG. 44 illustrates an operation of a switch upon an operation other than a slide operation, in the illustrative embodiment.

As shown in FIG. 44, the gear part 55a of the drive gear for tilt 55T is meshed with the gear part 51a of the clutch pin for tilt 511T. Also, the gear part 55a of the drive gear for lifter 55L is meshed with the gear part 51a of the clutch pin for lifter 51L. Therefore, when the drive gear for tilt 55T is rotated, the clutch pin for tilt 51T is rotated, so that the clutch mechanism for tilt 46T comes into the connection state, as described later. Also, when the drive gear for lifter 55L is rotated, the clutch pin for lifter 51L is rotated, so that the clutch mechanism for lifter 46L comes into the connection state, as described later. In the meantime, the drive gear for slide 55S corresponds to the first operation member of the disclosure. Also, the drive gear for tilt 55T, the drive gear for lifter 55L and the drive gear for recliner 55R correspond to the second operation member of the disclosure.

Figure 41:
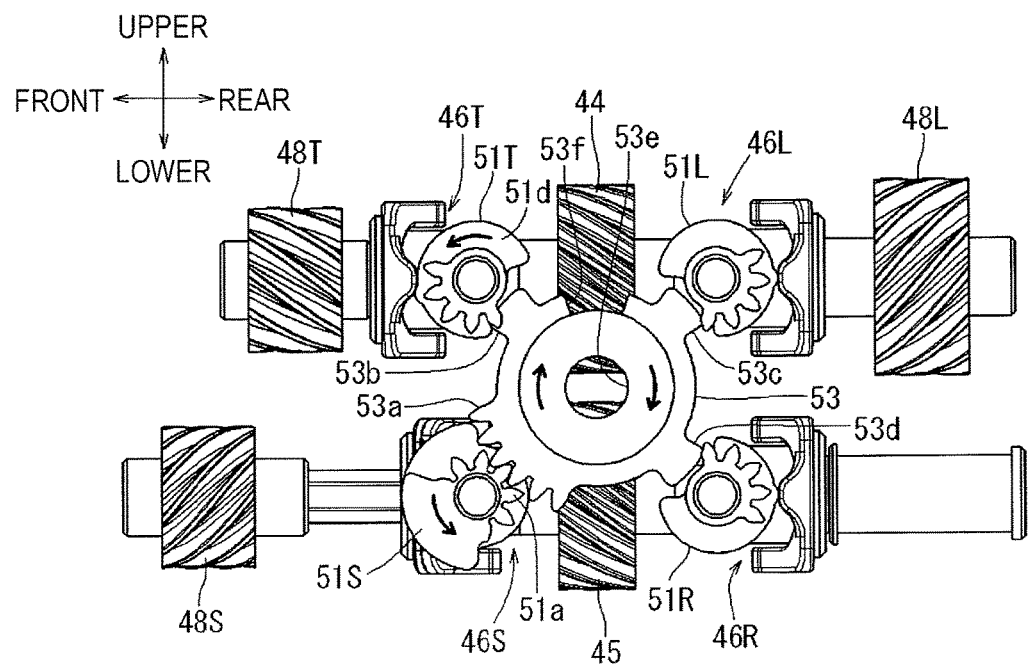
FIG. 41 is a left side view similar to FIG. 40, depicting an initial state during the actuation.
Figure 42:
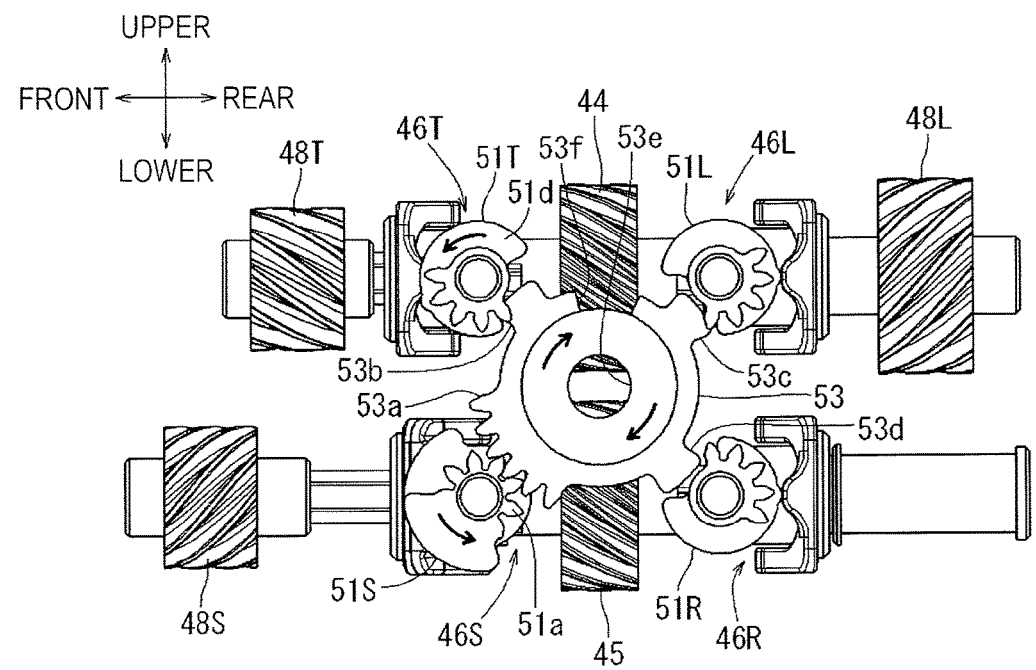
FIG. 42 is a left side view similar to FIG. 40, depicting a middle state during the actuation.
Figure 43:
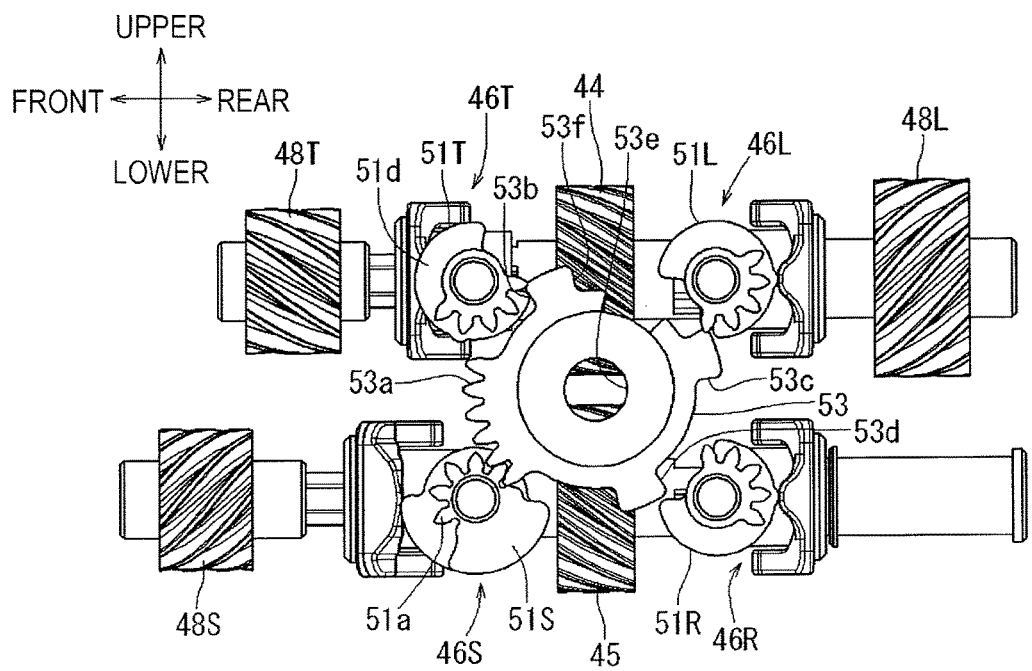
FIG. 43 is a left side view similar to FIG. 40, depicting an actuation-completed state.

FIGS. 40 to 43 illustrate a function of the second center cam 53. Herein, a case where the clutch pin for tilt 51T is rotated is shown. When the clutch pin for tilt 51T is rotated, the radial projection 53b of the second center cam 53 is pressed by the bulging part 51d of the clutch pin for tilt 51T and the second center cam 53 is rotated in a clockwise direction, as shown in FIGS. 41 and 42. As a result, the gear part 53a of the second center cam 53 rotates the clutch pin for slide 51S via the gear part 51a of the clutch pin for slide 51S. Also in cases where the clutch pin for lifter 51L and the clutch pin for recliner 51R are rotated, the clutch pin for slide 51S is rotated via the second center cam 53, like the case where the clutch pin for tilt 51T is rotated. In the meantime, a shape of each bulging part 51d of the clutch pin for tilt 51T, the clutch pin for lifter 51L and the clutch pin for recliner 51R and a shape of each of the radial projections 53b. 53c, 53d of the second center cam 53 are made so that an appropriate gap is provided therebetween. For this reason, although each of the radial projections 53b, 53c, 53d can be pressed by each bulging part 51d being rotated, each bulging part 51d cannot be pressed by each of the radial projections 53b. 53c, 53d being rotated.

In this way, the clutch pin for tilt 51T, the clutch pin for lifter 51L and the clutch pin for recliner 51R are individually rotated by the drive gear for tilt 55T, the drive gear for lifter 55L and the drive gear for recliner 55R. However, the clutch pin for slide 51S is not rotated by the drive gear for slide 55S but is rotated in conjunction with the rotation operation of any one of the clutch pin for tilt 51T, the clutch pin for lifter 51L and the clutch pin for recliner 51R.

Figure 30:
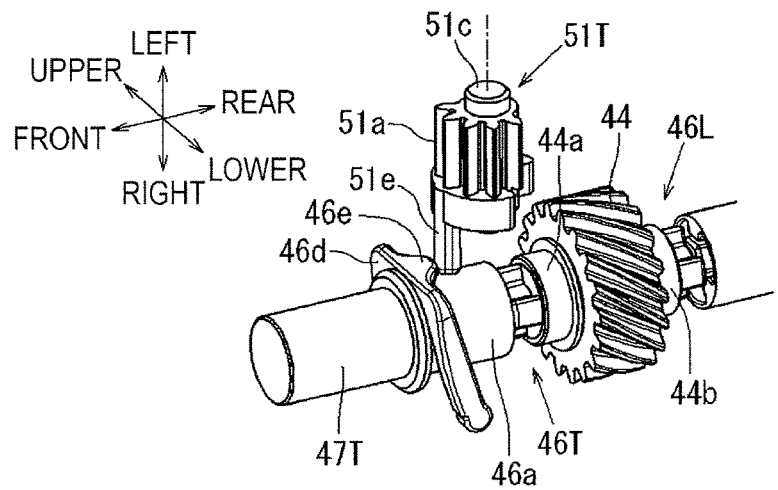
FIG. 30 is a perspective view illustrating an actuation of the clutch mechanism for tilt of the illustrative embodiment.
Figure 31:
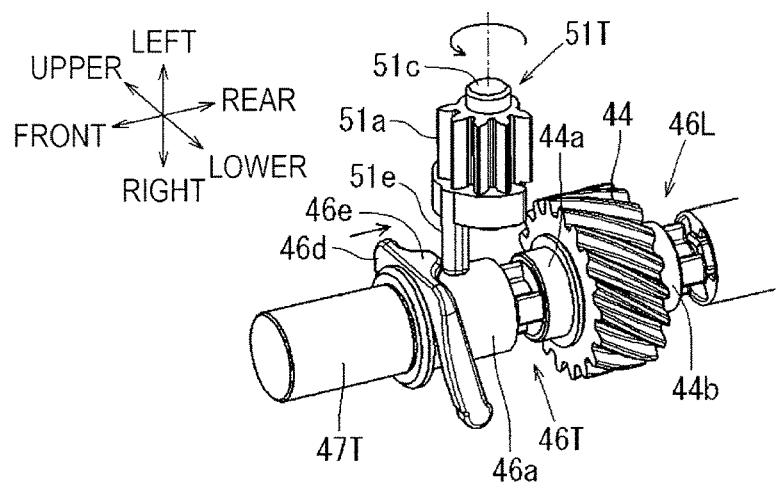
FIG. 31 is a perspective view similar to FIG. 30, depicting a state during an actuation.
Figure 32:
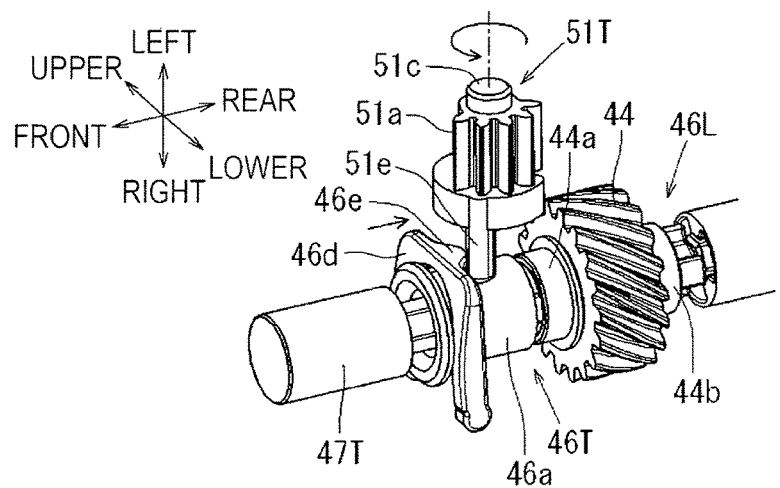
FIG. 32 is a perspective view similar to FIG. 30, depicting an actuation-completed state.

FIGS. 30 to 32 depict an aspect where the clutch mechanism for tilt 46T is switched from the disconnection state to the connection state by the rotation of the clutch pin for tilt 51T. FIG. 30 depicts an initial state before the clutch pin for tilt 51T is rotated. At this state, the protrusion 51e of the clutch pin for tilt 51T is in contact with a bulging part 46e of a second operation body 46d of the clutch mechanism for tilt 46T, so that the clutch mechanism for tilt 46T comes into the disconnection state. Then, as shown in FIG. 31, when the clutch pin for tilt 51T is rotated in a counterclockwise direction, the protrusion 51e of the clutch pin for tilt 51T deviates from the position at which it is in contact with the bulging part 46e of the second operation body 46d. As shown in FIG. 32, when the clutch pin for tilt 51T further is rotated, the protrusion 51e of the clutch pin for tilt 51T is located at a position at which it does not contact the bulging part 46e of the second operation body 46d. Here, in FIGS. 30 to 32, the clutch pin for tilt 51T and the clutch mechanism for tilt 46T have been described. However, the clutch pin for lifter 51L and the clutch mechanism for lifter 46L, and the clutch pin for recliner 51R and the clutch mechanism for recliner 46R are also configured in the same manner.

Figure 27:
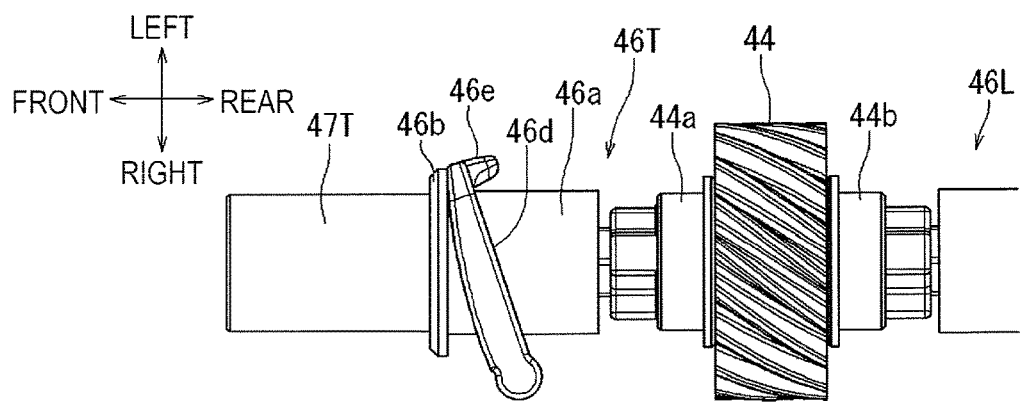
FIG. 27 is a bottom view illustrating an actuation of a clutch mechanism for tilt of the illustrative embodiment.
Figure 28:
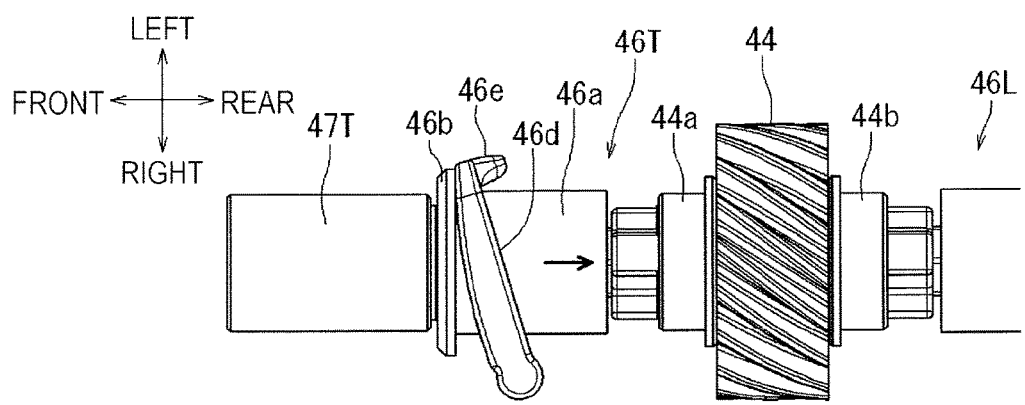
FIG. 28 is a bottom view similar to FIG. 27, depicting a state during an actuation.
Figure 29:
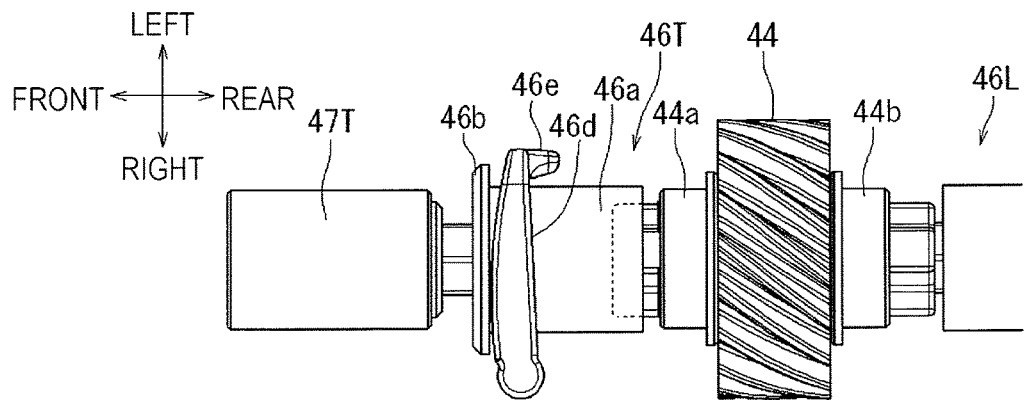
FIG. 29 is a bottom view similar to FIG. 27, depicting an actuation-completed state.

In FIGS. 27 to 29, the clutch pin for tilt 51T shown in FIGS. 30 to 32 is omitted. The clutch mechanism for tilt 46T has a coupling tube 46a, and causes the input shaft 44a and the output shaft 47T to come into the disconnection state at a state where the coupling tube 46a separates from the input shaft 44a, as shown in FIG. 27. On the other hand, at a state where the coupling tube 46a is fitted to the input shaft 44a, as shown in FIG. 29, the clutch mechanism for tilt 46T causes the input shaft 44a and the output shaft 47T to come into the connection state. The coupling tube 46a has a flange portion 46b at the output shaft 47T-side and is configured so that the flange portion 46b is to be pressed by the second operation body 46d. Specifically, the second operation body 46d has a gate shape of straddling over an outer periphery of the coupling tube 46a, and both end portions of a right side of the gate shape are coupled to the gear case half body 50a to be freely swingable. Although not shown, a compression spring is arranged between the coupling tube 46a and the output shaft 47T and is regularly urged in a direction of fitting the coupling tube 46a to the input shaft 44a. FIG. 28 corresponds to FIG. 31, and depicts a state during an operation where the clutch mechanism for tilt 46T is being switched from the disconnection state to the connection state. Therefore, FIG. 28 depicts a state during an operation where the coupling tube 46a is moving towards the input shaft 44a. Here, in FIGS. 27 to 29, the clutch mechanism for tilt 46T has been described. However, the clutch mechanism for lifter 46L and the clutch mechanism for recliner 46R are also configured in the same manner.

Figure 36:
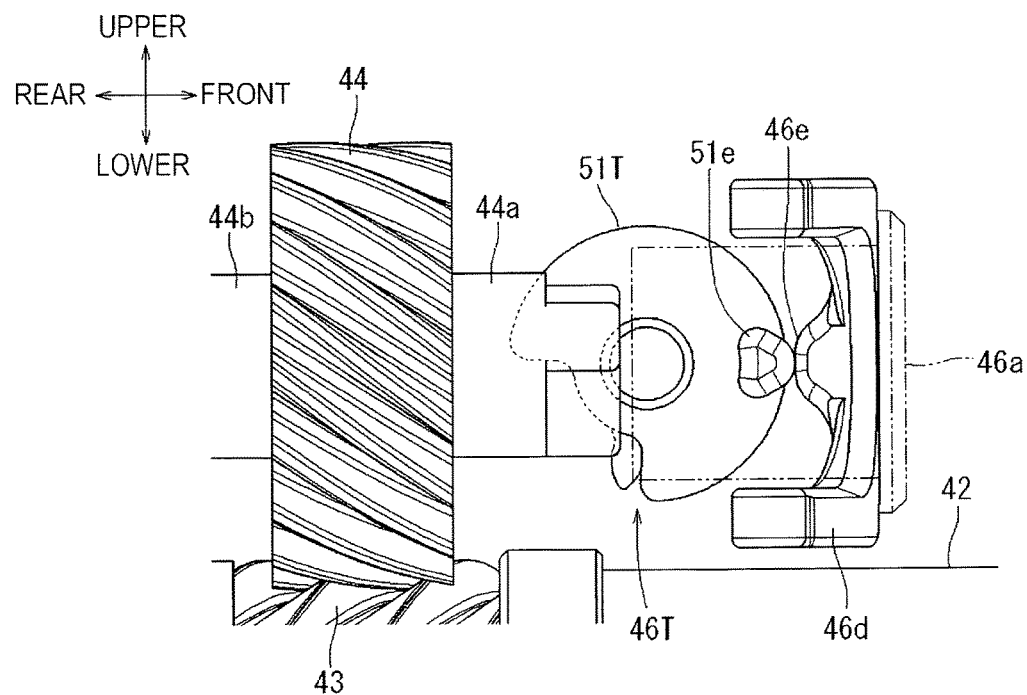
FIG. 36 is a right side view illustrating an actuation of the clutch pin for tilt of the illustrative embodiment.
Figure 37:
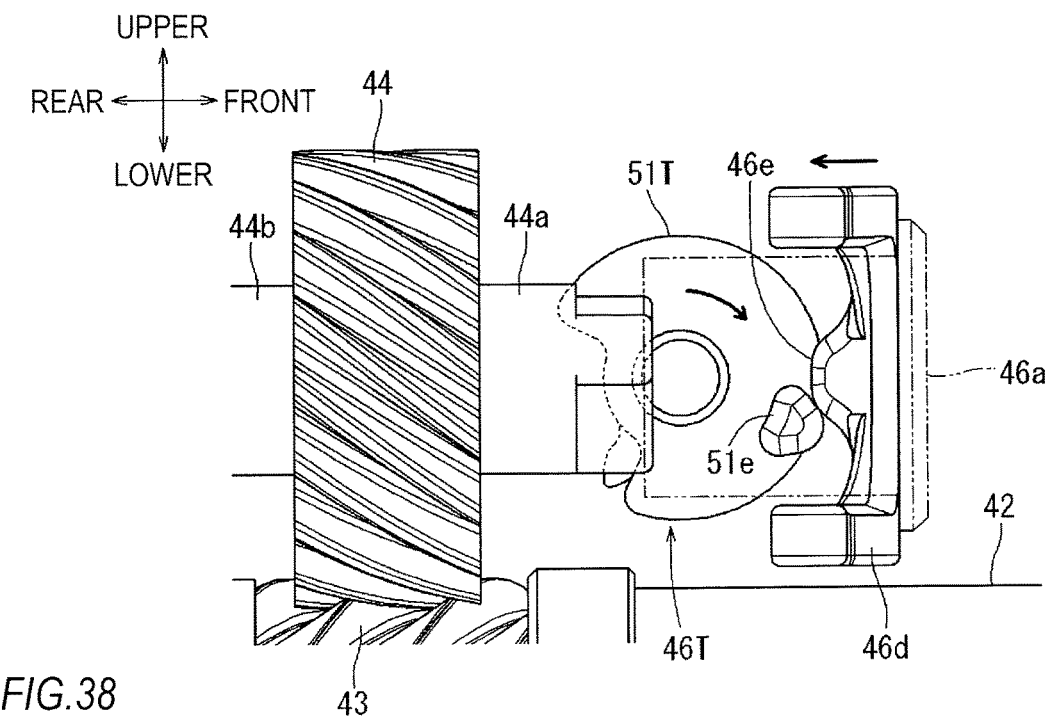
FIG. 37 is a right side view similar to FIG. 36, depicting an initial state during the actuation.
Figure 38:
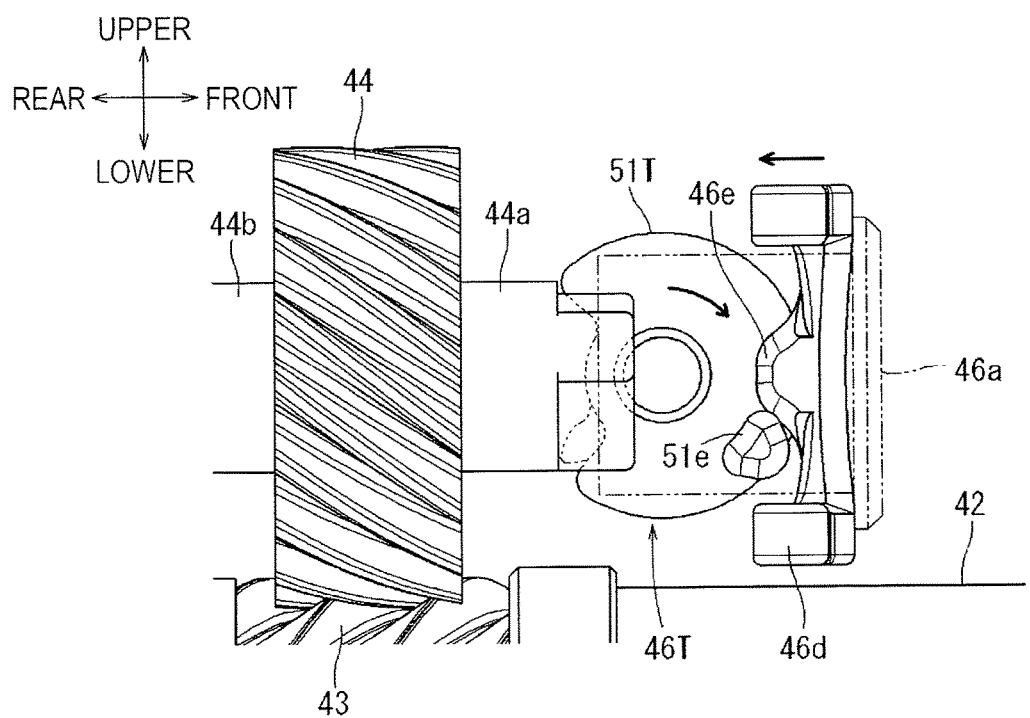
FIG. 38 is a right side view similar to FIG. 36, depicting a middle state during the actuation.
Figure 39:
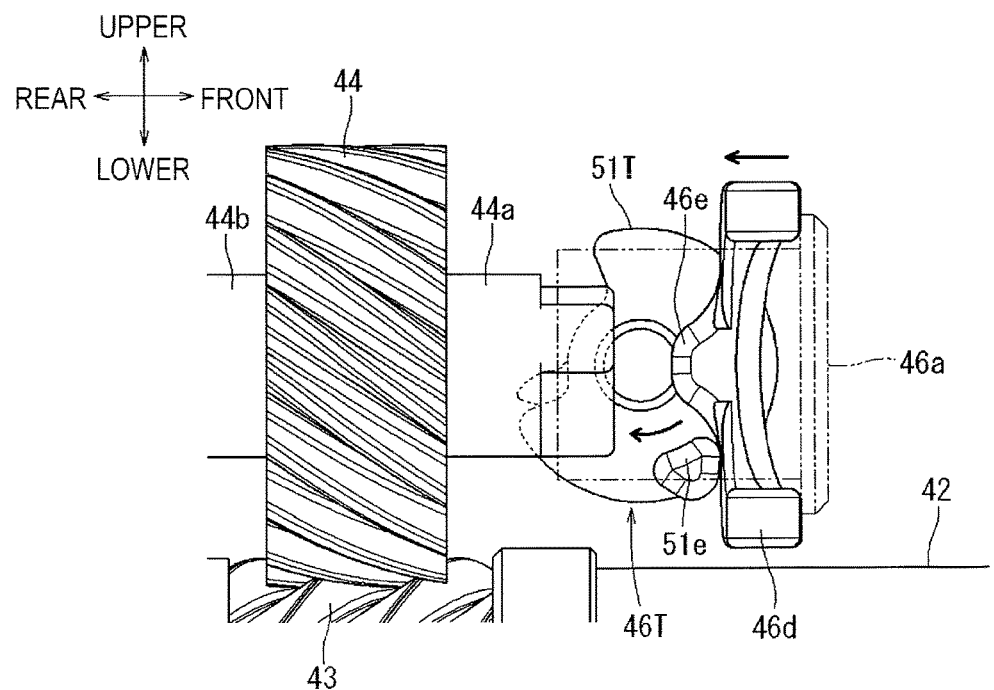
FIG. 39 is a right side view similar to FIG. 36, depicting an actuation-completed state.

FIGS. 36 to 39 depict an interaction between the protrusion 51e of the clutch pin for tilt 51T and the bulging part 46e of the second operation body 46d of the clutch mechanism for tilt 46T when the clutch pin for tilt SIT is rotated. FIG. 36 depicts a state where the protrusion 51e and the bulging part 46e are in straight contact with each other. At this state, the coupling tube 46a is pressed against the urging force of the compression spring (not shown) by the second operation body 46d, and the coupling tube 46a separates from the input shaft 44a. As shown in FIG. 37, when the clutch pin for tilt 51T is rotated in the clockwise direction, the protrusion 51e is moved to a side of the bulging part 46e, and the coupling tube 46a is moved rearwards by the urging force of the compression spring (not shown), together with the second operation body 46d. FIG. 38 depicts a state where the clutch pin for tilt 511T is further rotated in the clockwise direction, in which the coupling tube 46a comes closer to the input shaft 44a. FIG. 39 depicts a state where the rotation of the clutch pin for tilt 51T is over. At this state, the protrusion 51e is positioned at the side of the bulging part 46e and the coupling tube 46a is fitted to the input shaft 44a. That is, the clutch mechanism for tilt 46T comes into the connection state.

When the clutch pin for tilt 51T is rotated in the counterclockwise direction, the protrusion 51e is located at an opposite side to the bulging part 46e, so that the clutch mechanism for tilt 46T comes into the connection state. Here, the protrusion 51e corresponds to the regular-contact part of the disclosure. Also, in FIGS. 36 to 39, the clutch pin for tilt 51T and the clutch mechanism for tilt 46T have been described. However, the clutch pin for lifter 51L and the clutch mechanism for lifter 46L, and the clutch pin for recliner 51R and the clutch mechanism for recliner 46R are also configured in the same manner.

Figure 33:
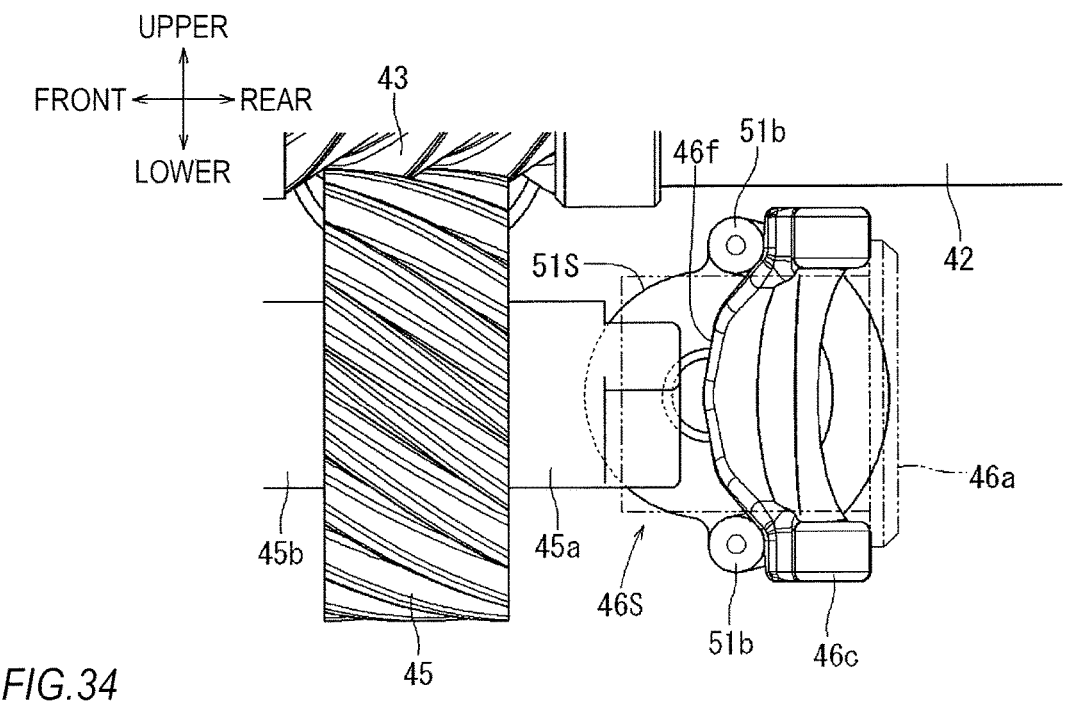
FIG. 33 is a right side view illustrating an actuation of the clutch pin for slide of the illustrative embodiment.
Figure 34:
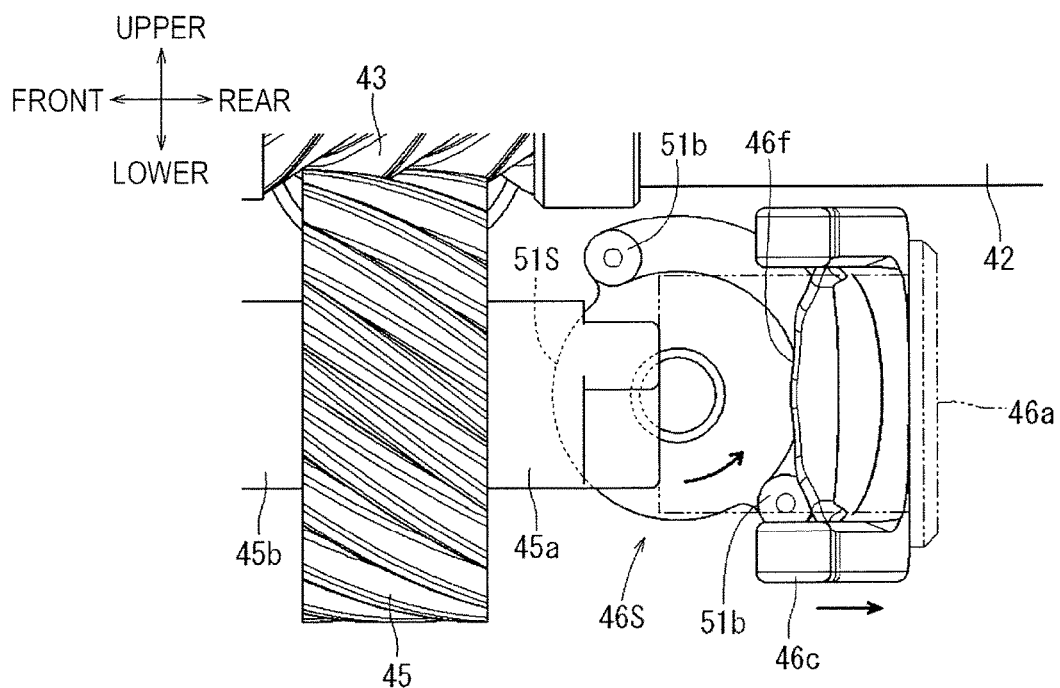
FIG. 34 is a right side view similar to FIG. 33, depicting a state during an actuation.
Figure 35:
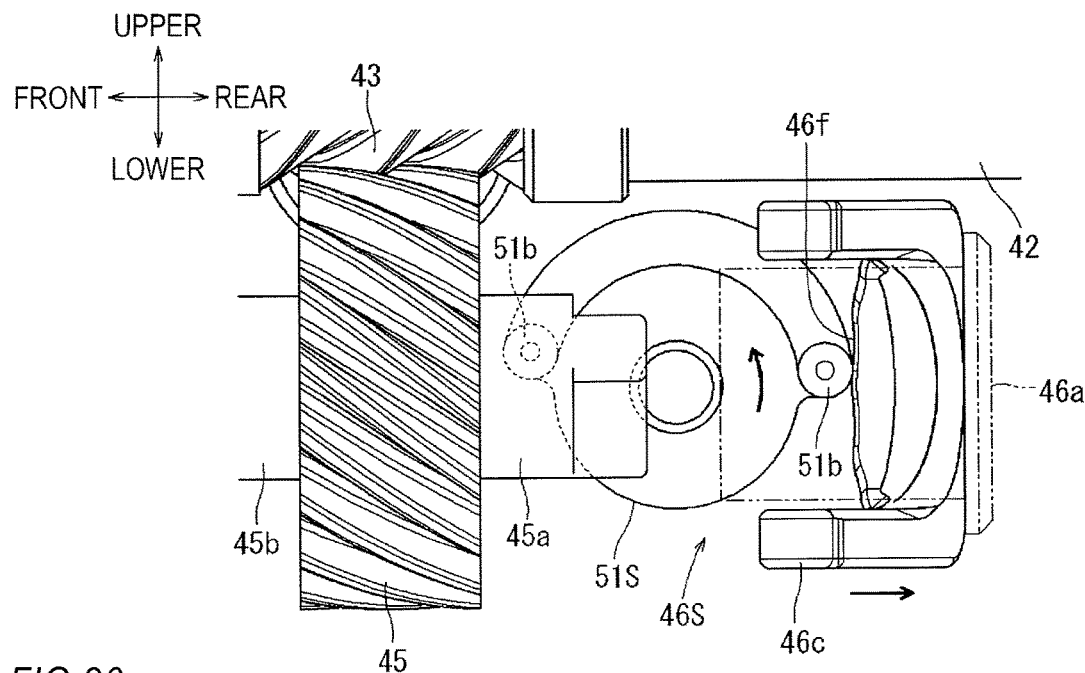
FIG. 35 is a right side view similar to FIG. 33, depicting an actuation-completed state.

FIGS. 33 to 35 depicts an interaction between the pair of protrusions 51b of the clutch pin for slide 51S and a bulging part 46f of a first operation body 46c of the clutch mechanism for slide 46S when the clutch pin for slide 51S is rotated. FIG. 33 depicts a state where the pair of protrusions 51b is in contact with both sides of the bulging part 46f. At this state, since the bulging part 46f is not pressed by the pair of protrusions 51b, the coupling tube 46a is maintained with being fitted to the input shaft 44a by the urging force of the compression spring (not shown). As shown in FIG. 34, when the clutch pin for slide 51S is rotated in the counterclockwise direction, one protrusion 51b starts to contact the bulging part 46f, and the coupling tube 46a is moved forward against the urging force of the compression spring (not shown), together with the first operation body 46c. FIG. 35 depicts a state where the rotation of the clutch pin for slide 51S is over. At this state, one protrusion 51b is located at a top portion of the bulging part 46f and the coupling tube 46a is completely separated from the input shaft 44a. That is, the clutch mechanism for slide 46S comes into the disconnection state.

When the clutch pin for slide 51S is rotated in an opposite direction to the above-described direction, the bulging part 46f is pressed by the other protrusion 51b of the pair of protrusions 51b, so that the clutch mechanism for slide 46S comes into the disconnection state. In the meantime, the pair of protrusions 51b corresponds to the first contact part and the second contact part of the disclosure.

Figure 17:
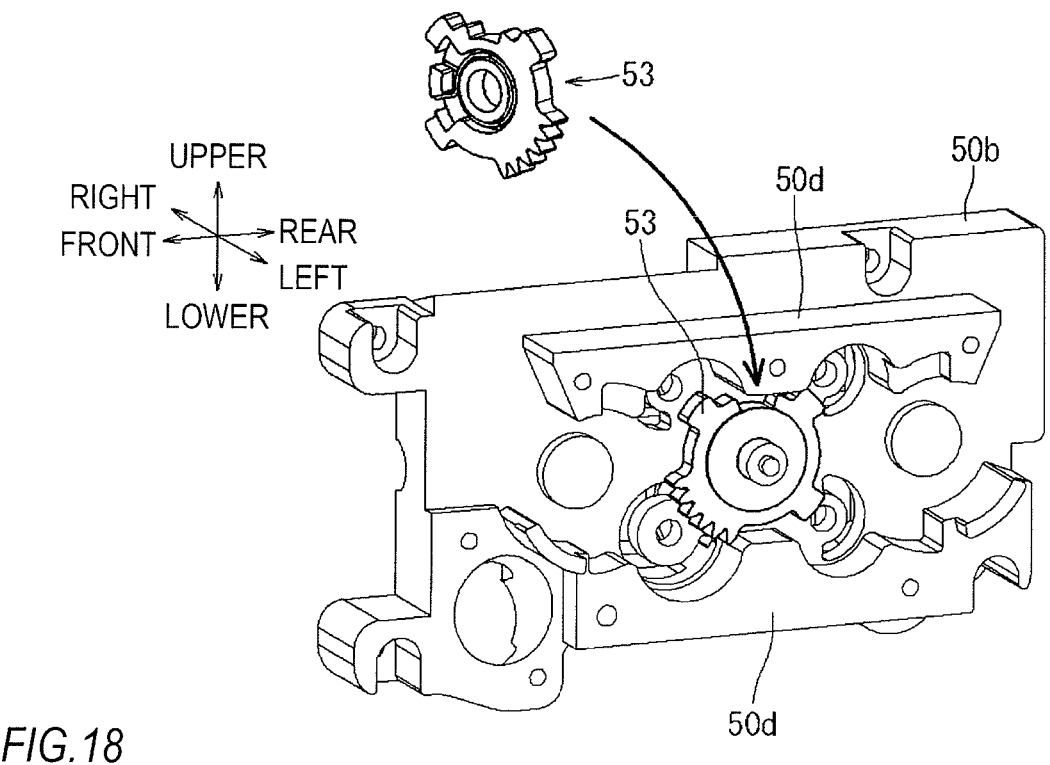
FIG. 17 is a perspective view illustrating an assembling sequence of the operation mechanism part of the illustrative embodiment.
Figure 18:
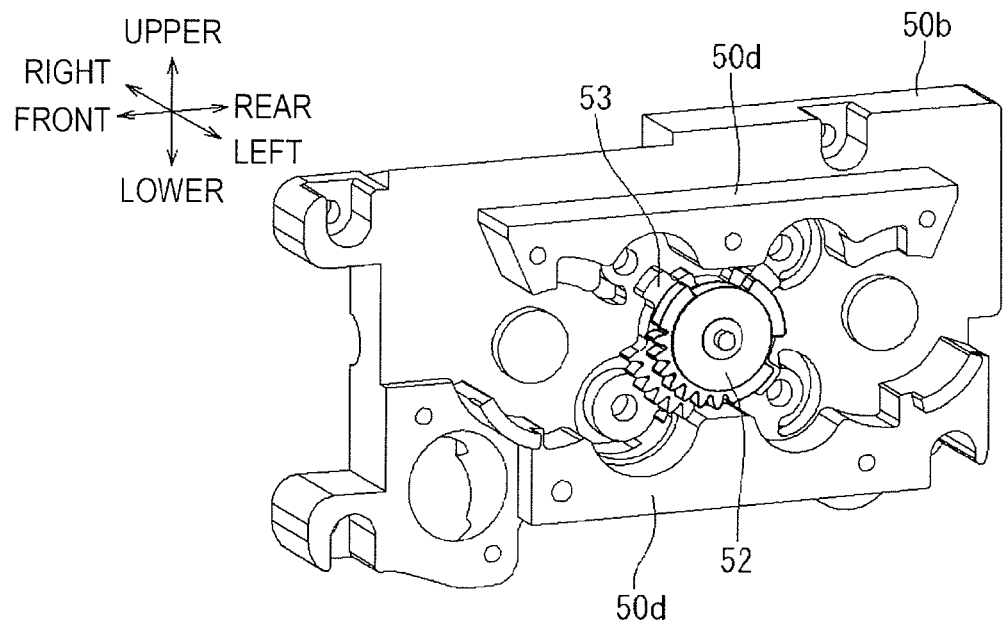
FIG. 18 is a perspective view similar to FIG. 17 illustrating an assembling sequence, depicting a second sequence.
Figure 19:
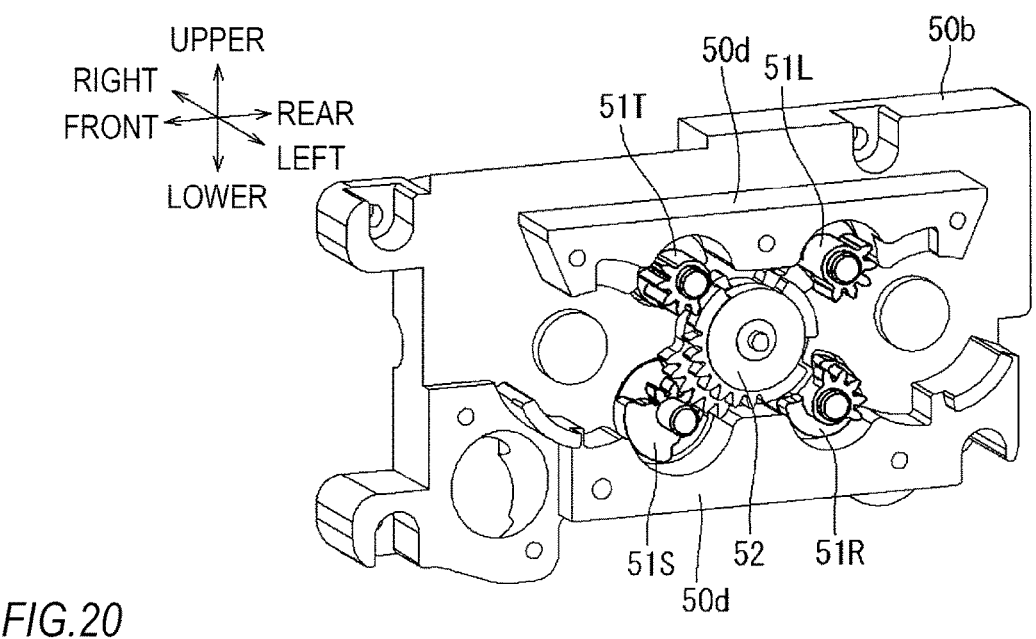
FIG. 19 is a perspective view similar to FIG. 17 illustrating an assembling sequence, depicting a third sequence.
Figure 20:
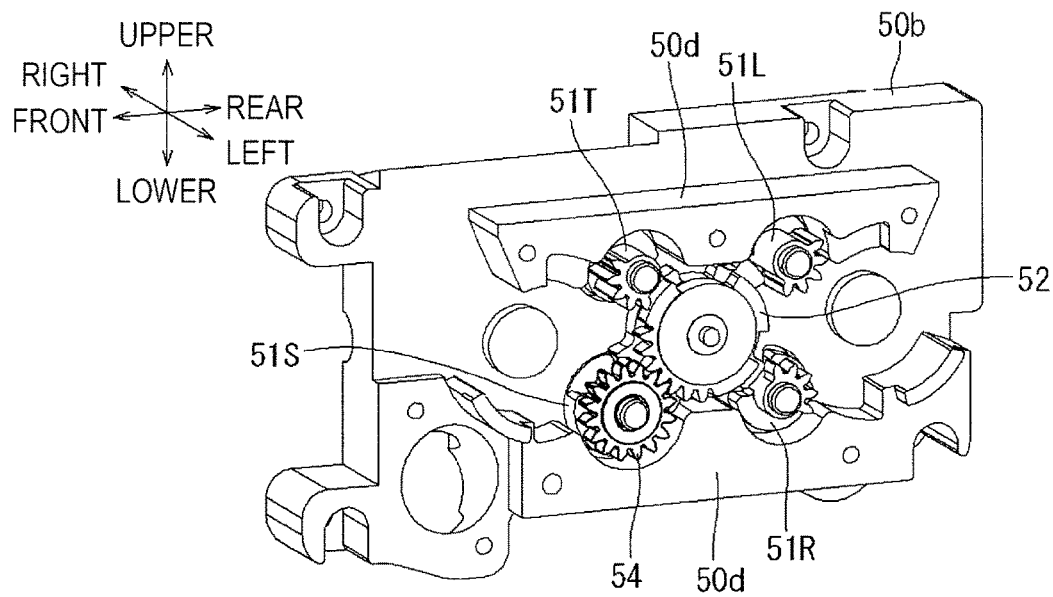
FIG. 20 is a perspective view similar to FIG. 17 illustrating an assembling sequence, depicting a fourth sequence.
Figure 21:
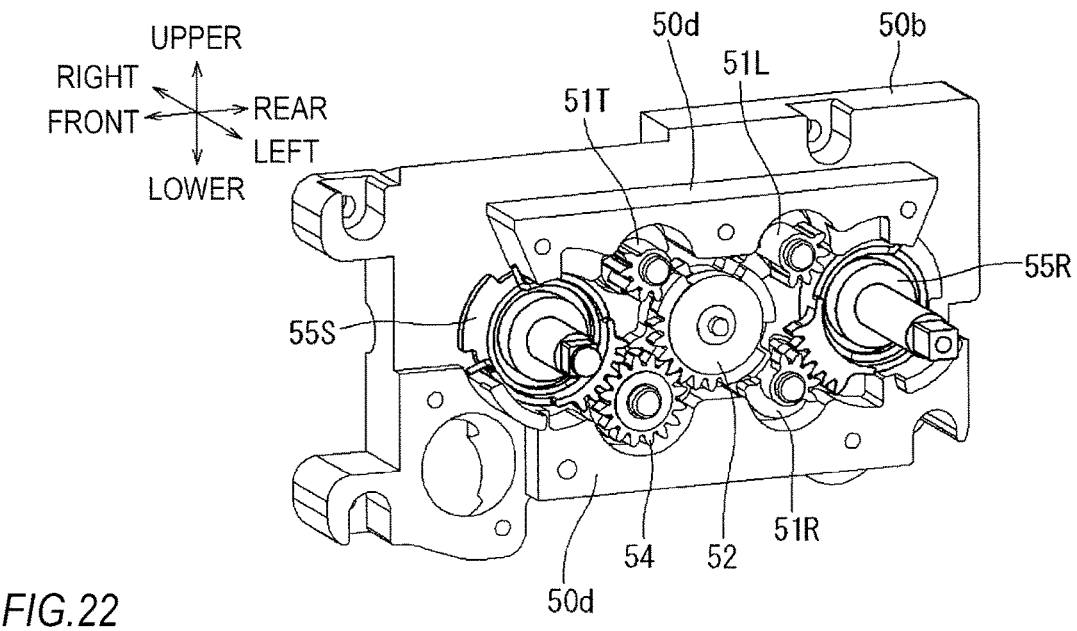
FIG. 21 is a perspective view similar to FIG. 17 illustrating an assembling sequence, depicting a fifth sequence.
Figure 22:
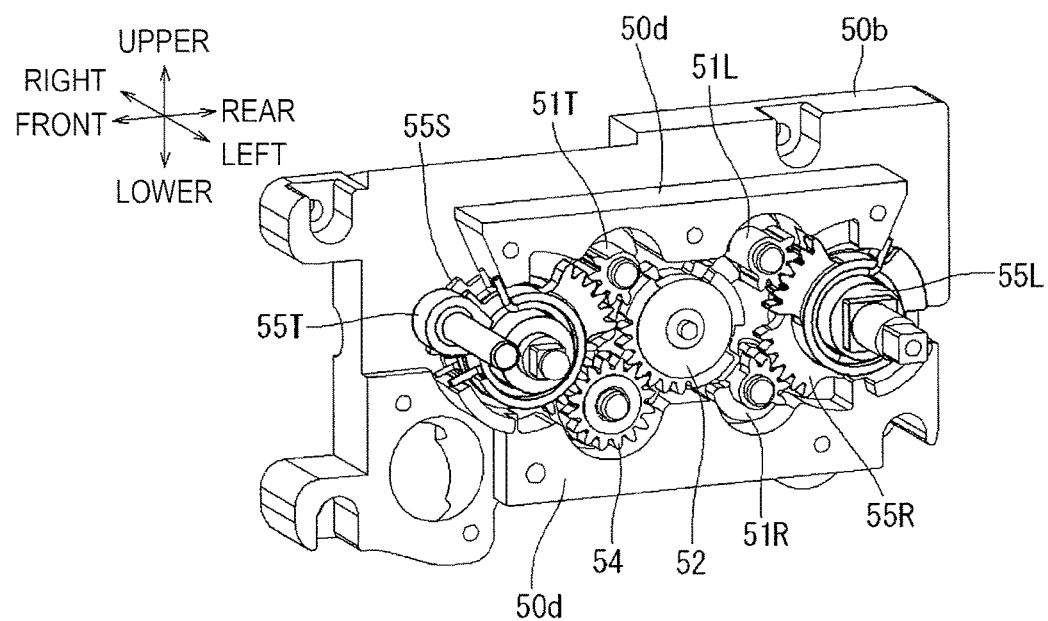
FIG. 22 is a perspective view similar to FIG. 17 illustrating an assembling sequence, depicting a sixth sequence.

FIGS. 17 to 22 depict a mounting sequence of each component to be mounted on the left surface of the gear case half body 50b. First, as shown in FIG. 17, the second center cam 53 is mounted on the left surface of the gear case half body 50b. Then, as shown in FIG. 18, the first center cam 52 is covered and mounted onto the second center cam 53. Then, as shown in FIG. 19, the clutch pin for slide 51S, the clutch pin for tilt 51T, the clutch pin for lifter 51L and the clutch pin for recliner 51R are mounted on the left surface of the gear case half body 50b, around the second center cam 53. Also, as shown in FIG. 20, the intermediate gear 54 is covered and mounted onto the clutch pin for slide 51S. Also, as shown in FIG. 21, the drive gear for slide 55S and the drive gear for recliner 55R are mounted to the front and rear sides on the left surface of the gear case half body 50b. Then, as shown in FIG. 22, the drive gear for tilt 55T is covered and mounted onto the drive gear for slide 55S. Also, the drive gear for lifter 55L is covered and mounted onto the drive gear for recliner 55R.

As shown in FIG. 22, protrusions 50d are formed with facing each other in the upper and lower direction at upper and lower parts of the left surface of the gear case half body 50b. The respective components to be mounted on the left surface of the gear case half body 50b are accommodated between the protrusions 50d.

As shown in FIG. 7, the drive gear for tilt 55T and the drive gear for lifter 55L are covered at the left thereof with a clutch cover 56. The clutch cover 56 is fixed with straddling over the respective protrusions 50d of the gear case half body 50b. End portions of the clutch cover 56 in the front and rear direction are formed with through-holes 56a, respectively. The rotary shaft 55b of the drive gear for slide 55S and the drive gear for tilt 55T overlapped with each other passes through the front through-hole 56a. Also, the rotary shaft 55b of the drive gear for recliner 55R and the drive gear for lifter 55L overlapped with each other passes through the rear through-hole 56a. Also, the clutch cover 56 is formed at its central part with a projection 56b protruding leftwards.

Figure 23:
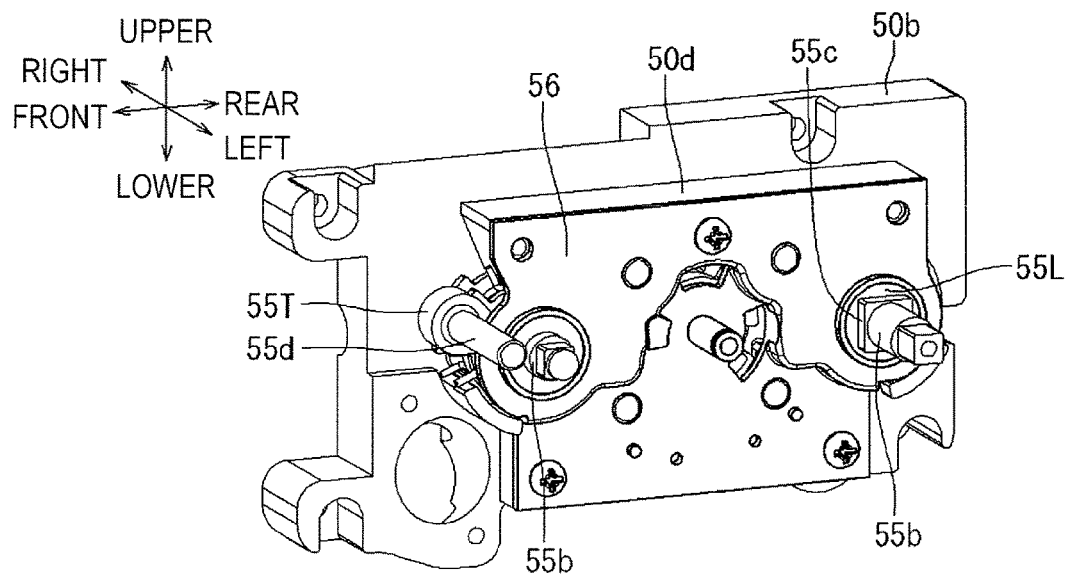
FIG. 23 is a perspective view similar to FIG. 17 illustrating an assembling sequence, depicting a seventh sequence.

FIG. 23 depicts a state where the clutch cover 56 is fixed to the respective protrusions 50d of the gear case half body 50b. At this state, the rotary shaft 55b of the drive gear for slide 55S protrudes from the front through-hole 56a, and the chamfered portion 55c of the drive gear for lifter 55L and the rotary shaft 55b of the drive gear for recliner 55R protrude from the rear through-hole 56a. Also, the protrusion 55d of the drive gear for tilt 55T protrudes leftwards from the front side of the clutch cover 56.

Figure 46:
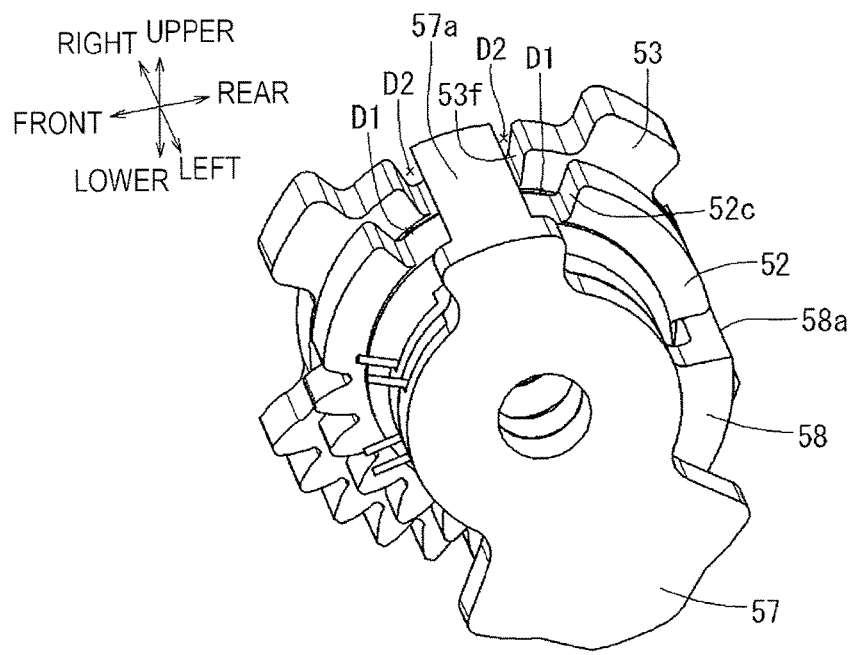
FIG. 46 is a perspective view depicting a relation between first and second driving bodies and a switch operation unit of the illustrative embodiment.
Figure 47:
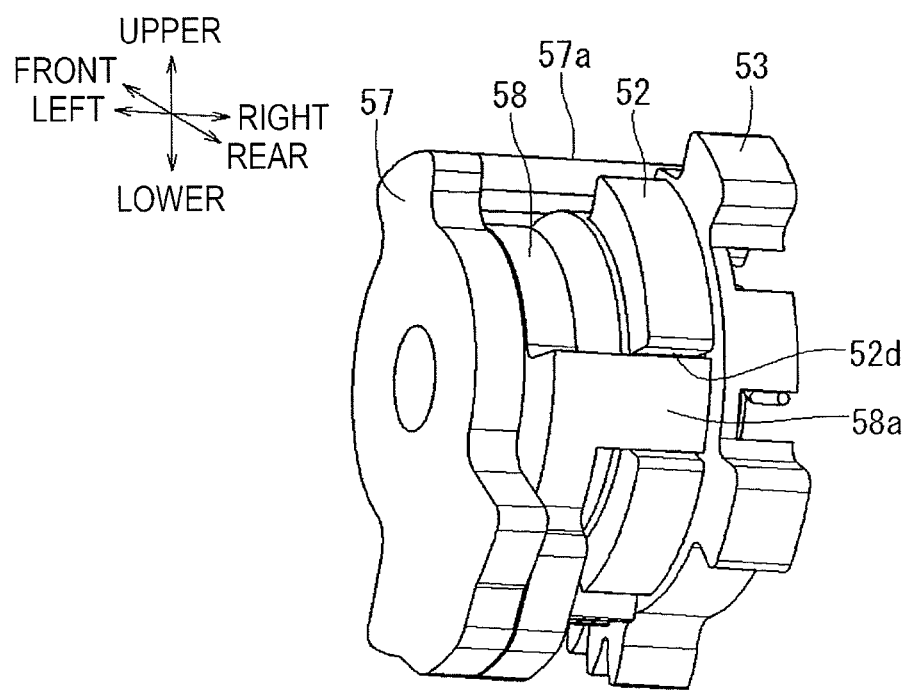
FIG. 47 is a perspective view as seen from an angle different from FIG. 46, depicting the relation between the first and second driving bodies and the switch operation unit, similarly to FIG. 46.
Figure 48:
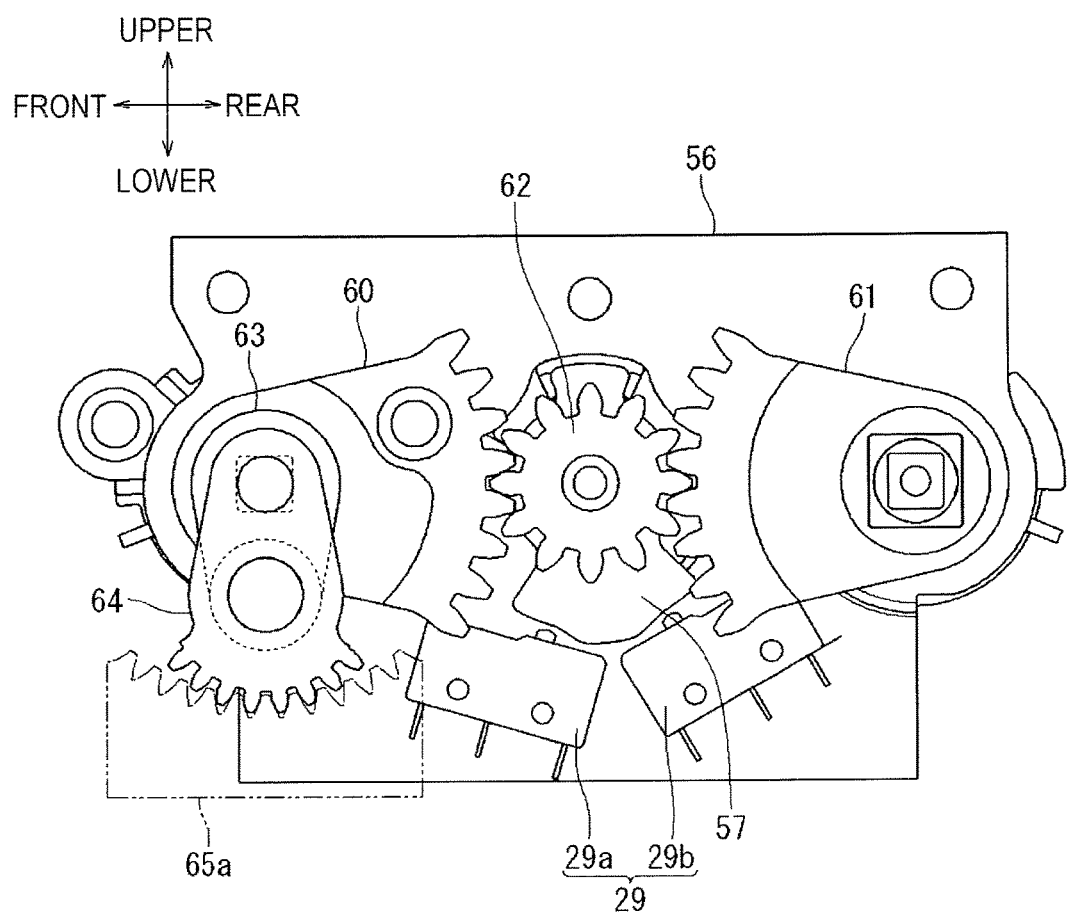
FIG. 48 is a left side view illustrating an actuation of an operation mechanism upon the slide operation, in the illustrative embodiment.

As shown in FIG. 7, the projection 56b of the clutch cover 56 passes through the second switch cam 58 and the first switch cam 57 overlapped with each other, so that the second switch cam 58 and the first switch cam 57 are arranged to be freely swingable. As shown in FIGS. 46 and 47, the second switch cam 58 is formed at its rear part with a coupling member 58a protruding rightwards. Also, as shown in FIGS. 46 and 47, the first switch cam 57 is formed at its upper part with a coupling member 57a protruding rightwards. The coupling member 58a and the coupling member 57a extend through the clutch cover 56, and a tip end portion of the coupling member 58a is fitted to the notch 52d of the first center cam 52. Also, a tip end portion of the coupling member 57a is fitted to the notch 52c of the first center cam 52 and the notch 53f of the second center cam 53. The coupling member 58a is fitted to the notch 52d without a gap therebetween, and the coupling member 57a is fitted to the notch 52c and the notch 53f with gaps D1, D2 therebetween. Herein, the gap D1 of the notch 52c is set greater than the gap D2 of the notch 53f. Meanwhile, in FIGS. 46 and 47, the clutch cover 56 is not shown. In the meantime, the notch 53f of the second center cam 53 corresponds to the engaging part of the disclosure.

Therefore, when the first center cam 52 is rotated, the rotation is immediately transmitted to the second switch cam 58 via the coupling member 58a. However, the rotation of the first center cam 52 is not transmitted to the first switch cam 57 due to the gap D1 of the notch 52c. On the other hand, when the second center cam 53 is rotated, the rotation is transmitted to the first switch cam 57 via the coupling member 57a. However, the transmission is delayed due to the gap D2 of the notch 53f. Also, when the first switch cam 57 is rotated by the second center cam 53, the rotation is not transmitted to the first center cam 52. The reason is that the rotation operation of the coupling member 57a is not transmitted to the first center cam 52 due to the gap D1 of the notch 52c.

In this way, the gap D2 is set for the notch 53f, so that the first switch cam 57 is rotated relative to the second center cam 53 with a time delay. Also, the gap D1 is set for the notch 52c, so that when the first center cam 52 is rotated, the rotation is not transmitted to the first switch cam 57 via the coupling member 57a. Also, when the first switch cam 57 is rotated by the second center cam 53, the rotation is not transmitted to the first center cam 52. Therefore, the gap D2 of the notch 53f corresponds to the delay structure of the disclosure, and the gap D1 of the notch 52c corresponds to the one-way structure of the disclosure. In the meantime, the first switch cam 57 corresponds to the switch operation unit, the first switch operation unit and the switch operation body of the disclosure. Also, the second switch cam 58 corresponds to the switch operation unit and the second switch operation unit of the disclosure. Also, the first center cam 52 corresponds to the first driving body of the disclosure, and the second center cam 53 corresponds to the second driving body of the disclosure.

In the illustrative embodiment, the first switch cam 57 and the second switch cam 58 are provided with the coupling members 57a, 0.58a, the second center cam 53 and the first center cam 52 are provided with the notches 53f, 52c, and the rotations of the second center cam 53 and the first center cam 52 are transmitted to the first switch cam 57 and the second switch cam 58. However, the configuration may be modified as follows. That is, the second center cam 53 and the first center cam 52 may be provided with the coupling members 57a. 58a, the first switch cam 57 and the second switch cam 58 may be provided with the notches 53f, 52c, and the rotations of the second center cam 53 and the first center cam 52 may be transmitted to the first switch cam 57 and the second switch cam 58.

Figure 24:
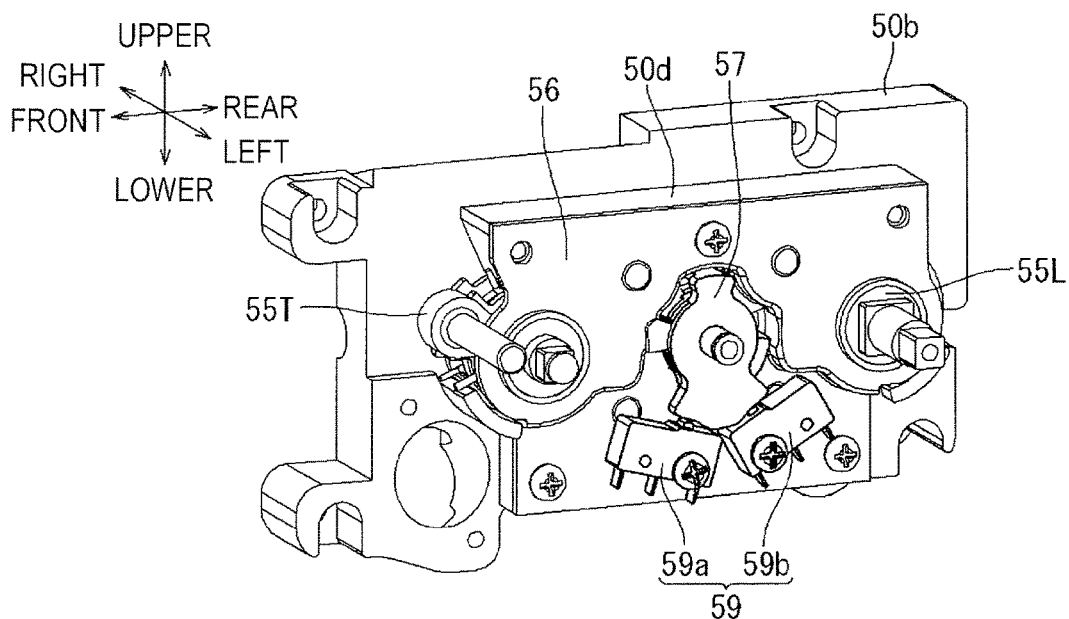
FIG. 24 is a perspective view similar to FIG. 17 illustrating an assembling sequence, depicting an eighth sequence.

As shown in FIG. 24, when the second switch cam 58 and the first switch cam 57 are arranged on the clutch cover 56, a pair of limit switches 59a. 59b is fixed below the second switch cam 58 and the first switch cam 57 on the left surface of the clutch cover 56. The limit switches 59a, 59b are configured so that when the first switch cam 57 and the second switch cam 58 are rotated, an operating circuit of the driving motor 41 is closed. The driving motor 41 are rotated in opposite directions between the operating circuit of the driving motor 41, which is to be closed when the limit switch 59a is operated, and the operating circuit of the driving motor 41, which is to be closed when the limit switch 59b is operated.

As shown in FIG. 7, a first sector gear 60 and a second sector gear 61 each having a fan shape are arranged to face each other at left sides of the respective through-holes 56a of the clutch cover 56. A fitting hole 60b of the first sector gear 60 is fitted with the rotary shaft 55b of the drive gear for slide 55S protruding from the through-hole 56a, so that the first sector gear 60 can be freely rotated. Also, the chamfered portion 55c of the drive gear for lifter 55L protruding from the through-hole 56a is coupled with a square hole 61b of the second sector gear 61. An intermediate gear 62 is interposed and meshed between a gear part 60a of the first sector gear 60 and a gear part 61a of the second sector gear 61. Therefore, when the first sector gear 60 is rotated about the rotary shaft 55b of the drive gear for slide 55S, which serves as a hinge pin, the rotation is transmitted to the second sector gear 61 via the intermediate gear 62, and the second sector gear 61 rotates the drive gear for lifter 55L through the square hole 61b and the chamfered portion 55c. In the meantime, a protrusion 60c protruding leftwards is provided at a part close to the gear part 60a of the first sector gear 60.

Figure 25:
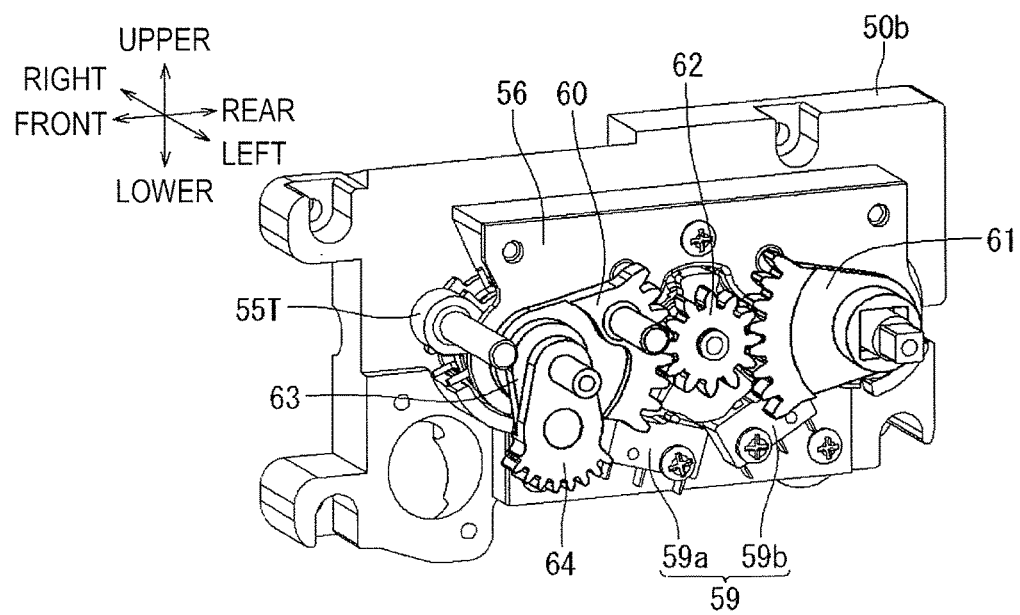
FIG. 25 is a perspective view similar to FIG. 17 illustrating an assembling sequence, depicting a ninth sequence.
Figure 26:
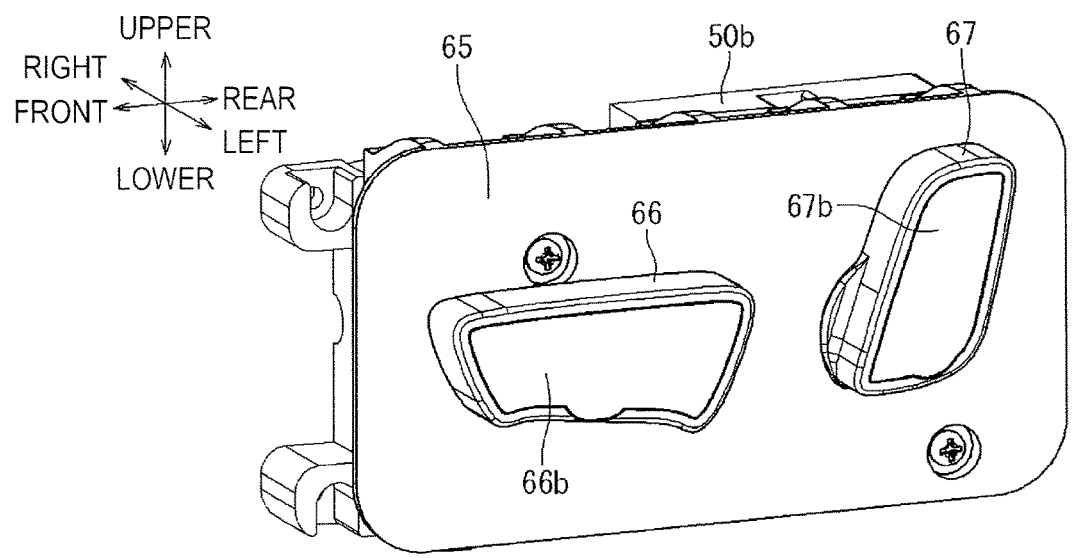
FIG. 26 is a perspective view similar to FIG. 17 illustrating an assembling sequence, depicting a tenth sequence.

At the left of the fitting hole 60b of the first sector gear 60, a link 63 and a link gear 64 are arranged while overlapping with each other. This state is shown in FIG. 25. Also, at the left of the link gear 64, a switch cover 65 is covered thereto. The switch cover 65 is fixed to the gear case half body 50b with covering all the components arranged at the left of the gear case 50, including the clutch cover 56. Also, at the left of the switch cover 65, a first operation knob 66 and a second operation knob 67 are arranged. FIG. 26 depicts an aspect of the first operation knob 66 and the second operation knob 67 arranged on a surface of the switch cover 65.

As shown in FIG. 7, the link 63 has a substantially elliptical shape, which is long in the upper and lower direction, and is provided at its lower part with a fitting projection 63a and at its upper part with a square hole 63b. Also, the link gear 64 has a substantially fan shape, which opens downwards, and is provided at its upper part with a protrusion 64a protruding leftwards, at its lower part with a fitting hole 64c and at its lower end portion with a gear part 64b. The fitting projection 63a of the link 63 is fitted to the fitting hole 64c of the link gear 64 so that they are coupled to be freely rotatable. In the meantime, the square hole 63b of the link 63 is fitted with the chamfered portion 55c of the drive gear for slide 55S and is thus coupled thereto in the rotation direction. Also, the protrusion 64a of the link gear 64 passes through the switch cover 65 and is fixed to a central portion of the first operation knob 66 by a screw 66a.

Figure 51:
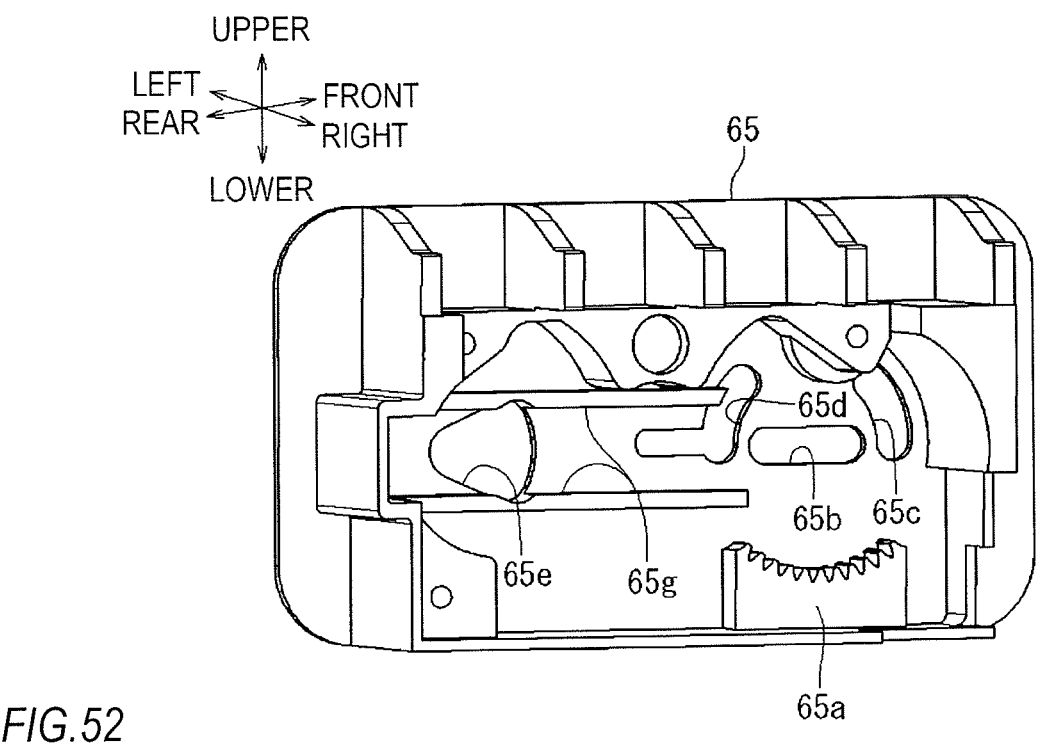
FIG. 51 is a perspective view of a backside of a switch cover of the illustrative embodiment.

FIG. 51 depicts a shape of a right surface of the switch cover 65. The switch cover 65 is formed on a plate surface thereof with a plurality of through-holes 65b to 65e. The through-hole 65b is formed at a position at which the protrusion 64a is to pass therethrough, and the through-hole 65c is formed at a position at which the protrusion 55d of the drive gear for lifter 55L is to pass therethrough. Also, the through-hole 65d is formed at a position at which the protrusion 60c of the first sector gear 60 is to pass therethrough, and the through-hole 65e is formed at a position at which the rotary shaft 55b of the drive gear for recliner 55R is to pass therethrough. In the meantime, a trochoid cam gear 65a is formed to face upwards below the through-hole 65b.

Figure 52:
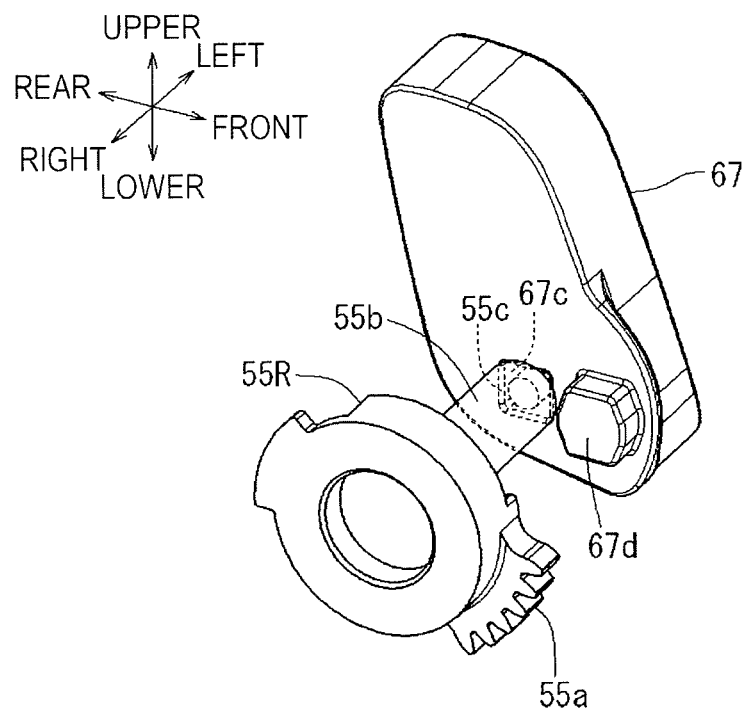
FIG. 52 is an enlarged perspective view of a second operation knob of the illustrative embodiment.

FIG. 52 depicts a shape of a right surface of the second operation knob 67. The second operation knob 67 is formed at its lower and central part with a square hole 67c configured to accommodate therein the chamfered portion 55c of the drive gear for recliner 55R. At a state where the chamfered portion 55c is fitted in the square hole 67c, the drive gear for recliner 55R is fastened by a screw 67a (refer to FIG. 7) and is fixed to the second operation knob 67. Also, the second operation knob 67 is formed at its lower and front part with a protrusion 67d protruding rightwards. Therefore, the second operation knob 67 is configured to rotate about the rotary shaft 55b of the drive gear for recliner 55R and to rotate the drive gear for recliner 55R. At this time, a movement range of the protrusion 67d is restrained within the through-hole 65e of the switch cover 65, so that a rotation range of the second operation knob 67 is restrained. In the meantime, a left surface of the second operation knob 67 is covered with a knob cover 67b so as to hide the screw 67a (refer to FIG. 7).

Figure 53:
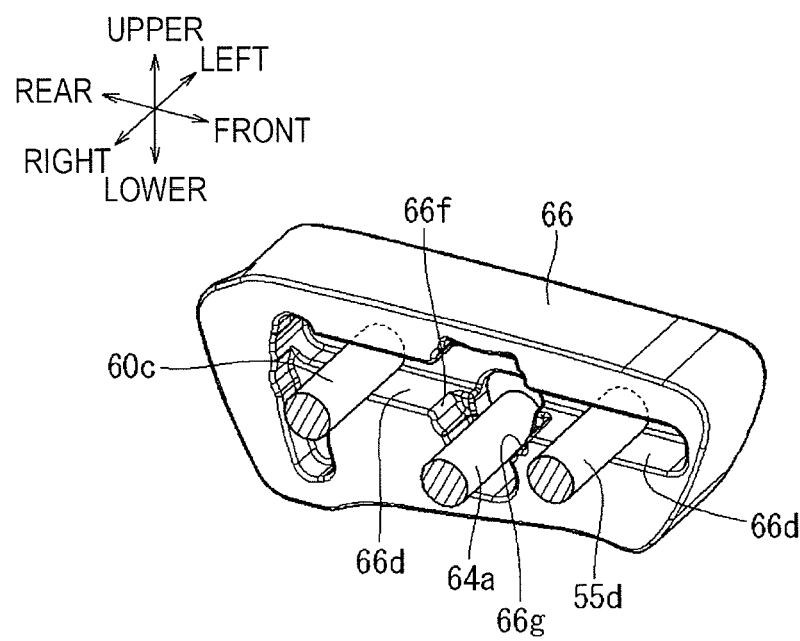
FIG. 53 is an enlarged perspective view of a first operation knob of the illustrative embodiment.

FIG. 53 depicts a shape of a right surface of the first operation knob 66. The first operation knob 66 is coupled at its central and lower part with the protrusion 64a of the link gear 64. Herein, a tip end of the protrusion 64a is fitted with a washer 66c and a screw 66a is fastened thereto (refer to FIG. 7). The first operation knob 66 is fitted between the washer 66c and the protrusion 64a and is configured to freely move in a seesaw manner about the protrusion 64a. Also, the first operation knob 66 is configured to be freely slidable in the front and rear direction through the through-hole 65b extending in the front and rear direction.

Also, the first operation knob 66 is coupled at its front and upper part with the protrusion 55d of the drive gear for tilt 55T. Also, the first operation knob 66 is coupled at its rear and upper part with the protrusion 60c of the first sector gear 60.

Figure 49:
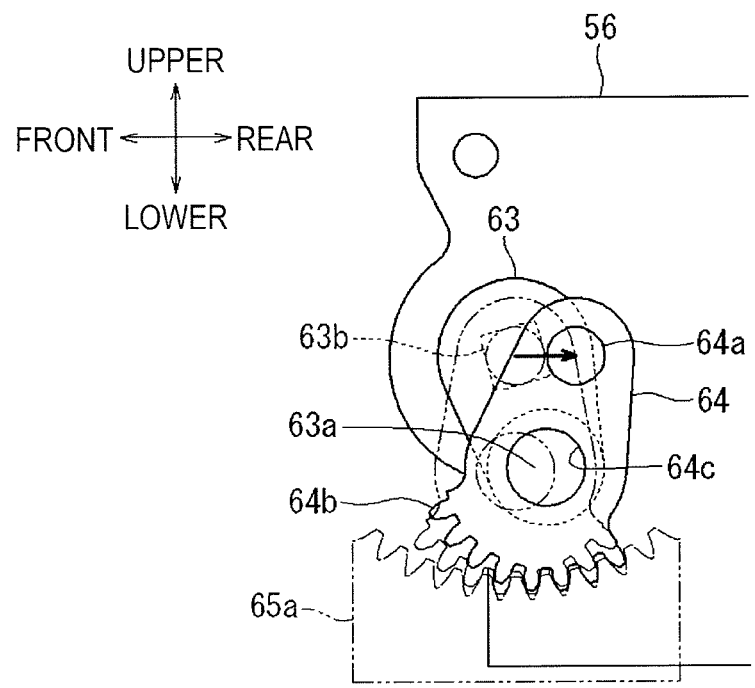
FIG. 49 is a part of a left side view similar to FIG. 48, depicting a state upon the slide operation in a forward direction.
Figure 50:
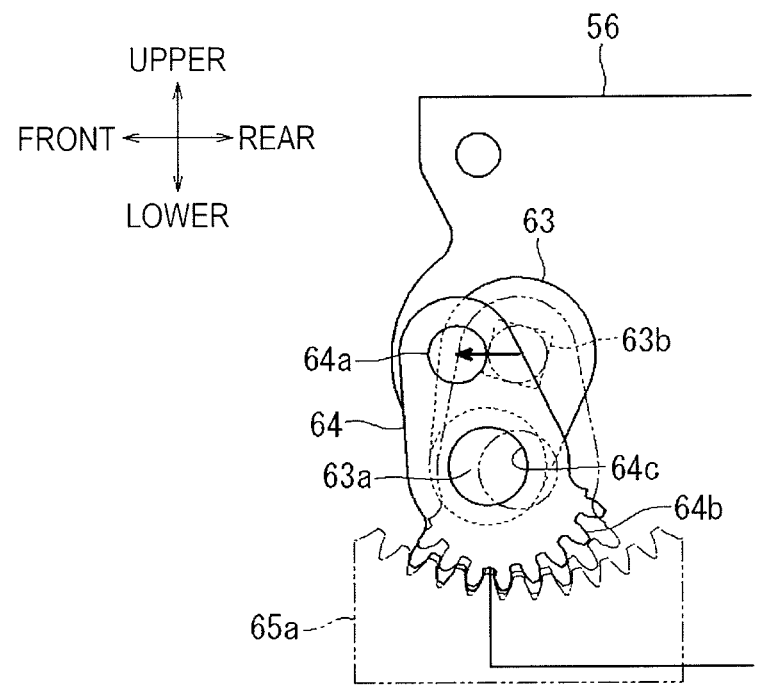
FIG. 50 is a part of a left side view similar to FIG. 48, depicting a state upon the slide operation in a reverse direction.

Therefore, the first operation knob 66 is configured to rotate the drive gear for tilt 55T by moving a front end portion thereof in the upper and lower direction. At this time, a movement range of the first operation knob 66 is restrained by the shape of the through-hole 65c. Also, the first operation knob 66 is configured to rotate the first sector gear 60 by moving a rear end portion thereof in the upper and lower direction. At this time, a movement range of the first operation knob 66 is restrained by the shape of the through-hole 65d. Also, the first operation knob 66 is configured to move in the front and rear direction, thereby moving the protrusion 64a of the link gear 64 in the front and rear direction. FIGS. 49 and 50 depict movements of the link gear 64 and the link 63 at that time. When the link gear 64 is moved, the gear part 64b is moved with being meshed with the trochoid cam gear 65a. As the link gear 64 is moved, the fitting projection 63a of the link 63 is also moved, so that the link 63 is rotated about the square hole 63b. For this reason, the drive gear for slide 55S fitted in the square hole 63b is rotated. In order to cause the movement of the first operation knob 66 in the front and rear direction, the first operation knob 66 is formed with a groove 66d extending in the front and rear direction in the vicinity of the protrusion 55d and the protrusion 60c, as shown in FIG. 53. In the meantime, the left surface of the first operation knob 66 is covered with a knob cover 66b so as to hide the screw 66a (refer to FIG. 7).

The first operation knob 66 is configured so that when the first operation knob is operated in the front and rear direction, it performs a slide adjustment operation of the seat 6, when the rear end portion thereof is operated in the upper and lower direction, it performs a lifter adjustment operation of the seat 6, and when the front end portion is operated in the upper and lower direction, it performs a tilt adjustment operation of the seat 6. The corresponding operations can be individually performed but the plurality of operations cannot be performed at the same time. That is, when the first operation knob 66 is operated forward or rearwards, the protrusion 65f of the switch cover 65 is moved into the groove 66d of the first operation knob 66, so that neither the front end portion nor the rear end portion of the first operation knob 66 can be moved in the upper and lower direction. Also, when the rear end portion of the first operation knob 66 is operated upwards or downwards, the protrusion 65f is engaged with the engaging parts 66f, 66g of the first operation knob 66, so that the first operation knob 66 cannot move in the front and rear direction. Likewise, when the front end portion of the first operation knob 66 is operated upwards or downwards, the protrusion 65f is engaged with the engaging parts 66f, 66g of the first operation knob 66, so that the first operation knob 66 cannot move in the front and rear direction.

As shown in FIG. 7, an inhibit member 68 is provided at the right of the switch cover 65. Also, as shown in FIG. 51, a pair of walls 65g is formed with facing each other above and below the through-hole 65e on the right surface of the switch cover 65. The inhibit member 68 is arranged between the pair of walls 65g so as to be freely slidable in the front and rear direction.

Figure 54:
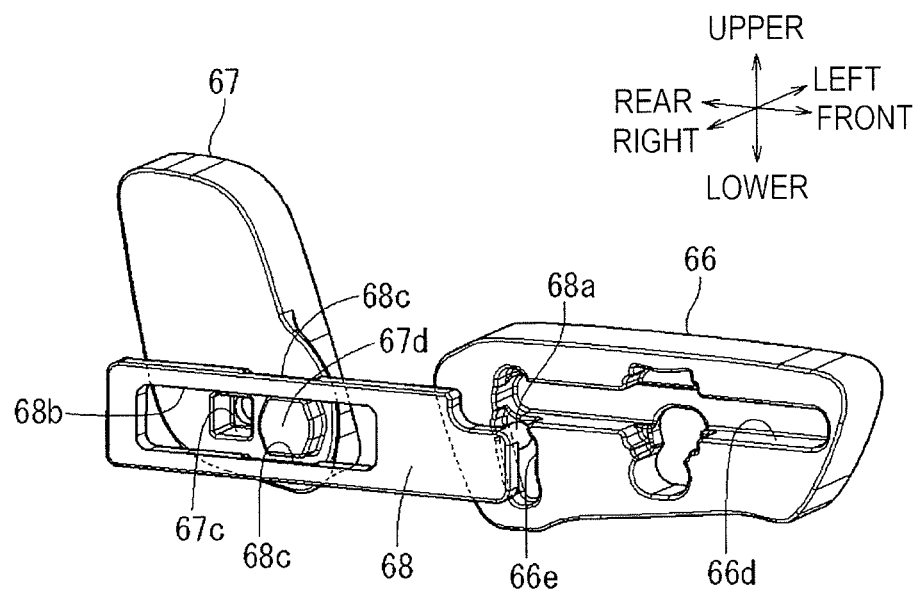
FIG. 54 is an enlarged perspective view depicting a relation between the first operation knob and second operation knob and an inhibit member of the illustrative embodiment.

The inhibit member 68 is long in the front and rear direction, and is formed at its front end portion with a protrusion 68a protruding leftwards. FIG. 54 depicts a coupling relation between the first operation knob 66 and second operation knob 67 and the inhibit member 68. The protrusion 68a of the inhibit member 68 is fitted in the fitting hole 66e of the first operation knob 66, so that the inhibit member 68 is moved in conjunction with the movement of the first operation knob 66 in the front and rear direction. However, regarding the movement of the rear end portion of the first operation knob 66 in the upper and lower direction, the protrusion 68a of the inhibit member 68 is moved in the fitting hole 66e of the first operation knob 66 in the upper and lower direction and the inhibit member 68 is not moved.

The inhibit member 68 is formed with a slit 68b in a longitudinal direction. Also, the inhibit member 68 is formed with grooves 68c above and below a central part of the slit 68b in the front and rear direction. In the slit 68b, the protrusion 67d of the second operation knob 67 is fitted to be freely slidable. The protrusion 67d is partially fitted into the slit 68b in the right and left direction. When the protrusion 67d is located at a position corresponding to the groove 68c, the protrusion 67d can move in the upper and lower direction through the groove 68c.

Figure 55:
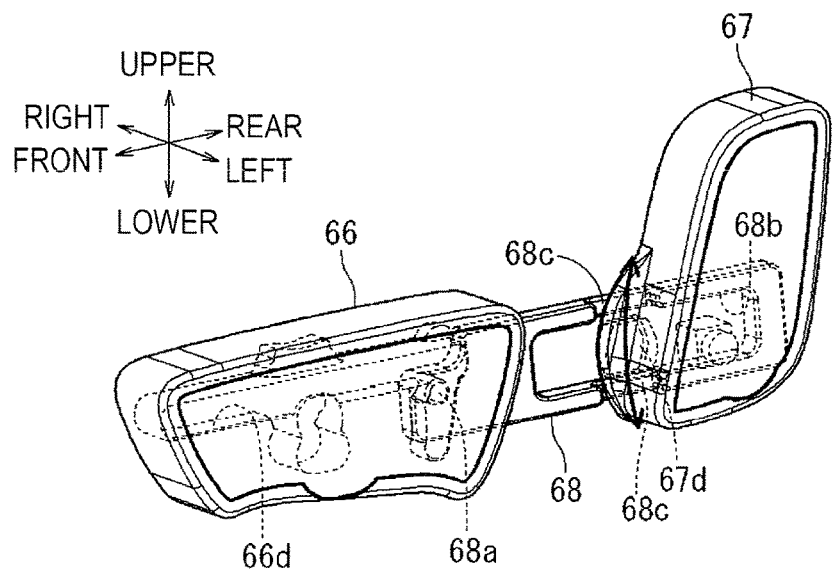
FIG. 55 is an enlarged perspective view depicting a function of the inhibit member of the illustrative embodiment.

FIG. 55 depicts a state where the first operation knob 66 is not operated. At this state, the protrusion 67d of the second operation knob 67 is located at a position corresponding to the groove 68c of the inhibit member 68. For this reason, the second operation knob 67 can be rotated.

Figure 56:
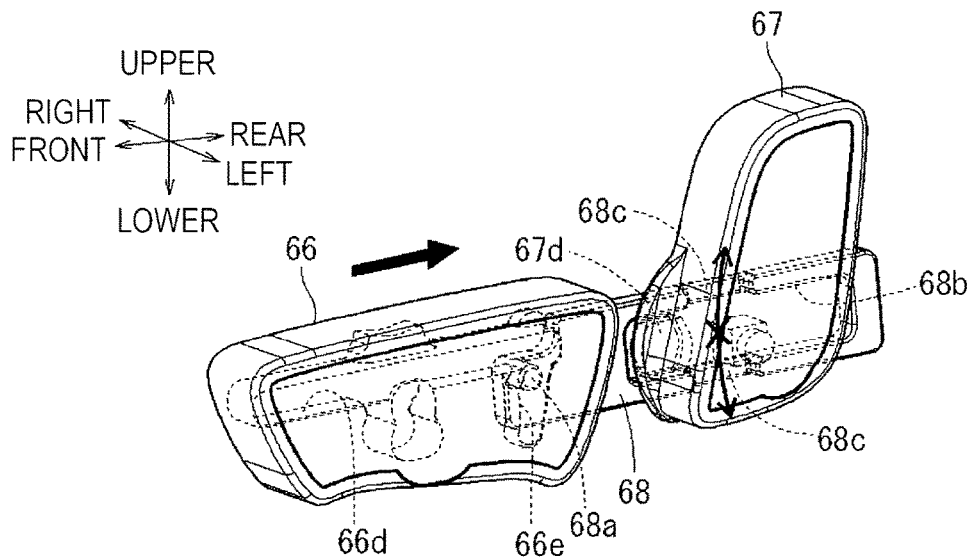
FIG. 56 is an enlarged perspective view similar to FIG. 55, depicting a state where the first operation knob is operated in the forward direction and an operation of the second operation knob is restrained.

FIG. 56 depicts a state where the first operation knob 66 is operated rearwards for slide adjustment. At this state, the protrusion 67d of the second operation knob 67 is located at the front end portion of the slit 68b of the inhibit member 68. For this reason, the protrusion 67d of the second operation knob 67 cannot move in the upper and lower direction, and the rotation operation of the second operation knob 67 is restrained. That is, the reclining angle adjustment cannot be made during the slide operation.

Figure 57:
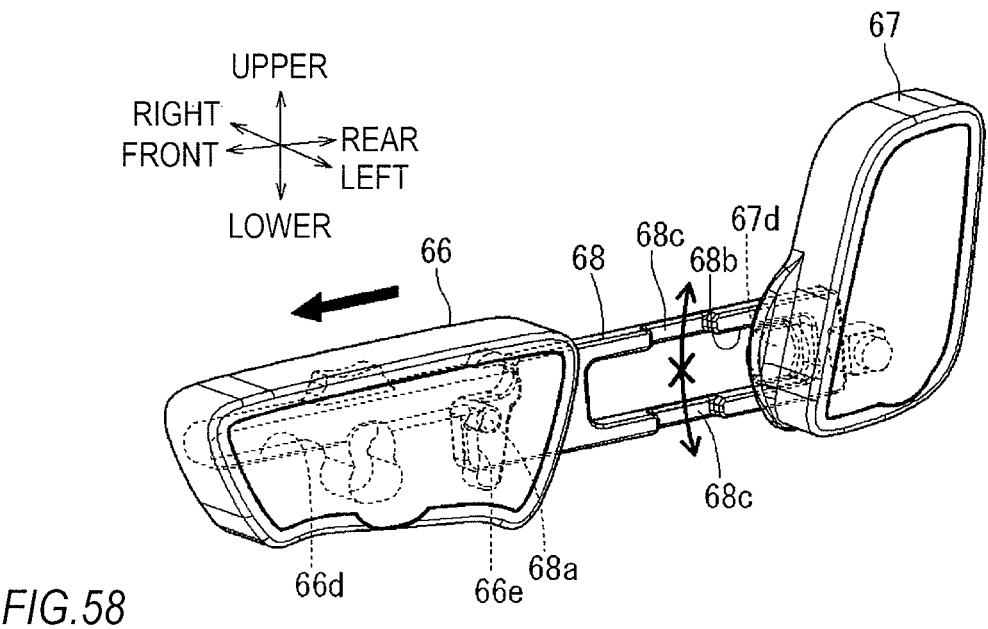
FIG. 57 is an enlarged perspective view similar to FIG. 55, depicting a state where the first operation knob is operated in the reverse direction and the operation of the second operation knob is restrained.

FIG. 57 depicts a state where the first operation knob 66 is operated forward for slide adjustment. At this state, the protrusion 67d of the second operation knob 67 is located at the rear end portion of the slit 68b of the inhibit member 68. For this reason, the protrusion 67d of the second operation knob 67 cannot move in the upper and lower direction, and the rotation operation of the second operation knob 67 is restrained. That is, the reclining angle adjustment cannot be made during the slide operation.

Figure 58:
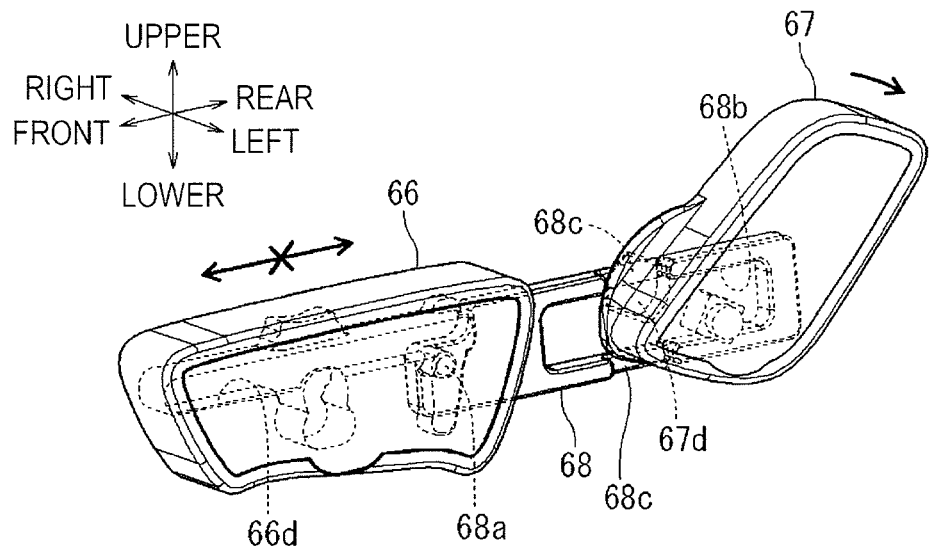
FIG. 58 is an enlarged perspective view similar to FIG. 55, depicting a state where the second operation knob is operated in the forward direction and an operation of the first operation knob is restrained.

FIG. 58 depicts a state where the second operation knob 67 is operated in the clockwise direction for reclining angle adjustment. At this state, the protrusion 67d of the second operation knob 67 is positioned in the upper groove 68c of the inhibit member 68. For this reason, the inhibit member 68 interferes with the protrusion 67d of the second operation knob 67 in the groove 68c and cannot move in the front and rear direction. Therefore, the operation of the first operation knob 66 in the front and rear direction is restrained. That is, the slide adjustment cannot be made during the reclining angle adjustment operation.

Figure 59:
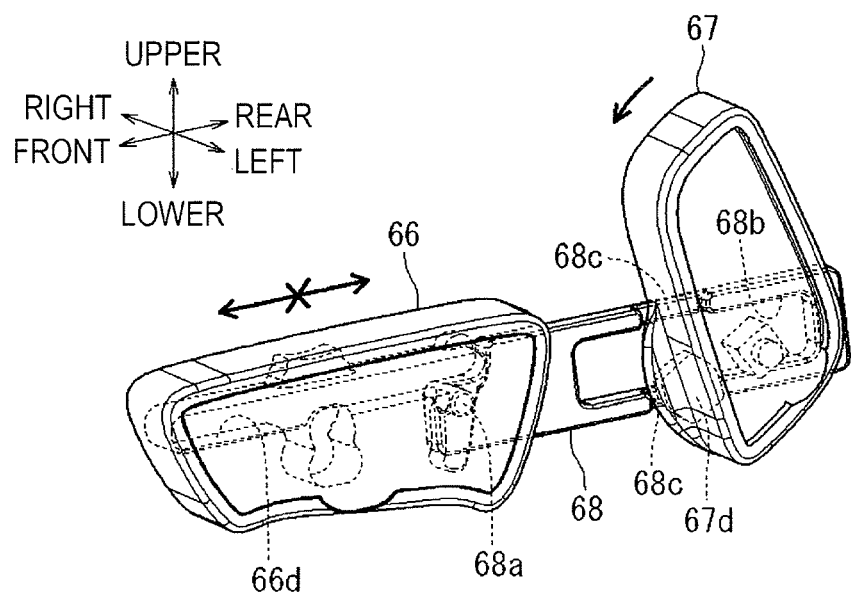
FIG. 59 is an enlarged perspective view similar to FIG. 55, depicting a state where the second operation knob is operated in the reverse direction and the operation of the first operation knob is restrained.

FIG. 59 depicts a state where the second operation knob 67 is operated in the counterclockwise direction for reclining angle adjustment. At this state, the protrusion 67d of the second operation knob 67 is positioned in the lower groove 68c of the inhibit member 68. For this reason, the inhibit member 68 interferes with the protrusion 67d of the second operation knob 67 in the groove 68c and cannot move in the front and rear direction. Therefore, the operation of the first operation knob 66 in the front and rear direction is restrained. That is, the slide adjustment cannot be made during the reclining angle adjustment operation.

Figure 8:
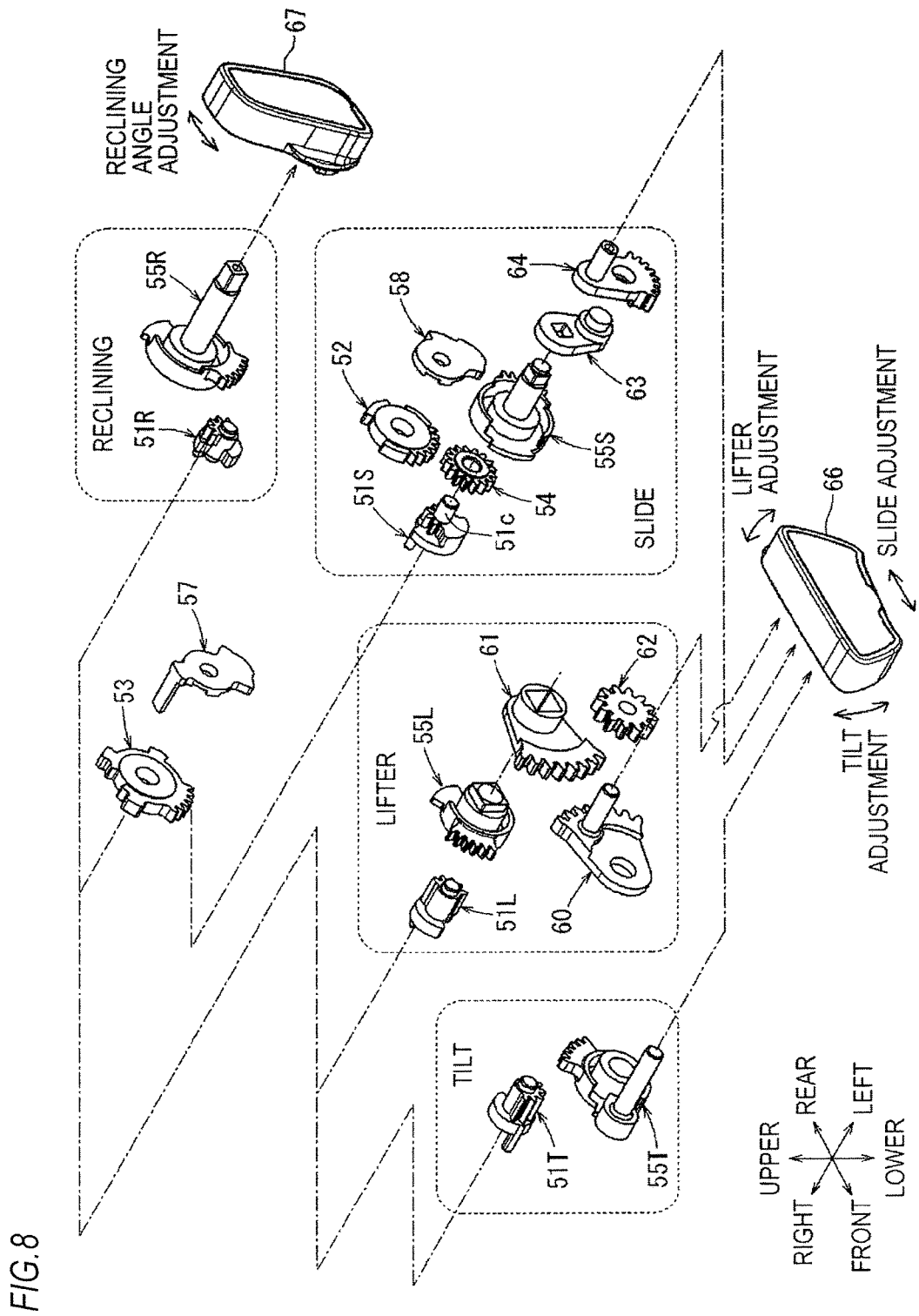
FIG. 8 is an exploded perspective view illustrating an operation function of the illustrative embodiment.

FIG. 8 illustrates a function of adjusting each position of the seat 6 by the operations of the first operation knob 66 and the second operation knob 67. For slide position adjustment of the seat 6, when the first operation knob 66 is operated in the front and rear direction, the operation in the front and rear direction is converted into the rotation operation by the link gear 64 and the link 63, so that the drive gear for slide 55S is rotated. For this reason, the first center cam 52 is rotated via the intermediate gear 54, and the second switch cam 58 swings. When the second switch cam 58 swings, it operates the limit switch 59 to actuate the driving motor 41. When the intermediate gear 54 is rotated by the drive gear for slide 55S, the intermediate gear 54 is rotated about the rotary shaft 51c of the clutch pin for slide 51S but the clutch pin for slide 51S is not rotated. As a result, the switching operation of the clutch mechanism for slide 46S by the clutch pin for slide 51S is not performed, and the clutch mechanism for slide 46S is maintained in the connection state. On the other hand, since the driving motor 41 is actuated, the slide position adjustment of the seat 6 is implemented. The second switch cam 58 swings in accordance with the operation direction of the first operation knob 66, so that the limit switch 59a or 59b of the limit switch 59 is operated. Therefore, it is possible to arbitrarily adjust the slide position of the seat 6.

Regarding the position adjustments of the seat 6, the slide position adjustment is frequently used. The clutch mechanism for slide 46S for the slide position adjustment which is frequently used is set to be in the connection state regularly, and when performing the slide position adjustment, the clutch mechanism for slide 46S is maintained in the connection state. For this reason, even when the slide position is adjusted frequently, the clutch mechanism for slide 46S is not switched each time the adjustment is made. Therefore, it is possible to suppress deterioration of the clutch mechanism for slide 46S.

For lifter adjustment of the seat 6, when the rear end portion of the first operation knob 66 is operated in the upper and lower direction, the drive gear for lifter 55L is rotated via the first sector gear 60, the intermediate gear 62 and the second sector gear 61. For this reason, the clutch pin for lifter 51L is rotated to switch the clutch mechanism for lifter 46L from the disconnection state to the connection state. At the same time, the clutch pin for lifter 51L rotates the second center cam 53 and swings the first switch cam 57. When the first switch cam 57 swings, it operates the limit switch 59 to actuate the driving motor 41. When the second center cam 53 is rotated, the clutch pin for slide 51S is rotated and the clutch mechanism for slide 46S is switched from the connection state to the disconnection state. As a result, the lifter adjustment of the seat 6 is performed. The first switch cam 57 swings in accordance with the operation direction of the lifter adjustment of the first operation knob 66, so that the limit switch 59a or 59b of the limit switch 59 is operated. Therefore, it is possible to perform the lifter adjustment of the seat 6 in any direction.

There is a time delay in the operation of the limit switch 59 by the first switch cam 57. For this reason, after the switching operations of the clutch mechanism for lifter 46L and the clutch mechanism for slide 46S are completed, the driving motor 41 is rotated. On the other hand, there is no time delay in the operation of the limit switch 59 by the second switch cam 58. For this reason, when the slide position adjustment is performed by the first operation knob 66, the driving motor 41 is actuated without delay.

For tilt adjustment of the seat 6, when the front end portion of the first operation knob 66 is operated in the upper and lower direction, the drive gear for tilt 55T is rotated. For this reason, the clutch pin for tilt 51T is rotated to switch the clutch mechanism for tilt 46T from the disconnection state to the connection state. At the same time, the clutch pin for tilt 51T rotates the second center cam 53, and operates the limit switch 59 via the first switch cam 57, thereby actuating the driving motor 41. When the second center cam 53 is rotated, the clutch mechanism for slide 46S is switched from the connection state to the disconnection state. As a result, the tilt adjustment of the seat 6 is performed. The first switch cam 57 swings in accordance with the operation direction of the tilt adjustment of the first operation knob 66, so that the limit switch 59a or 59b of the limit switch 59 is operated. Therefore, it is possible to perform the tilt adjustment of the seat 6 in any direction. After the switching operations of the clutch mechanism for tilt 46T and the clutch mechanism for slide 46S are completed, the driving motor 41 is rotated, which is similar to the operation of the lifter adjustment.

For reclining angle adjustment of the seat 6, when the second operation knob 67 is operated in the front and rear direction, the drive gear for recliner 55R is rotated. For this reason, the clutch pin for recliner 51R is rotated to switch the clutch mechanism for recliner 46R from the disconnection state to the connection state. At the same time, the clutch pin for recliner 51R rotates the second center cam 53, and operates the limit switch 59 via the first switch cam 57, thereby actuating the driving motor 41. When the second center cam 53 is rotated, the clutch mechanism for slide 46S is switched from the connection state to the disconnection state. As a result, the recliner adjustment of the seat 6 is performed. The first switch cam 57 swings in accordance with the operation direction of the recliner adjustment of the first operation knob 66, so that the limit switch 59a or 59b of the limit switch 59 is operated. Therefore, it is possible to perform the recliner adjustment of the seat 6 in any direction. After the switching operations of the clutch mechanism for recliner 46R and the clutch mechanism for slide 46S are completed, the driving motor 41 is rotated, which is similar to the operation of the lifter adjustment.

Although the specific illustrative embodiments have been described, the disclosure is not limited to the outer appearances and configurations thereof, and a variety of modifications, additions and deletions can be made without departing from the spirit of the disclosure. For example, in the illustrative embodiment, the plurality of position adjusting mechanisms is the slide adjusting mechanism Ms, the lifter adjusting mechanism Ml, the tilt adjusting mechanism Mt and the reclining angle adjusting mechanism Mr, and the first position adjusting mechanism which is frequently used is the slide adjusting mechanism Ms, and the second position adjusting mechanism which is less frequently used than the first position adjusting mechanism is the lifter adjusting mechanism Ml, the tilt adjusting mechanism Mt and the reclining angle adjusting mechanism Mr. However, the disclosure is not limited thereto. That is, at least a part of the plurality of position adjusting mechanisms can be replaced with another position adjusting mechanism. Alternatively, another position adjusting mechanism may be added. Further, the first position adjusting mechanism may be any one of the lifter adjusting mechanism Ml, the tilt adjusting mechanism Mt and the reclining angle adjusting mechanism Mr. Further, the second position adjusting mechanism may be reduced to two or one from the three mechanisms. Alternatively, another position adjusting mechanism may be added.

In the illustrative embodiment, the first switch operation unit 57 and the second switch operation unit 58 are provided. However, when the first switch operation unit and the second switch operation unit are configured by one switch operation unit, like the modified embodiment, the second switch operation unit 58 is omitted and the first switch operation unit 57 is configured as one switch operation unit. In this case, the gap D1 of the notch 52c of the first center cam (the first driving body) 52 is the same as the gap D2 of the notch 53f of the second center cam (the second driving body) 53. The gaps D1. D2 correspond to the one-way structure of the disclosure.

In the illustrative embodiment, the disclosure has been applied to a vehicle seat. However, the disclosure can also be applied to a seat mounted on an airplane, a ship, a train and the like.

The disclosure provides illustrative, non-limiting examples as follows:

According to a first aspect, there is provided a seat driving device for a seat including a plurality of position adjusting mechanisms including a first position adjusting mechanism and a second position adjusting mechanism, the seat driving device including: a driving motor including a single output shaft; a plurality of operation members individually arranged in correspondence to the plurality of position adjusting mechanisms and configured to be operated so as to actuate each position adjusting mechanism, the plurality of operation members including a first operation member and a second operation member; a plurality of clutch mechanisms individually arranged in correspondence to the plurality of position adjusting mechanisms and including a first clutch mechanism and a second clutch mechanism, each clutch mechanism being configured to selectively connect an input shaft of the clutch mechanism which is configured to be rotated by the driving motor and an output shaft of the clutch mechanism which is connected to the corresponding position adjusting mechanism; and a switch configured to, in response to an operation on any one of the plurality of operation members, energize the driving motor with a polarity corresponding to a direction of the operation, wherein the first clutch mechanism corresponds to the first position adjusting mechanism which is frequently used, and the first clutch mechanism is configured to set the output shaft and the input shaft of the first clutch mechanism to be in a connection state regularly and to maintain the output shaft and the input shaft of the first clutch mechanism in the connection state as the first operation member corresponding to the first position adjusting mechanism is operated, and wherein the second clutch mechanism corresponds to the second position adjusting mechanism, which is less frequently used than the first position adjusting mechanism, and the second clutch mechanism is configured to set the output shaft and the input shaft of the second clutch mechanism to be in a disconnection state regularly and to switch the output shaft and the input shaft of the second clutch mechanism to a connection state as the second operation member corresponding to the second position adjusting mechanism is operated.

In the first aspect, the number of the second position adjusting mechanism may be one or two or more. Also, as the plurality of clutch mechanisms, a variety of types of known clutch mechanisms can be adopted.

According to the first aspect, the clutch mechanism of the position adjusting mechanism, which is frequently used, is set in the connection state regularly, and is maintained in the connection state when performing adjusting operation of the first position adjusting mechanism. For this reason, even when the first position adjusting mechanism is adjusted with high frequency, the clutch mechanism is not switched each time the first position adjusting mechanism is adjusted. Therefore, it is possible to suppress deterioration of the clutch mechanism corresponding to the first position adjusting mechanism. Hence, even when the use frequency is different between the first position adjusting mechanism and the second position adjusting mechanism, it is possible to suppress the problems of the durability and excessive quality of the clutch mechanism in the seat driving device.

According to a second aspect, there is provided the seat driving device according to the first aspect, further including: a first clutch driving unit configured to switch the output shaft and the input shaft of the first clutch mechanism to a disconnection state; a second clutch driving unit configured to switch the output shaft and the input shaft of the second clutch mechanism to the connection state; and a switch operation unit to which an operating force of the first operation member is transmitted in response to an operation of the first operation member and which energizes the switch with a polarity corresponding to a direction of the operation of the first operation member, wherein after an operating force of the second operation member is transmitted to the first clutch driving unit and the second clutch driving unit in response to an operation of the second operation member and the second clutch mechanism comes into the connection state, the switch is energized with a polarity corresponding to a direction of the operation of the second operation member by the switch operation unit.

According to the second aspect, in response to the operation of the first operation member, the first clutch mechanism is not actuated and the switch operation corresponding to the operation is performed. Also, the first clutch mechanism and the second clutch mechanism are actuated, in response to the operation of the second operation member. Further, the switch operation corresponding to the operation of the second operation member is performed after the second clutch mechanism comes into the connection state. Therefore, upon the operation of the first operation member, since the first clutch mechanism is maintained the connection state, the driving motor is immediately actuated. On the other hand, upon the operation of the second operation member, the driving motor is actuated after the second clutch mechanism comes into the connection state. For this reason, upon any operation, the driving motor is actuated when the clutch mechanism is in the connection state, so that it is possible to prevent the problem that the driving motor is actuated before coming into the connection state.

According to a third aspect, there is provided the seat driving device according to the second aspect, wherein the switch operation unit includes a first switch operation unit and a second switch operation unit, wherein the operating force of the first operation member is transmitted to the first switch operation unit in response to the operation of the first operation member and the first switch operation unit energizes the switch with the polarity corresponding to the direction of the operation of the first operation member, and wherein after the operating force of the second operation member is transmitted via the second clutch driving unit in response to the operation of the second operation member and the second clutch mechanism comes into the connection state, the second switch operation unit energizes the switch with the polarity corresponding to the direction of the operation of the second operation member According to the third aspect, the switch operation unit includes the first switch operation unit and the second switch operation unit, individually. For this reason, the switch operation is delayed so that the switch is switched after the second clutch mechanism comes into the connection state in response to the operation of the second operation member. In the meantime, the switch is switched without delay in response to the operation of the first operation member. Therefore, while satisfying the requirement that the driving motor is to be actuated after the second clutch mechanism comes into the connection state upon the operation of the second operation member, it is possible to satisfy the requirement that the driving motor is to be immediately actuated upon the operation of the first operation member.

According to a fourth aspect, there is provided the seat driving device according to the third aspect, wherein the second switch operation unit is configured to be actuated with being coupled to the second clutch driving unit, and a delay structure, which is configured to delay the coupling therebetween, is provided between the second clutch driving unit and the second switch operation unit.

According to the fourth aspect, the second clutch driving unit and the second switch operation unit are coupled to each other via the delay structure. For this reason, as the second clutch driving unit moves, the second switch operation unit is actuated, and the actuation of the second switch operation unit is delayed by the delay structure. Therefore, it is possible to actuate the driving motor by switching the switch after the second clutch mechanism securely comes into the connection state.

According to a fifth aspect, there is provided the seat driving device according to the fourth aspect, wherein the delay structure includes a gap which is provided in a coupling path through which the second switch operation unit is coupled to the second clutch driving unit.

In the fifth aspect, the gap can be set to be equal to or greater than the moving amount that is necessary for the second clutch driving unit to cause the second clutch mechanism to come into the connection state. However, when another delay structure is provided other than the gap, the gap may be set to be equal to or less than the moving amount that is necessary for the second clutch driving unit to cause the second clutch mechanism to come into the connection state.

According to the fifth aspect, it is possible to implement the delay structure with a simple configuration in which the gap is provided in the coupling path.

According to a sixth aspect, there is provided the seat driving device according to any one of the second to fifth aspects, further including a cooperation member configured to transmit to the first clutch driving unit the operating force of the second operation member transmitted to the second clutch driving unit, wherein the operating force of the second operation member is transmitted to the second clutch driving unit and is also transmitted to the first clutch driving unit via the cooperation member in response to the operation of the second operation member.

According to the sixth aspect, the operating force of the second operation member transmitted to the second clutch driving unit is transmitted to the first clutch driving unit via the cooperation member. For this reason, it is possible perform the actuation of causing the second clutch mechanism to come into the connection state and the actuation of causing the first clutch mechanism to come into the disconnection state in cooperation with each other simply by the actuation of the second operation member.

According to a seventh aspect, there is provided the seat driving device according to the sixth aspect, wherein the first position adjusting mechanism includes one first position adjusting mechanism and the second position adjusting mechanism includes a plurality of second position adjusting mechanisms, wherein each of the plurality of second position adjusting mechanisms includes the second clutch mechanism and the second clutch driving unit, and wherein, when any one of the plurality of second clutch driving units is operated, the cooperation member transmits an operating force thereof to the first clutch driving unit but does not transmit the operating force to the other second clutch driving unit.

According to the seventh aspect, the plurality of second position adjusting mechanisms is provided. When one of the plurality of second position adjusting mechanisms is operated, the corresponding second clutch mechanism is caused to come into the connection state, and the first clutch mechanism is caused to come into the disconnection state via the cooperation member. However, the other second position adjusting mechanism of the plurality of second position adjusting mechanisms is not caused to come into the connection state. Therefore, even when the second clutch driving unit and the first clutch driving unit are caused to operate in cooperation with each other by the cooperation member, it is possible to prevent the plurality of second clutch driving units from interfering with each other.

According to an eighth aspect, there is provided the seat driving device according to the seventh aspect, wherein the first clutch driving unit and the plurality of second clutch driving units are arranged around the cooperation member, wherein the cooperation member includes a gear part which couples with a gear part of the first clutch driving unit and a plurality of radial projections configured to individually protrude towards the plurality of second clutch driving units in a radial shape as a whole, wherein each of the plurality of second clutch driving units includes a contact part that presses the radial projection to rotate the cooperation member when the second clutch driving unit is operated in a direction of causing the second clutch mechanism to come into the connection state, and wherein when the cooperation member is pressed and rotated by the contact part of one second clutch driving unit, each contact part of the other second clutch driving unit does not interfere with the radial projections.

According to the eighth aspect, it is possible to implement the function that, when one of the plurality of second position adjusting mechanisms is actuated, the corresponding second clutch mechanism is caused to come into the connection state, the first clutch mechanism is caused to come into the disconnection state, and the other second clutch mechanism is not caused to come into the connection state, with a simple configuration.

According to a ninth aspect, there is provided the seat driving device according to any one of the second to eighth aspects, wherein the switch operation unit includes: a first driving body configured to be actuated in response to the operating force of the first operation member; a second driving body configured to be actuated in response to the operating force of the second operation member: and a switch operation body configured to operate the switch by being actuated by both the first driving body and the second driving body, and wherein a one-way structure, by which at least one of the first driving body and the second driving body actuate the switch operation body but the switch operation body does not actuate the first driving body and the second driving body, is provided between the switch operation body and the first driving body and second driving body.

According to the ninth aspect, when at least one of the first operation member and the second operation member are operated, the switch operation body is actuated via at least one of the first driving body and the second driving body, so that the switch is operated. At this time, since the one-way structure is provided, when one of the first operation member and the second operation member is operated and the switch operation body is correspondingly actuated, the movement of the switch operation body is not transmitted to the other of the first operation member and the second operation member. For this reason, even when the switch operation body is commonly provided for the first operation member and the second operation member, it is possible to prevent the operating force from being transmitted from one of the first operation member and the second operation member to the other of the first operation member and the second operation member or from the other of the first operation member and the second operation member to the one of the first operation member and the second operation member via the switch operation body that is commonly provided.

According to a tenth aspect, there is provided the seat driving device according to the ninth aspect, wherein the first driving body, the second driving body and the switch operation body are arranged side by side, wherein the switch operation body includes a coupling member that couples with the first driving body and the second driving body so as to operate in conjunction with the first driving body and the second driving body, wherein the coupling member includes an engaging part that is engaged with the first driving body and the second driving body to move the switch operation body when at least one of the first driving body and the second driving body is actuated in response to the operating forces of the first operation member and the second operation member, wherein the coupling member and the first driving body and second driving body are engaged at the engaging part via a gap, and wherein a size of the gap is set so that when one of the first driving body and the second driving body is actuated and the switch operation body is moved via the coupling member, the movement of the switch operation body is not transmitted to the other of the first driving body and the second driving body via the coupling member.

According to the tenth aspect, the one-way structure of the ninth aspect is configured by the gap of the engaging part between the first driving body and second driving body and the coupling member of the switch operation body. Therefore, it is possible to implement the one-way structure with a simple configuration.

According to an eleventh aspect, there is provided the seat driving device according to any one of the first to tenth aspects, wherein the first clutch mechanism includes a coupling tube configured to move in an axis direction of the output shaft and the input shaft of the first clutch mechanism by an urging force of a spring such that the output shaft and the input shaft come into the connection state, wherein the coupling tube is configured to be moved by a first clutch driving unit, which is arranged in the vicinity of the coupling tube, against the urging force of the spring in a direction of causing the output shaft and the input shaft of the first clutch mechanism to come into the disconnection state, wherein the first clutch driving unit is configured to operate in conjunction with the second clutch driving unit which is configured to move in response to an operating force of the second operation member, wherein the first clutch driving unit includes a first contact part and a second contact part, wherein, when the second operation member is operated in a forward direction, the first contact part presses and moves the coupling tube, thereby causing the output shaft and the input shaft of the first clutch mechanism to come into the disconnection state, and wherein, when the second operation member is operated in a reverse direction, the second contact part presses and moves the coupling tube, thereby causing the output shaft and the input shaft of the first clutch mechanism to come into the disconnection state.

According to the eleventh aspect, the first clutch driving unit includes the first contact part and the second contact part, and when the second operation member is operated in either of the forward direction or the reverse direction, it is possible to cause the first clutch mechanism to come into the disconnection state by moving the coupling tube with the first contact part or the second contact part. Therefore, it is possible to implement the configuration where, when the second operation member is operated in the forward direction or the reverse direction, the first clutch mechanism is caused to come into the disconnection state, with a simple configuration.

According to a twelfth aspect, there is provided the seat driving device according to any one of the first to eleventh aspects, wherein the second clutch mechanism includes a coupling tube configured to move in an axis direction of the output shaft and the input shaft of the second clutch mechanism by an urging force of a spring such that the output shaft and the input shaft come into the connection state, wherein the coupling tube is configured to be moved by a second clutch driving unit, which is applied with an operating force of the second operation member, against the urging force of the spring in a direction of causing the output shaft and the input shaft of the second clutch mechanism to come into the disconnection state, wherein the second clutch driving unit includes a regular-contact part configured to move and press the coupling tube regularly, wherein, when the second operation member is not operated, the regular-contact part moves and presses the coupling tube, thereby causing the output shaft and the input shaft of the second clutch mechanism to come into the disconnection state, and wherein, when the second operation member is operated in a forward direction or a reverse direction, the regular-contact part does not press the coupling tube, thereby causing the output shaft and the input shaft of the second clutch mechanism to come into the connection state by the urging force of the spring.

According to the twelfth aspect, the second clutch driving unit includes the regular-contact part and is configured to move the coupling tube by the regular-contact part and to thereby cause the second clutch mechanism to come into the disconnection state at a state where the second operation member is not operated. In the meantime, when the second operation member is operated in either of the forward direction or the reverse direction, the movement of the coupling tube caused by the regular-contact part is released, so that the second clutch mechanism can be caused to come into the connection state by the urging force of the spring. Therefore, it is possible to implement the configuration where, when the second operation member is operated in the forward direction or the reverse direction, the second clutch mechanism is caused to come into the connection state, with a simple configuration.

According to a thirteenth aspect, there is provided the seat driving device according to any one of the first to twelfth aspects, wherein the first position adjusting mechanism is a slide adjusting mechanism configured to adjust a slide position of the seat in a front and rear direction, and the second position adjusting mechanism is one of a reclining angle adjusting mechanism configured to adjust a reclining angle of a seat back, a lifter adjusting mechanism configured to adjust a height of a seat cushion and a tilt adjusting mechanism configured to adjust a height of a front part of the seat cushion.

According to the thirteenth aspect, it is possible to suppress a situation where, when the slide adjusting mechanism is frequently used, the clutch mechanism of the slide adjusting mechanism is deteriorated earlier than the clutch mechanism of the other the adjusting mechanism and is thus likely to be out of order.

According to a fourteenth aspect, there is provided the seat driving device according to any one of the first to twelfth aspects, wherein the first position adjusting mechanism is a reclining angle adjusting mechanism configured to adjust a reclining angle of a seat back, and the second position adjusting mechanism is one of a slide adjusting mechanism configured to adjust a slide position of the seat in a front and rear direction, a lifter adjusting mechanism configured to adjust a height of a seat cushion and a tilt adjusting mechanism configured to adjust a height of a front part of the seat cushion.

According to the fourteenth aspect, it is possible to suppress a situation where, when the reclining angle adjusting mechanism is frequently used, the clutch mechanism of the reclining angle adjusting mechanism is deteriorated earlier than the clutch mechanism of the other adjusting mechanism and is thus likely to be out of order.

What is claimed is:

1. A seat driving device for a seat configured to actuate a plurality of position adjusters including a first position adjuster and a second position adjuster, the seat driving device comprising:
    a driving motor including a single output shaft;
    a plurality of operation members individually arranged in correspondence to the plurality of position adjusters and configured to be operated so as to actuate each position adjuster, the plurality of operation members including a first operation member and a second operation member;

a plurality of clutches individually arranged to correspond to each of the plurality of position adjusters to be actuated and including a first clutch and a second clutch, each clutch being configured to selectively connect an input shaft of the clutch which is configured to be rotated by the driving motor and an output shaft of the clutch which is connected to the corresponding adjuster; and a switch configured to, in response to an operation on any one of the plurality of operation members, energize the driving motor with a polarity corresponding to a direction of the operation, wherein the first clutch corresponds to the first position adjuster which is frequently used, and the first clutch is configured to set the output shaft and the input shaft of the first clutch to be in a connection state regularly and to maintain the output shaft and the input shaft of the first clutch in the connection state as the first operation member corresponding to the first position adjuster is operated, and wherein the second clutch corresponds to the second position adjuster, which is less frequently used than the first position adjuster, and the second clutch is configured to set the output shaft and the input shaft of the second clutch to be in a disconnection state regularly and to switch the output shaft and the input shaft of the second clutch to a connection state as the second operation member corresponding to the second position adjuster is operated.

2. The seat driving device according to claim 1, further comprising:

a first clutch driver configured to switch the output shaft and the input shaft of the first clutch to a disconnection state;

a second clutch driver configured to switch the output shaft and the input shaft of the second clutch to the connection state; and a switch operator to which an operating force of the first operation member is transmitted in response to an operation of the first operation member and which energizes the switch with a polarity corresponding to a direction of the operation of the first operation member, wherein after an operating force of the second operation member is transmitted to the first clutch driver and the second clutch driver in response to an operation of the second operation member and the second clutch comes into the connection state, the switch is energized with a polarity corresponding to a direction of the operation of the second operation member by the switch operator.

3. The seat driving device according to claim 2, wherein the switch operator includes a first switch operator and a second switch operator, wherein the operating force of the first operation member is transmitted to the first switch operator in response to the operation of the first operation member and the first switch operator energizes the switch with the polarity corresponding to the direction of the operation of the first operation member, and wherein after the operating force of the second operation member is transmitted via the second clutch driver in response to the operation of the second operation member and the second clutch comes into the connection state, the second switch operator energizes the switch with the polarity corresponding to the direction of the operation of the second operation member.

4. The seat driving device according to claim 3, wherein the second switch operator is configured to be actuated with being coupled to the second clutch driver, and a delay structure, which is configured to delay the coupling therebetween, is provided between the second clutch driver and the second switch operator.

5. The seat driving device according to claim 4, wherein the delay structure includes a gap which is provided in a coupling path through which the second switch operator is coupled to the second clutch driver.

6. The seat driving device according to claim 2, further comprising a cooperation member configured to transmit to the first clutch driver the operating force of the second operation member transmitted to the second clutch driver, wherein the operating force of the second operation member is transmitted to the second clutch driver and is also transmitted to the first clutch driver via the cooperation member in response to the operation of the second operation member.

7. The seat driving device according to claim 6, wherein the first position adjuster includes one first position adjuster and the second position adjuster includes a plurality of second position adjusters, wherein each of the plurality of second position adjusters includes the second clutch and the second clutch driver, and wherein, when the second clutch driver of any one of the plurality of second position adjusters is operated, the cooperation member transmits an operating force thereof to the first clutch driver but does not transmit the operating force to the second clutch driver.

8. The seat driving device according to claim 7, wherein the first clutch driver and the plurality of second clutch driver are arranged around the cooperation member, wherein the cooperation member includes a gear part which couples with a gear part of the first clutch driver and a plurality of radial projections configured to individually protrude towards the plurality of second clutch driver in a radial shape as a whole, wherein each of the plurality of second clutch driver includes a contact part that presses the radial projection to rotate the cooperation member when the second clutch driver is operated in a direction of causing the second clutch to come into the connection state, and wherein when the cooperation member is pressed and rotated by the contact part of one second clutch driver, each contact part of the other second clutch driver does not interfere with the radial projections.

9. The seat driving device according to claim 2, wherein the switch operator includes:

a first driving body configured to be actuated in response to the operating force of the first operation member;

a second driving body configured to be actuated in response to the operating force of the second operation member; and a switch operation body configured to operate the switch by being actuated by both the first driving body and the second driving body, and wherein a one-way structure, by which at least one of the first driving body and the second driving body actuate the switch operation body but the switch operation body does not actuate the first driving body and the second driving body, is provided between the switch operation body and the first driving body and second driving body.

10. The seat driving device according to claim 9,
wherein the first driving body, the second driving body and the switch operation body are arranged side by side,
wherein the switch operation body includes a coupling that couples with the first driving body and the second driving body so as to operate in conjunction with the first driving body and the second driving body,
wherein the coupling includes an engaging part that is engaged with the first driving body and the second driving body to move the switch operation body when at least one of the first driving body and the second driving body is actuated in response to the operating forces of the first operation member and the second operation member,
wherein the coupling and the first driving body and second driving body are engaged at the engaging part via a gap, and
wherein a size of the gap is set so that when one of the first driving body and the second driving body is actuated and the switch operation body is moved via the coupling, the movement of the switch operation body is not transmitted to the other of the first driving body and the second driving body via the coupling.

11. The seat driving device according to claim 1,
wherein the first clutch includes a coupling tube configured to move in an axis direction of the output shaft and the input shaft of the first clutch by an urging force of a spring such that the output shaft and the input shaft come into the connection state,
wherein the coupling tube is configured to be moved by a first clutch driver, which is arranged in the vicinity of the coupling tube, against the urging force of the spring in a direction of causing the output shaft and the input shaft of the first clutch to come into the disconnection state,
wherein the first clutch driver is configured to operate in conjunction with the second clutch driver which is configured to move in response to an operating force of the second operation member,
wherein the first clutch driver includes a first contact part and a second contact part,
wherein, when the second operation member is operated in a forward direction, the first contact part presses and moves the coupling tube, thereby causing the output shaft and the input shaft of the first clutch to come into the disconnection state, and
wherein, when the second operation member is operated in a reverse direction, the second contact part presses and moves the coupling tube, thereby causing the output shaft and the input shaft of the first clutch to come into the disconnection state.

12. The seat driving device according to claim 1,
wherein the second clutch includes a coupling tube configured to move in an axis direction of the output shaft and the input shaft of the second clutch by an urging force of a spring such that the output shaft and the input shaft come into the connection state,
wherein the coupling tube is configured to be moved by a second clutch driver, which is applied with an operating force of the second operation member, against the urging force of the spring in a direction of causing the output shaft and the input shaft of the second clutch to come into the disconnection state,
wherein the second clutch driver includes a regular-contact part configured to move and press the coupling tube regularly,
wherein, when the second operation member is not operated, the regular-contact part moves and presses the coupling tube, thereby causing the output shaft and the input shaft of the second clutch to come into the disconnection state, and
wherein, when the second operation member is operated in a forward direction or a reverse direction, the regular-contact part does not press the coupling tube, thereby causing the output shaft and the input shaft of the second clutch to come into the connection state by the urging force of the spring.

13. The seat driving device according to claim 1,
wherein the first position adjuster is a slide adjuster configured to adjust a slide position of the seat in a front and rear direction, and the second position adjuster is one of a reclining angle adjuster configured to adjust a reclining angle of a seat back, a lifter adjuster configured to adjust a height of a seat cushion and a tilt adjuster configured to adjust a height of a front part of the seat cushion.

14. The seat driving device according to claim 1,
wherein the first position adjusting adjuster is a reclining angle adjuster configured to adjust a reclining angle of a seat back, and the second position adjuster is one of a slide adjuster configured to adjust a slide position of the seat in a front and rear direction, a lifter adjuster configured to adjust a height of a seat cushion and a tilt adjuster configured to adjust a height of a front part of the seat cushion.

\* \* \* \* \*